Oct. 3, 1967  R. D. ANDERSON  3,344,483
APPARATUS AND METHOD FOR MAKING CELLULOSIC PRODUCTS
Filed April 27, 1964  31 Sheets-Sheet 1
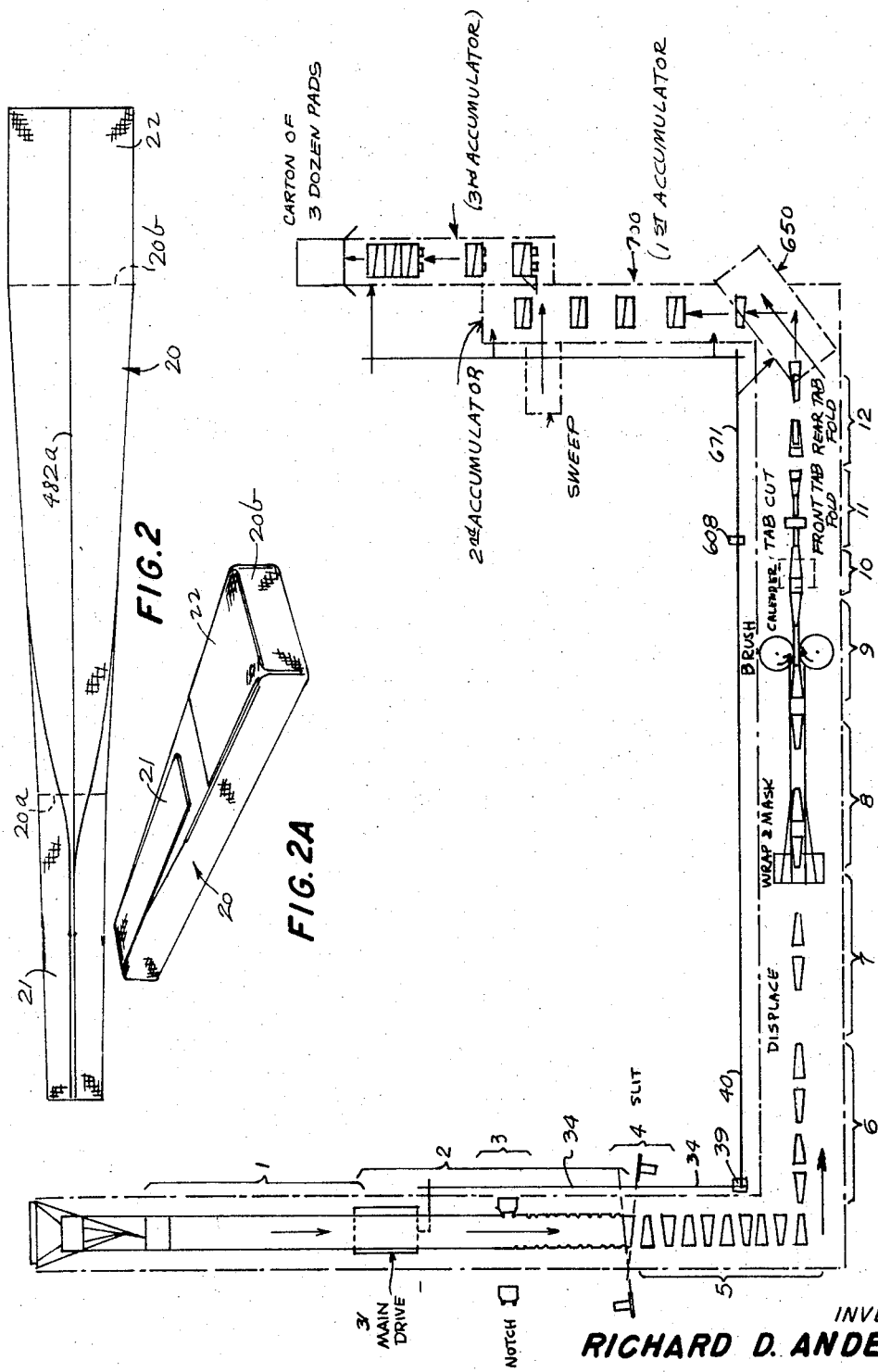
INVENTOR
RICHARD D. ANDERSON

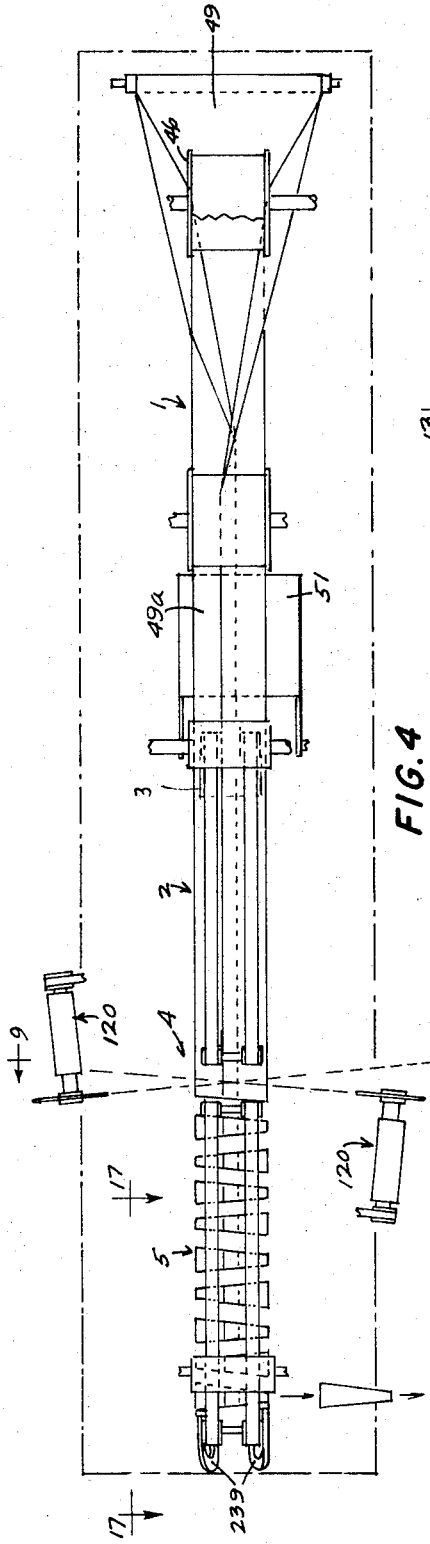
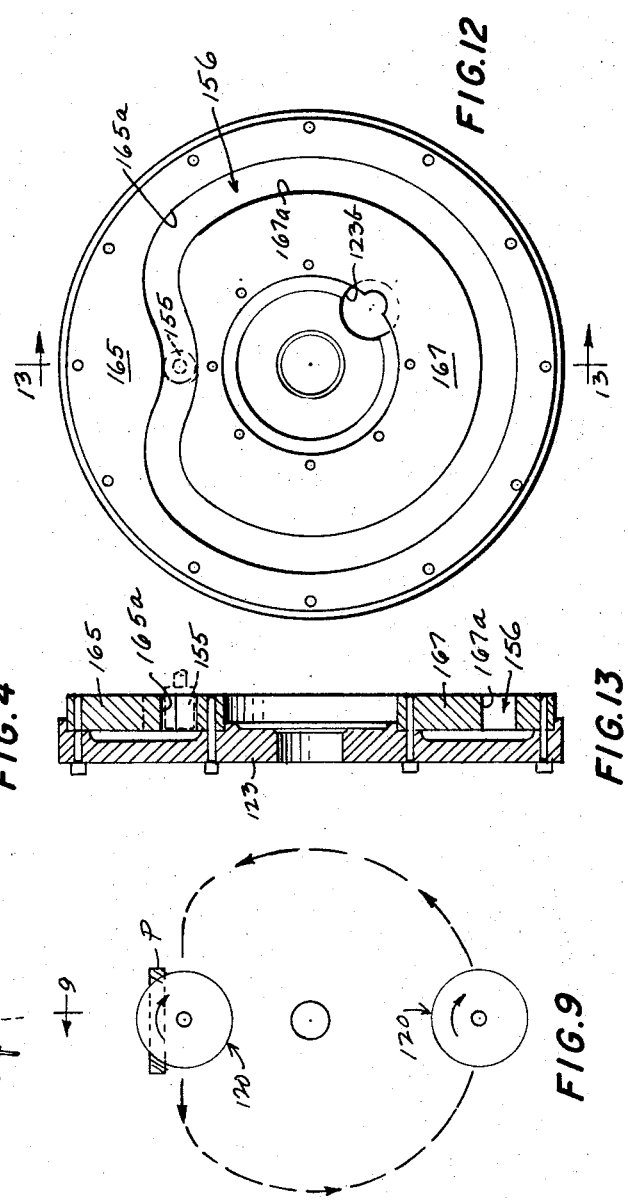
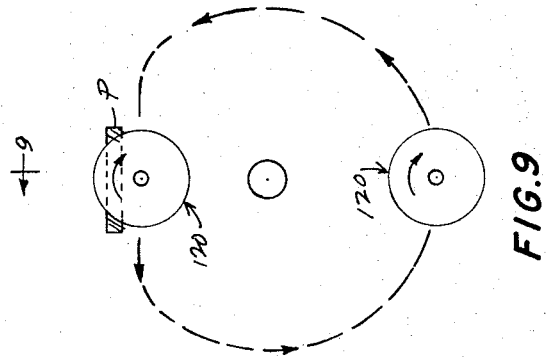

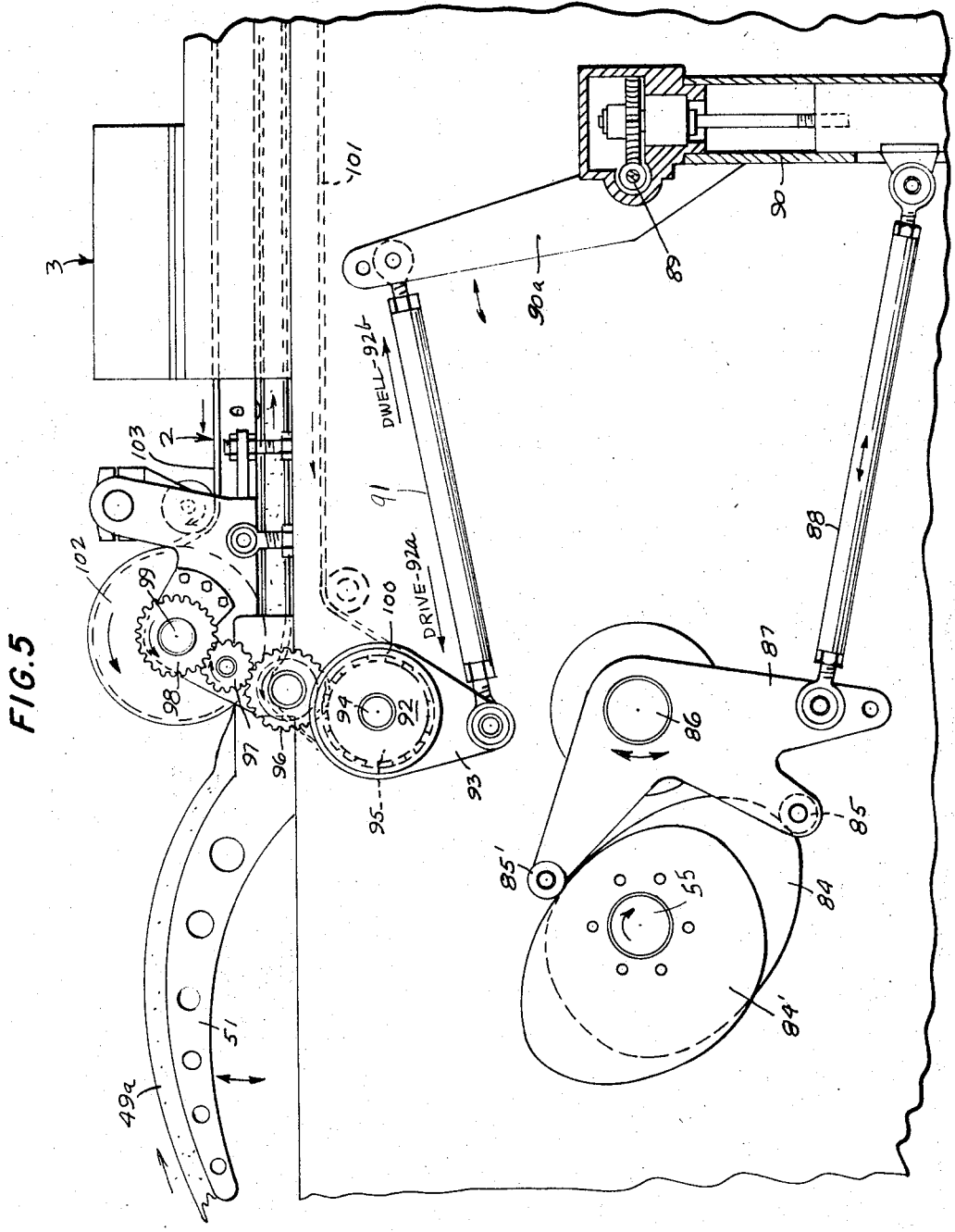

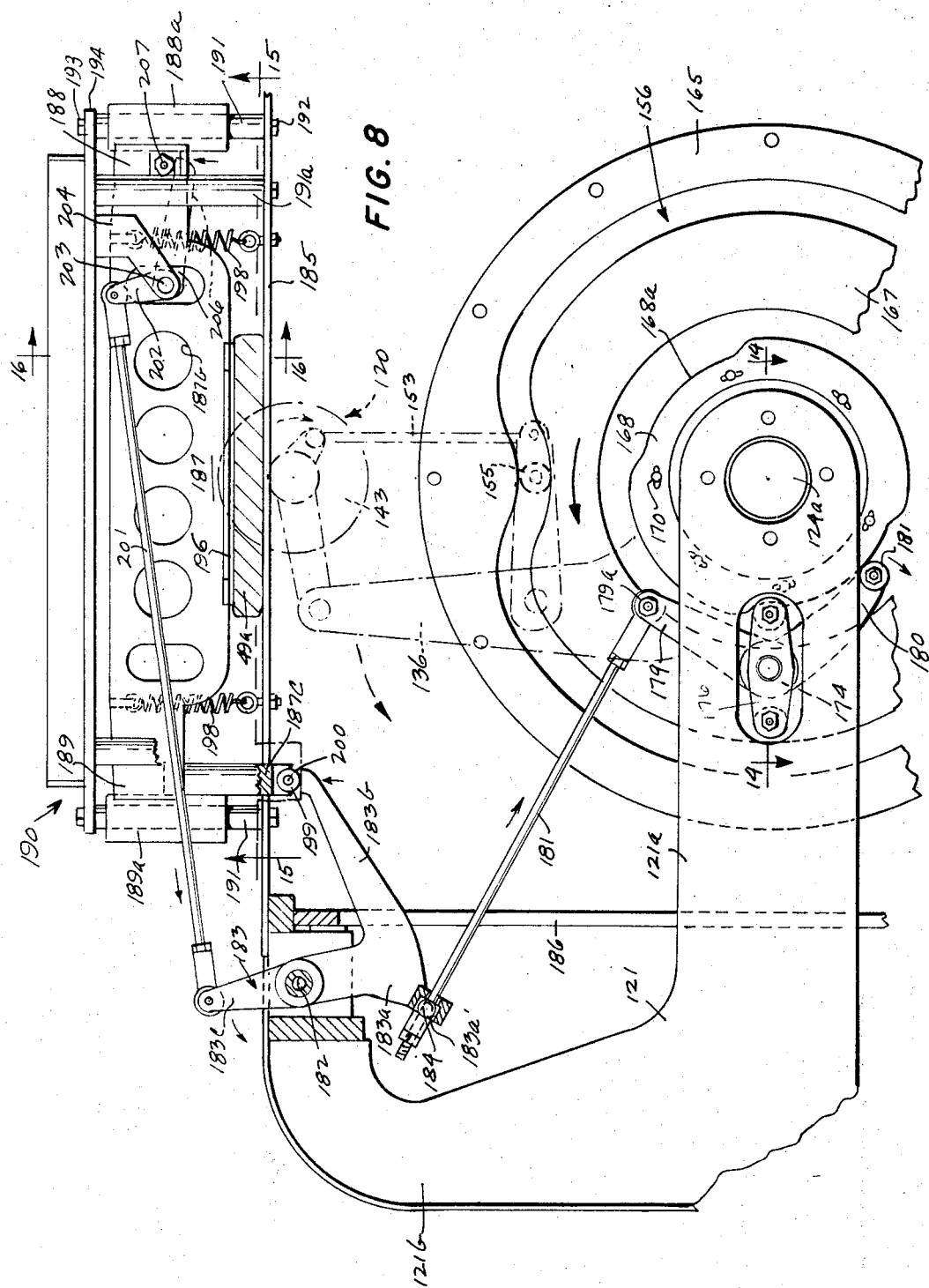

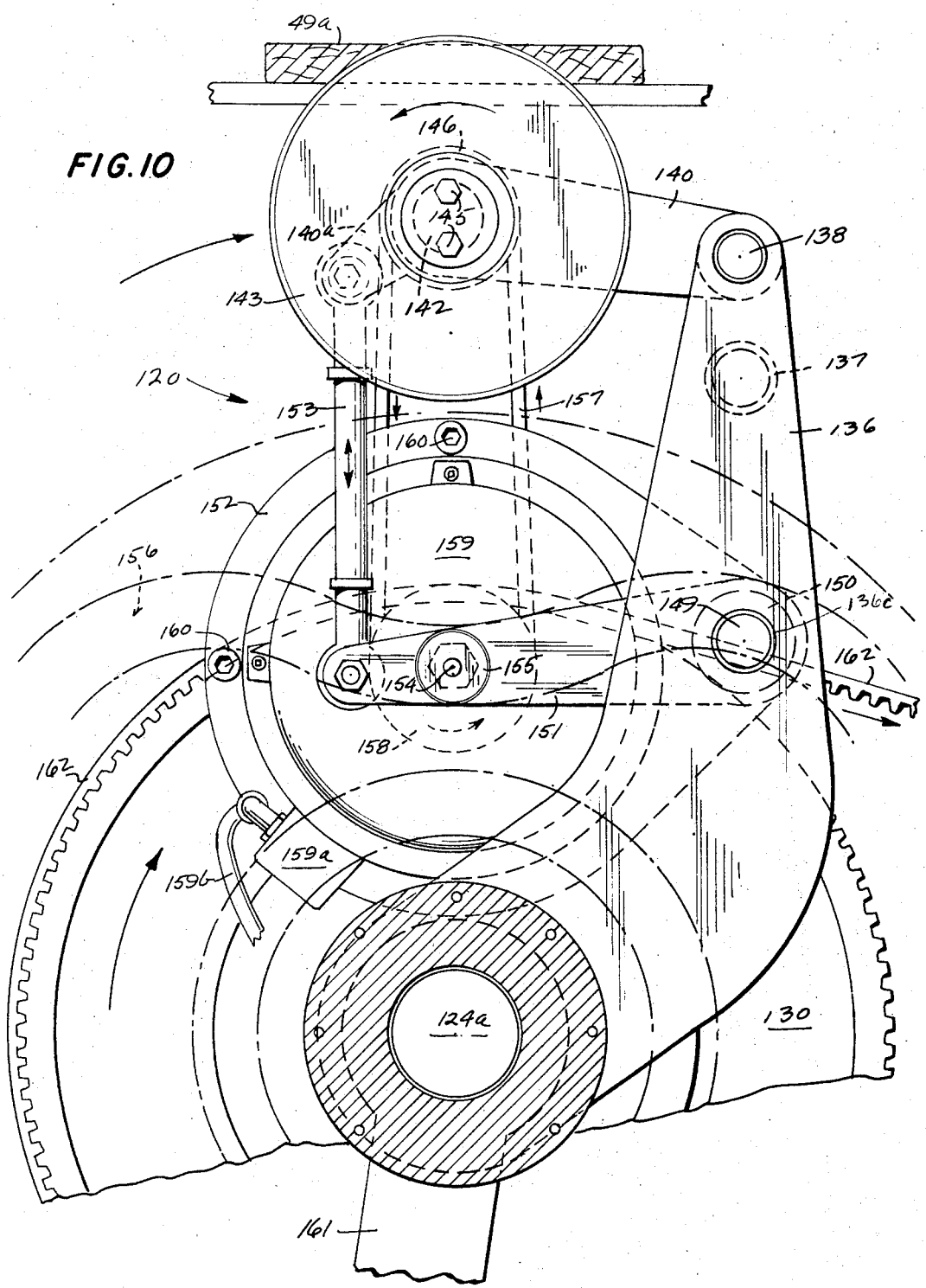

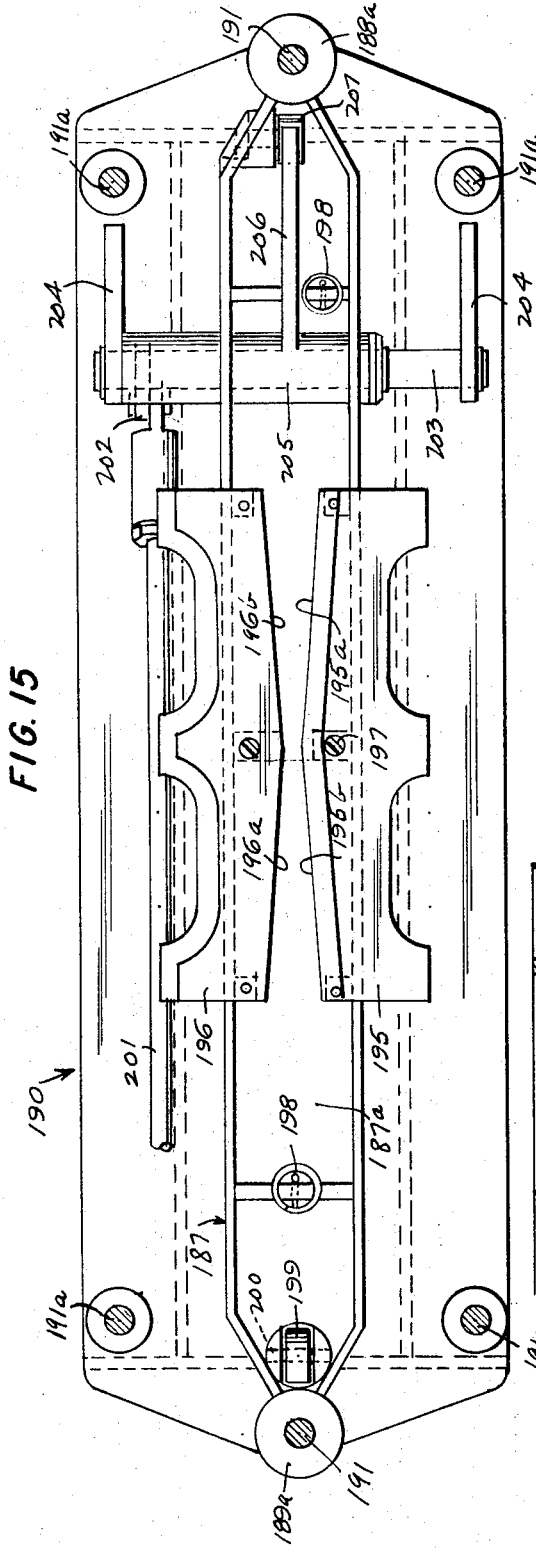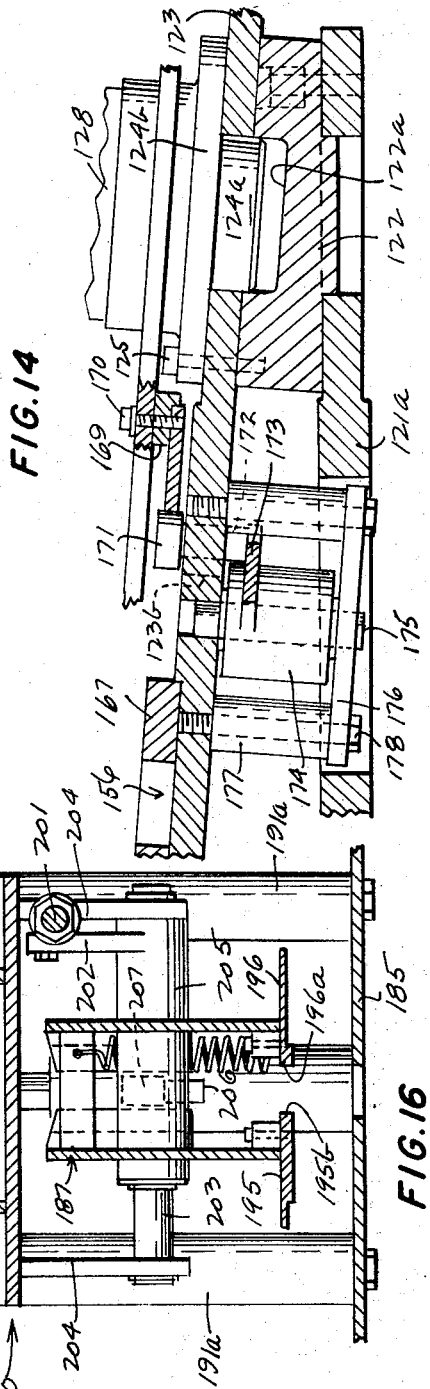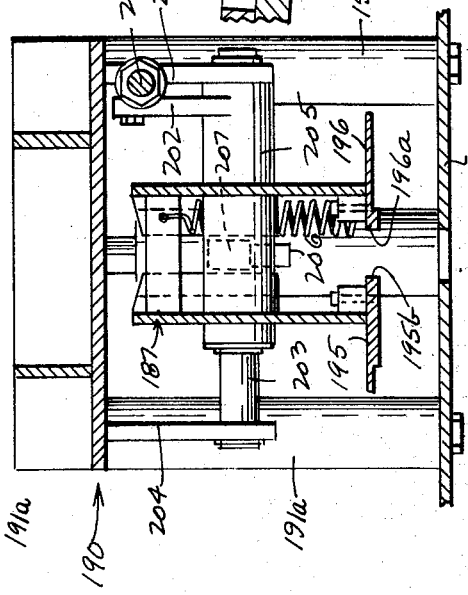

Oct. 3, 1967  R. D. ANDERSON  3,344,483
APPARATUS AND METHOD FOR MAKING CELLULOSIC PRODUCTS
Filed April 27, 1964  31 Sheets-Sheet 12

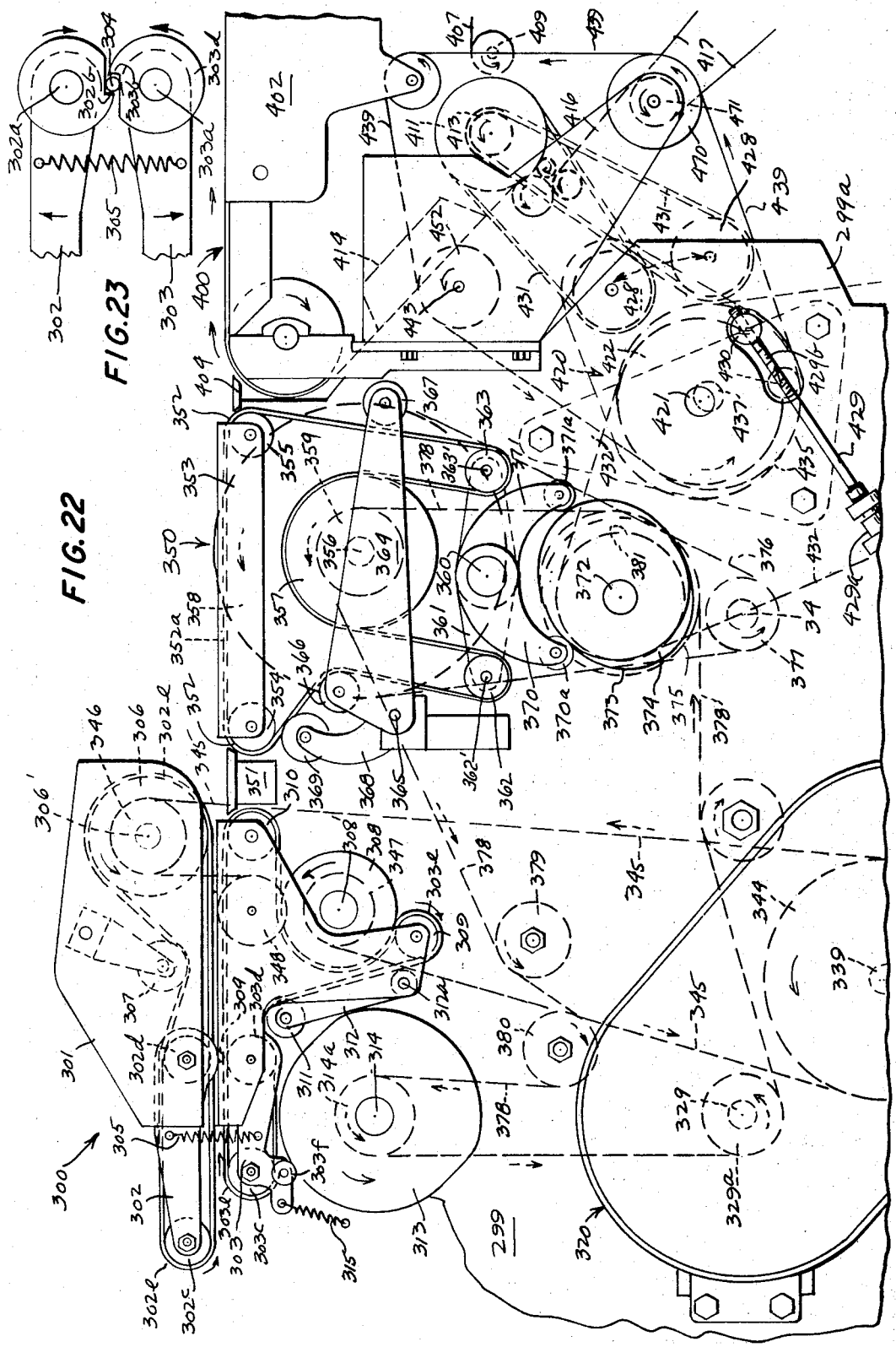

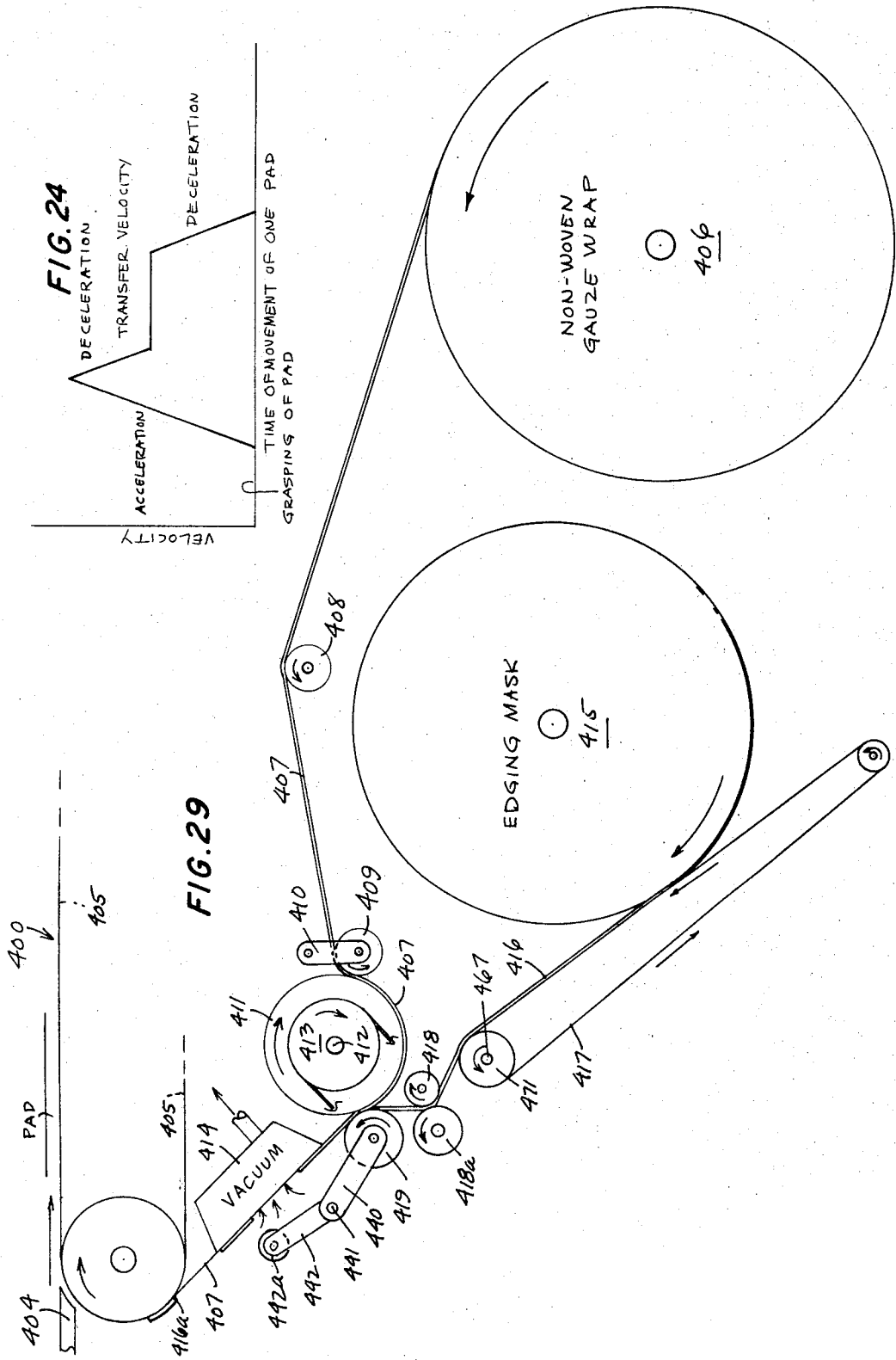

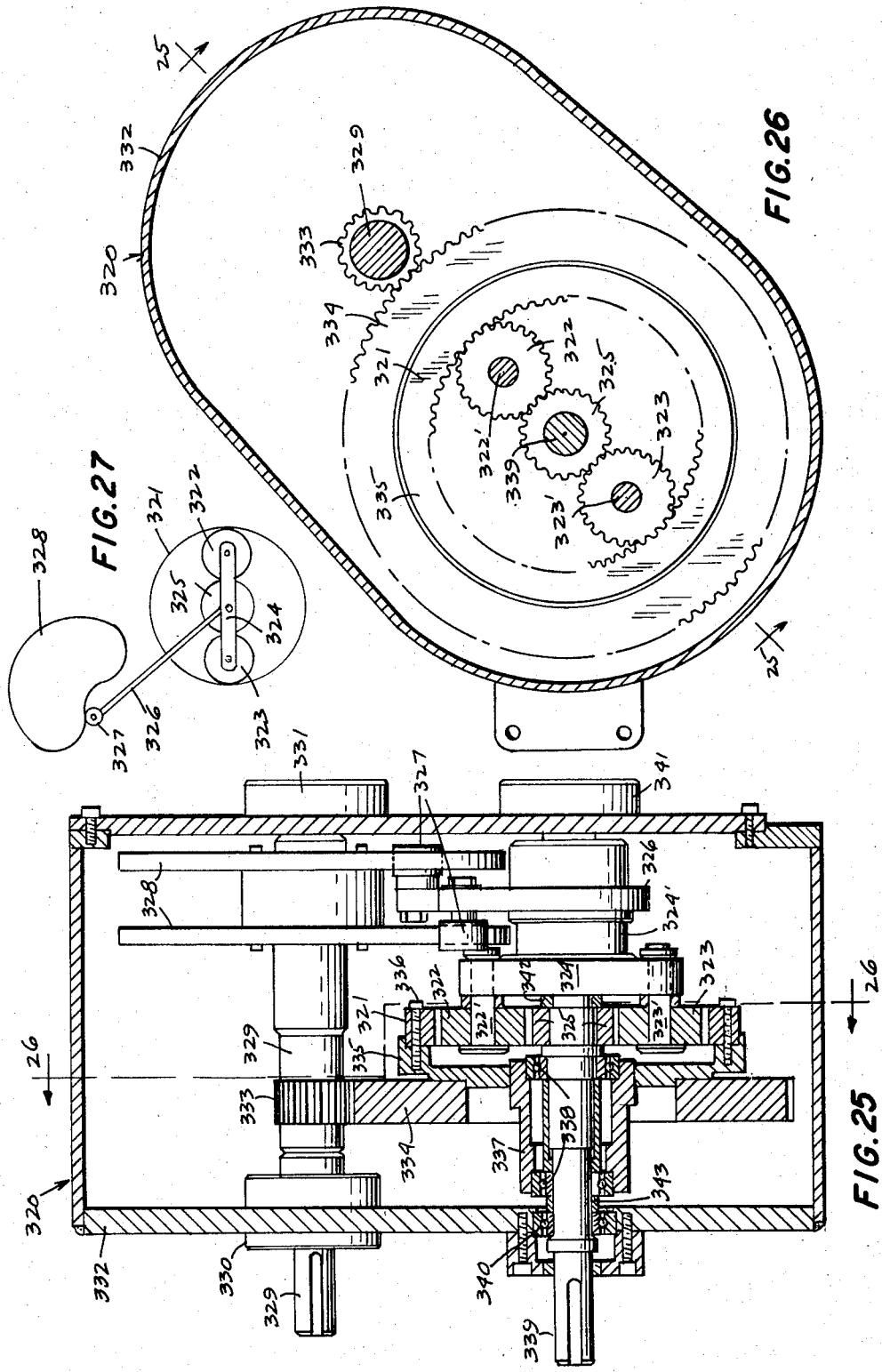

Oct. 3, 1967 R. D. ANDERSON 3,344,483
APPARATUS AND METHOD FOR MAKING CELLULOSIC PRODUCTS
Filed April 27, 1964 31 Sheets-Sheet 16
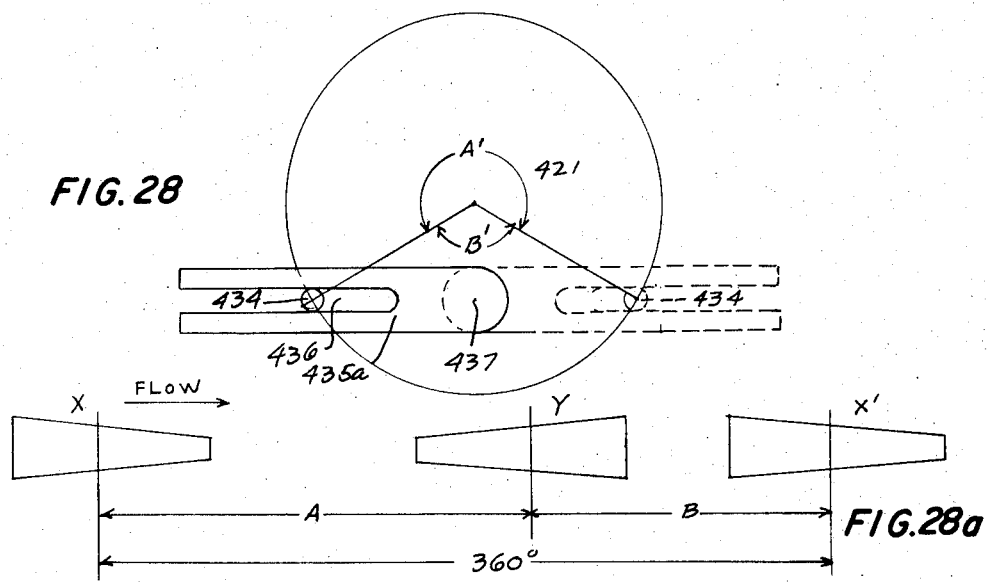
FIG. 28
FIG. 28a
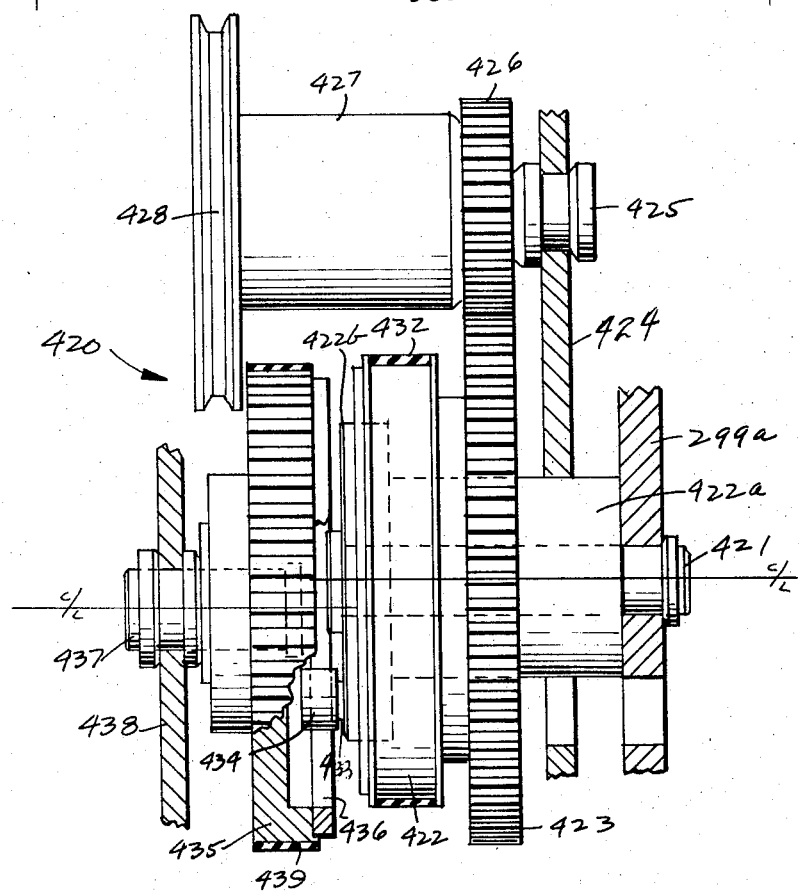
FIG. 32

Oct. 3, 1967  R. D. ANDERSON  3,344,483
APPARATUS AND METHOD FOR MAKING CELLULOSIC PRODUCTS
Filed April 27, 1964  31 Sheets-Sheet 23
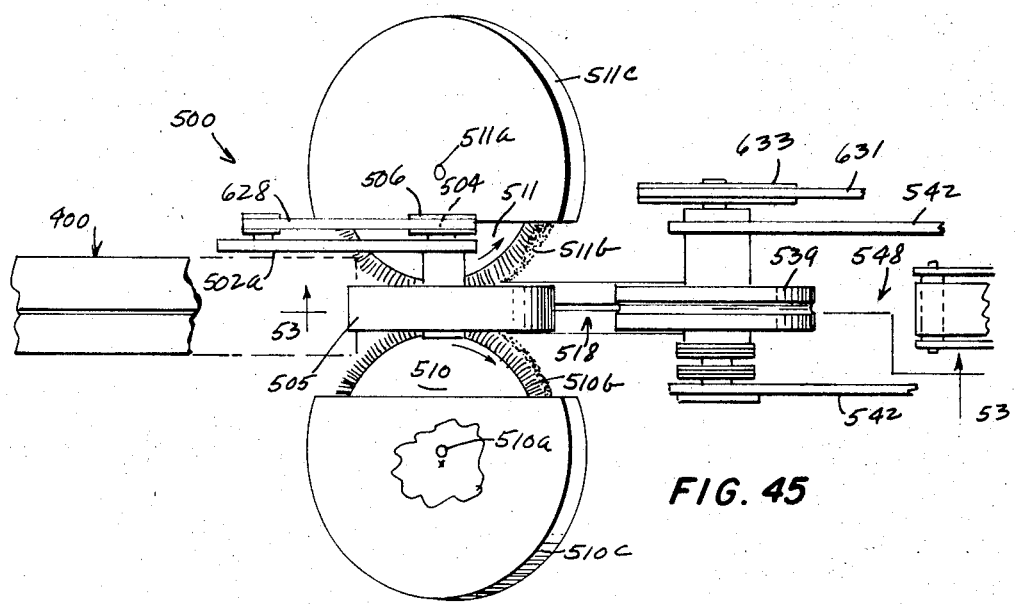
FIG. 45
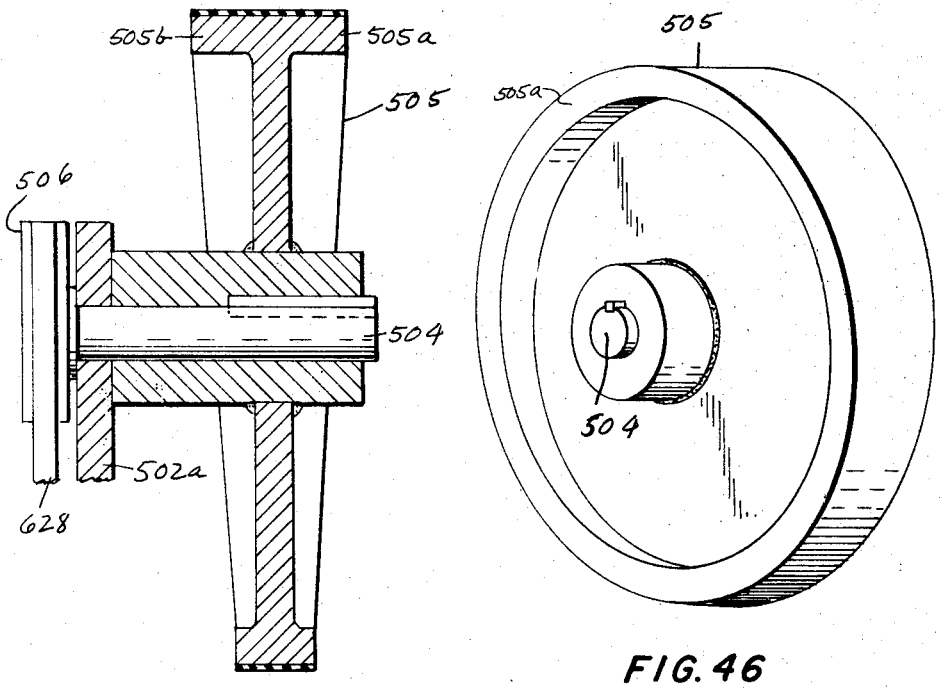
FIG. 47
FIG. 46

FIG. 48
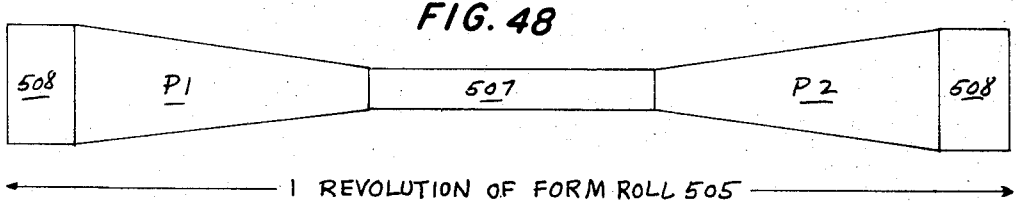
← 1 REVOLUTION OF FORM ROLL 505 →
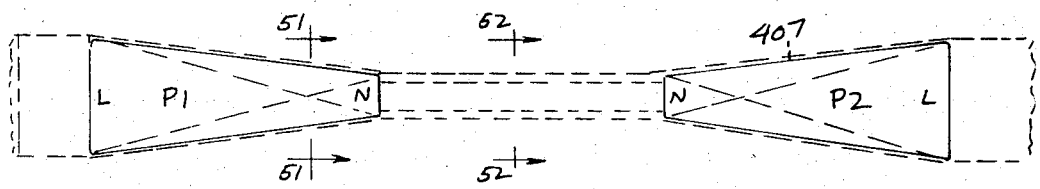
FIG. 49
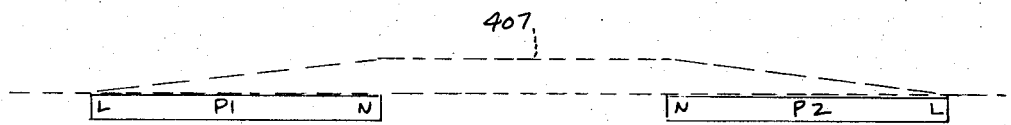
FIG. 50
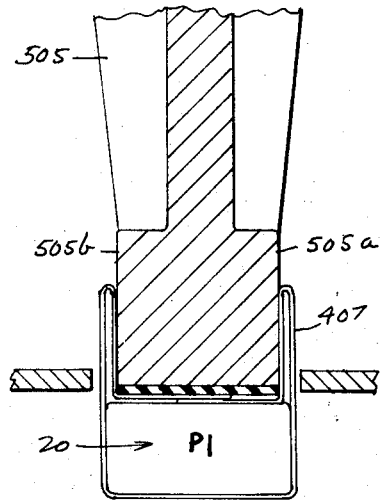
FIG. 51
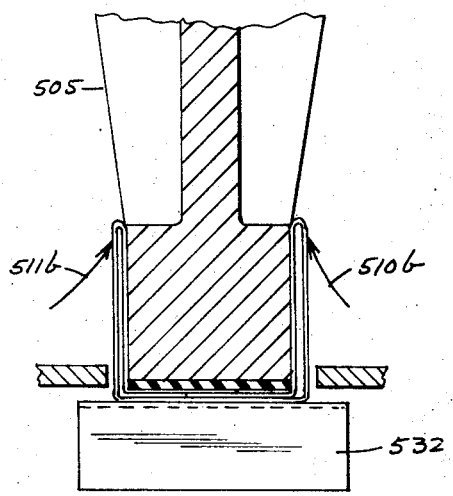
FIG. 52

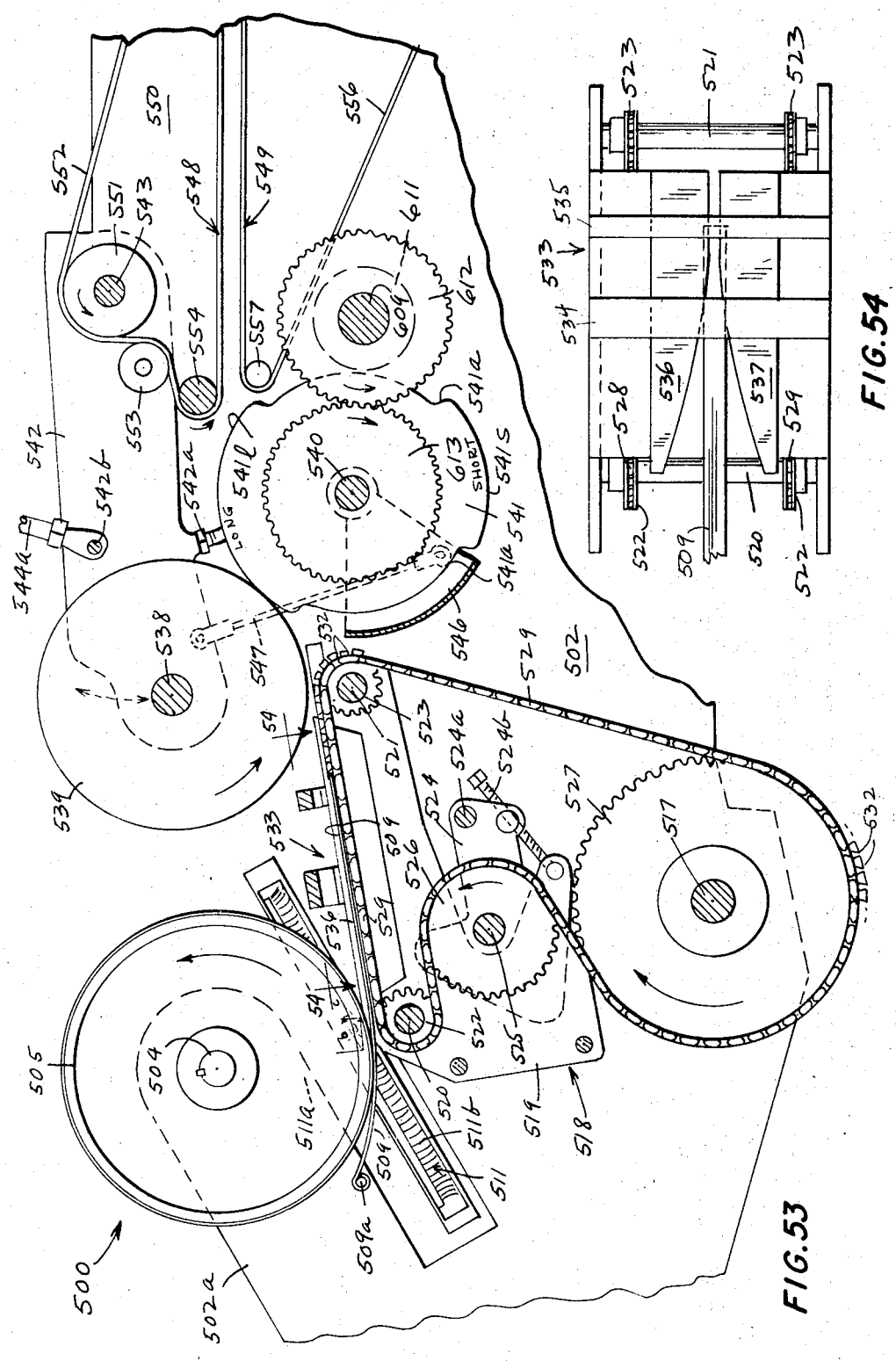

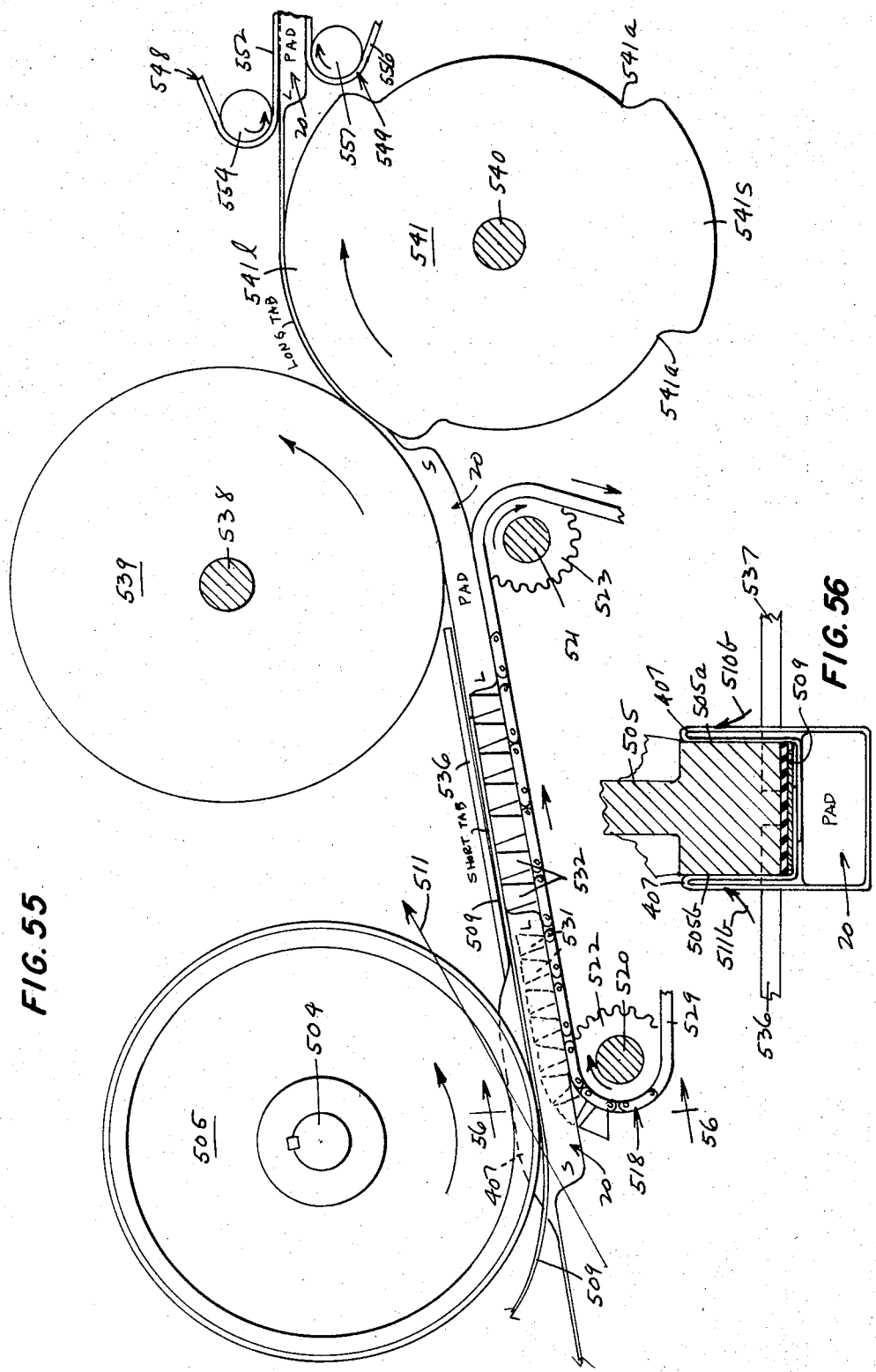

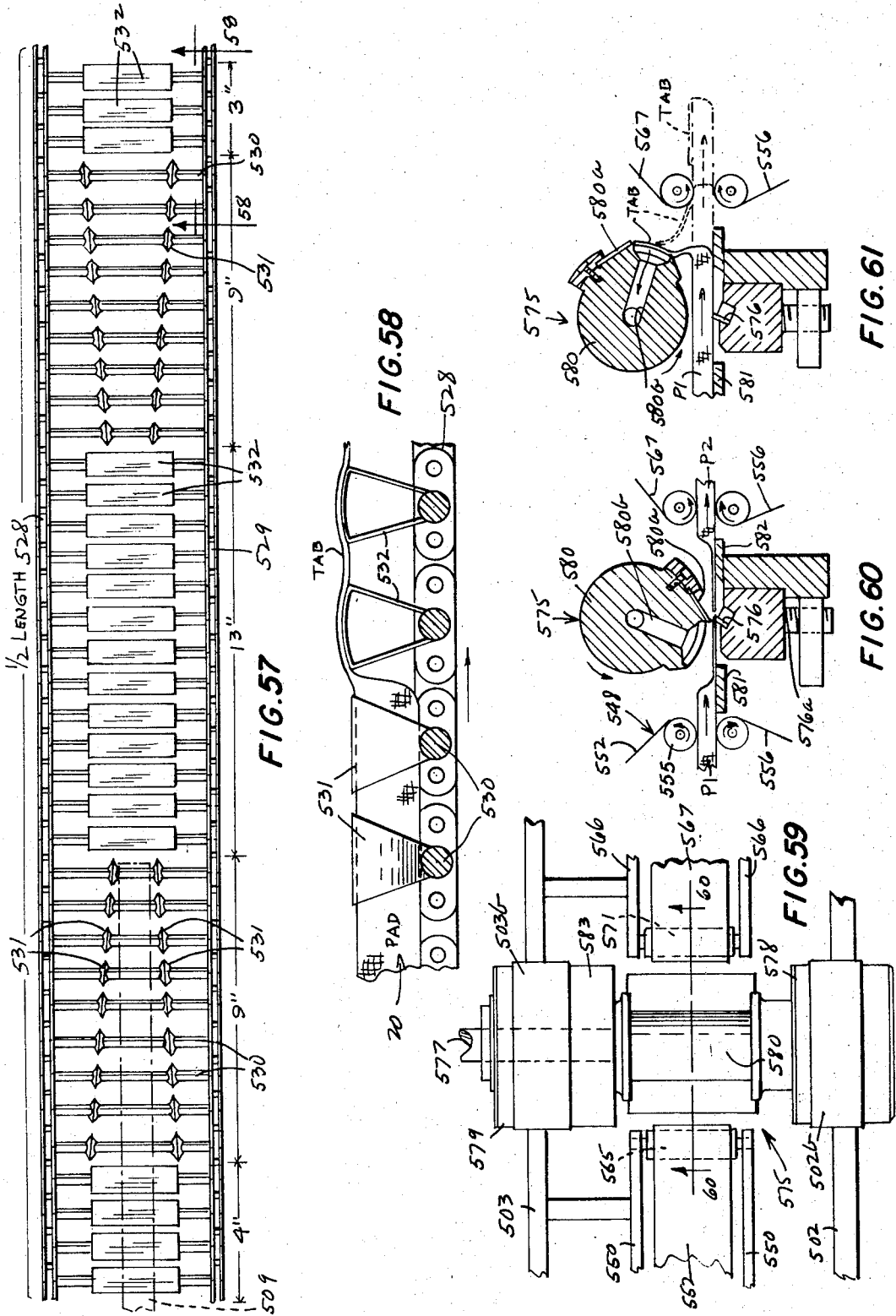

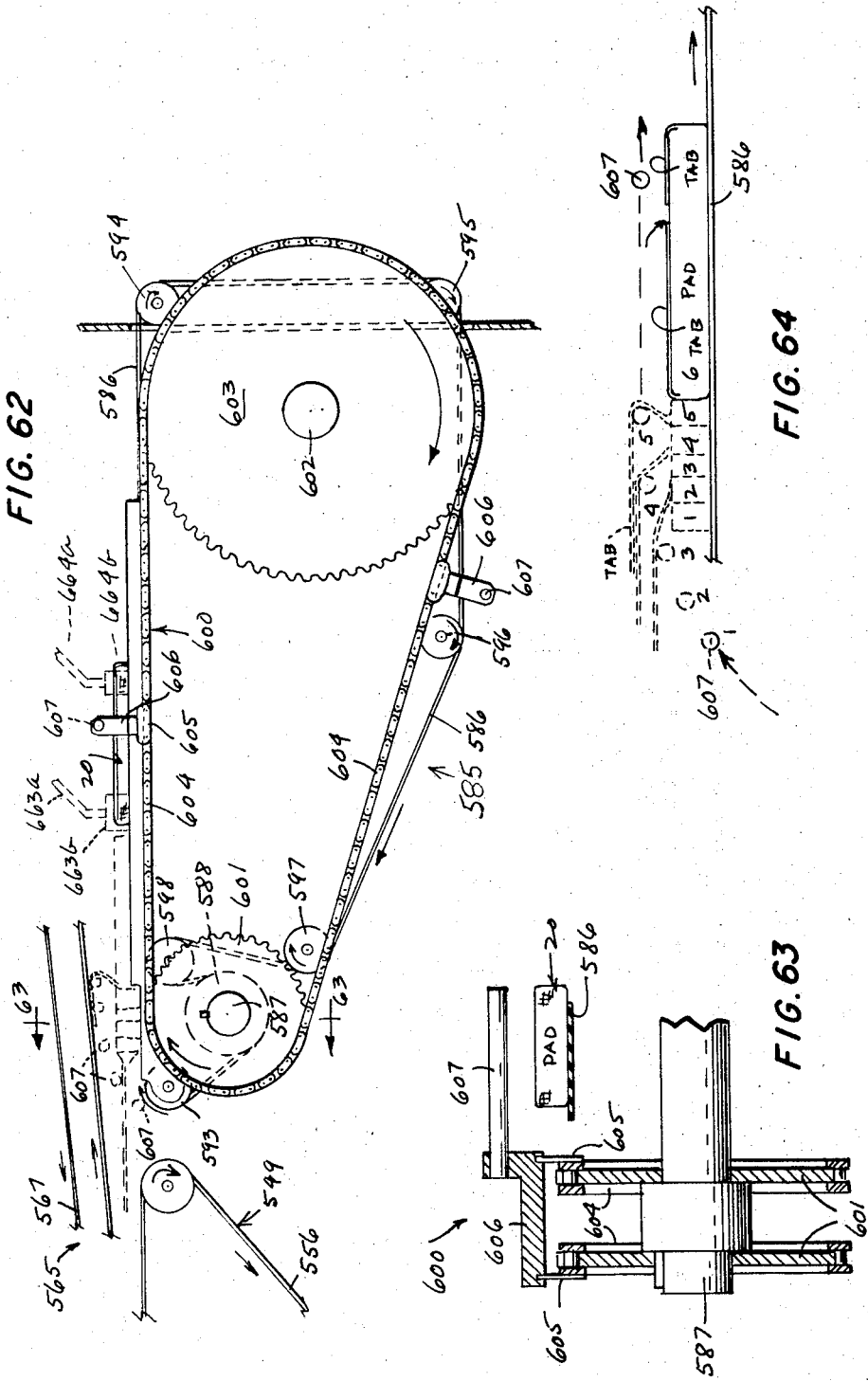

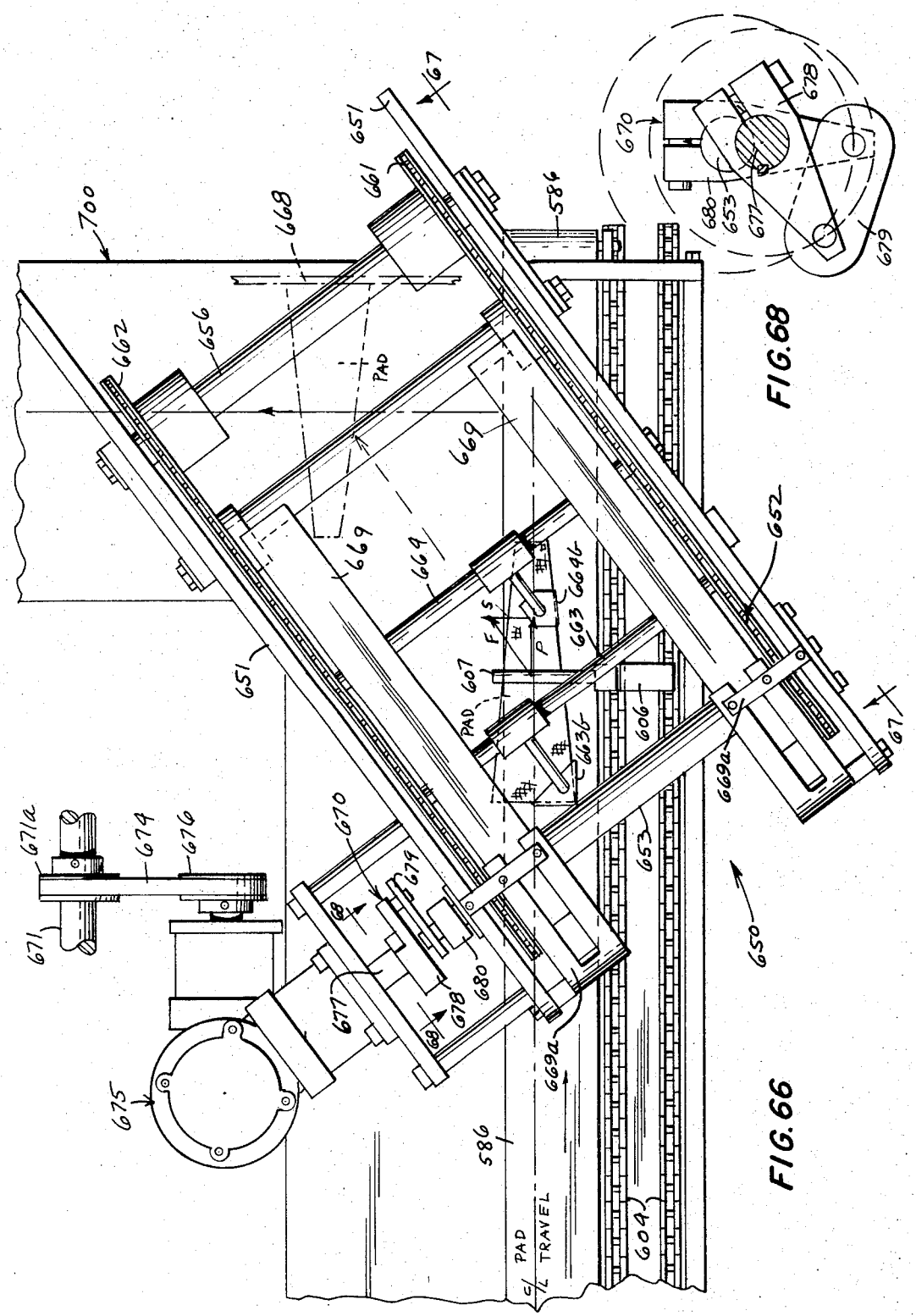

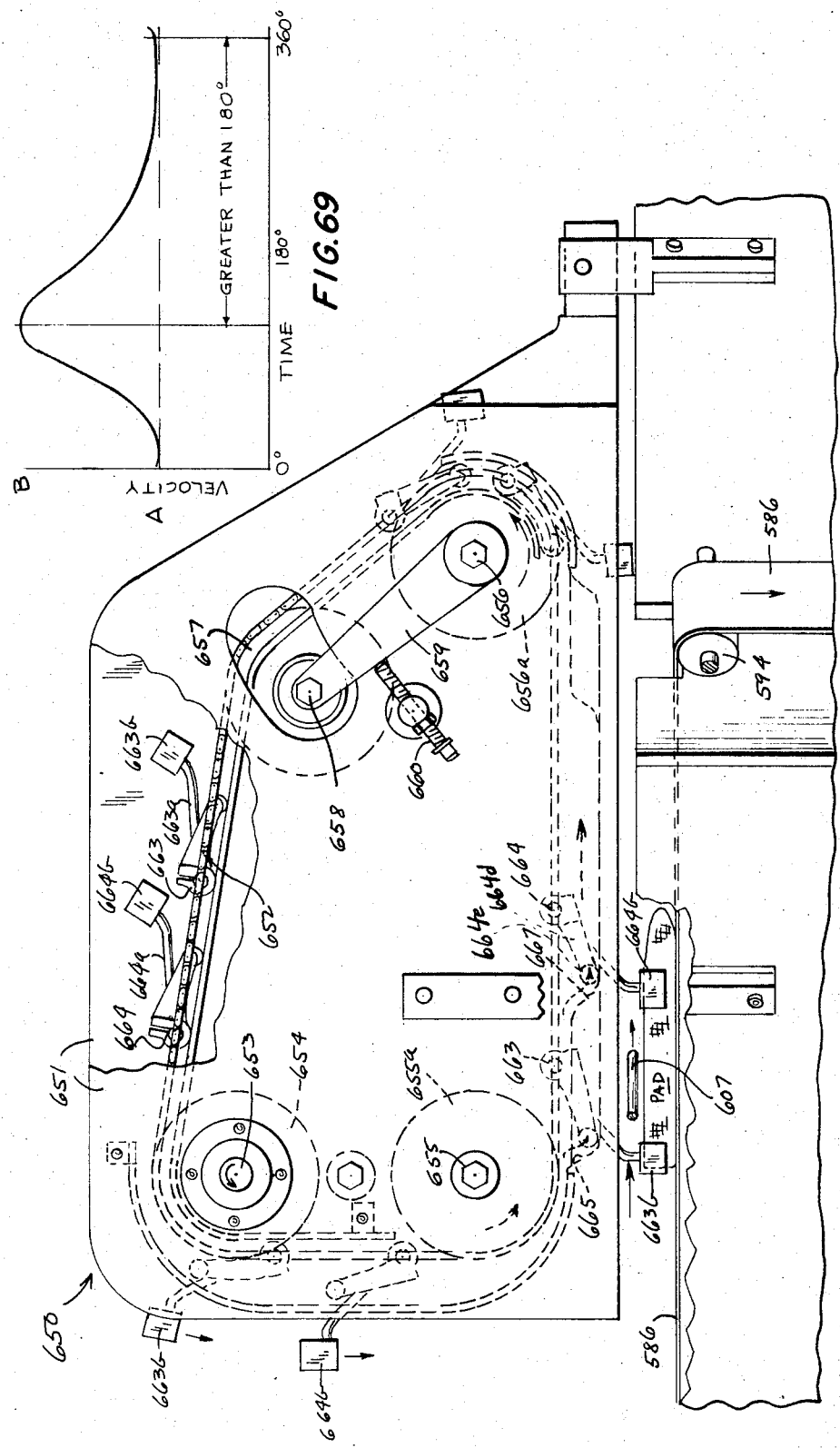

# United States Patent Office 3,344,483
Patented Oct. 3, 1967

3,344,483
APPARATUS AND METHOD FOR MAKING
CELLULOSIC PRODUCTS
Richard D. Anderson, Neenah, Wis., assignor to Kimberly-Clark Corporation, Neenah, Wis., a corporation of Delaware
Filed Apr. 27, 1964, Ser. No. 362,893
35 Claims. (Cl. 19—145)

This invention is directed to improved apparatus for continuously making tapered sanitary pads from wadding, feeding them properly spaced in line and wrapping with web and smoothly folding the wrapping about the pads and connecting wrap and forming and folding the end tabs.

In the making and wrapping of tapered pads having an approximate isosceles trapezohedron shape there is the problem of first cutting the tapered pads to shape out, then spacing them on a wrapping web with wide end to wide end and short end to short end and applying and folding of the wrap smoothly about the pads and the forming and folding of end tabs from the connecting wrap between the pads.

It is an object of my invention to provide a complete apparatus for making such pads completely and continuously.

Another object of my invention is to provide a slitting mechanism for cutting the tapered pads from wadding web.

A further object of the invention is to provide apparatus for wrapping the tapered pads in a tubular wrap of uniform cross section equal to the wider end of the pad and to fold up smoothly the loose wrap over the narrowing portion of the pads and the formation and folding of tabs at each end of the pads.

A still further object of the invention is to provide a method of completely making in a continuous manner tapered sanitary pads.

Still further objects and the entire scope of applicability of the present invention will become apparent from the detailed description given hereinafter. It should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the invention reference is had in the drawing and claims in which:

FIG. 1 is a diagrammatic plan view of a sanitary pad making machine and angle transfer of completed pads and outline of accumulator;

FIG. 2 is a view of the pad with tabs extending to each end;

FIG. 2A is a perspective view of a tapered sanitary pad;

FIG. 4 is a diagrammatic plan view along line 4—4 of FIG. 3;

FIG. 5 is a side elevation of intermittent wadding feed to cutter;

FIG. 8 is a vertical sectional view along line 8—8 of FIG. 3, looking in the direction of wadding flow showing wadding clamp and one slitter on an enlarged scale with back plate removed for clarity;

FIG. 9 is a vertical diagrammatic view of the two slitters, their direction of rotation and orbital path along line 9—9 of FIG. 4.

FIG. 10 is a vertical view of one of the slitters along line 10—10 of FIG. 3 with the slitter in top position cutting through the wadding;

FIG. 12 is a vertical view of a cam track controlling the radial path of the slitter so that it has an approximate horizontal path through the wadding;

FIG. 13 is a vertical section of the cam and support plate along line 13—13 of FIG. 12.

FIG. 14 is a sectional view on an enlarged scale of the main support arm, the back plate, the main shaft and cam track of slitter assembly along line 14—14 of FIG. 8;

FIG. 15 is a bottom plan view of the wadding clamp alnog line 15—15 of FIG. 8 on an enlarged scale;

FIG. 16 is a vertical sectional view of the wadding clamp along line 16—16 of FIG. 8;

FIG. 22 is a side elevation of a transverse portion of the apparatus including pad feed from FIG. 19, displacement mechanism for variable spacing the pads in an end to end relation and the entrance end of the wrap folder showing the feed of the wrap and mask for the pads;

FIG. 23 is a fragmentary enlarged side elevation of the pivotal connection of the pad feed arms at the left-hand end of FIG. 22;

FIG. 24 is a time and velocity graph for the pad feed take off mechanism at the left-hand end of FIG. 22;

FIG. 25 is a cross sectional view of the intermittent drive device for the pad feed mechanism positioned at the left end of FIG. 22 and as viewed along line 25—25 of FIG. 26;

FIG. 26 is a cross sectional view of the intermittent drive mechanism along line 26—26 of FIG. 25;

FIG. 27 is a diagrammatic showing of the action of the intermittent drive apparatus of FIGS. 25 and 26;

FIG. 28 is a diagrammatic showing of the mask spacing mechanism drive and relationship to the pad displacement shown therebeneath in FIG. 28a;

FIG. 28a is a diagrammatic showing of tapered pad spacing and orientation of pads;

FIG. 29 is a diagrammatic elevation of the wrap and mask feed to folder mechanism;

FIG. 30 is a side elevational view similar to FIG. 29 of the folder mechanism and a portion of the tab shaper mechanism;

FIG. 31 is a partial top plan view of the folder mechanism of FIG. 30 on an enlarged scale;

FIG. 32 is an end view of the pivotal mounted drive mechanism for the variable pitch pulley feeding the pad wrap and the variable drive for mask feed with the casing removed;

FIG. 45 is a plan view along line 45—45 of FIG. 43 on an enlarged scale of the tab forming mechanism;

FIG. 46 is a perspective view on an enlarged scale of the form roll for tab forming;

FIG. 47 is a vertical cross sectional view of the form roll of FIG. 46 with its mounting and drive shown fragmentarily;

FIG. 48 is a plan view of circumference of the form roll laid out flat;

FIG. 49 is a diagrammatic plan view of the approximate wrap position with respect to two pads;

FIG. 50 is a diagrammatic side elevation of wrap about two pads at the position of the form roll;

FIG. 51 is a diagrammatic cross sectional view of pad and wrap with form roll rim as would occur along line 51—51 of FIG. 49 with form roll rim in place;

FIG. 52 is a diagrammatic cross sectional view of pad and wrap with form roll rim as would occur along line 52—52 of FIG. 49 with form roll rim in place;

FIG. 53 is an enlarged cross sectional view along line 53—53 of FIG. 45;

FIG. 54 is an enlarged view along line 54—54 of FIG. 53 showing the tongue and tab folders following the form roll;

FIG. 55 is a schematic side elevational view on an enlarged scale of form roll, the wrap position on sides of roll, pads in flights of conveyor, tab portions connecting pads and calender rolls;

FIG. 56 is an enlarged cross sectional view of the form roll, pad, wrap and folders for tab portions along line 56—56 of FIG. 55;

FIG. 57 is a plan view of about one-half length of pad conveyor to convey pads between form roll and calender rolls showing the flights to receive pads and the flights to carry the tab portions;

FIG. 58 is an enlarged vertical sectional view of the conveyor along line 58—58 of FIG. 57 showing a portion of a pad and tab as carried thereby;

FIG. 59 is a plan view of the tab cutter roll and conveyors along line 59—59 of FIG. 43 on an enlarged scale;

FIG. 60 is a vertical sectional view of the cutter roll along line 60—60 of FIG. 59 showing the cutter knife on the rotary cutter, a bed knife, suction device on roll for cut tab and tab at time of cutting;

FIG. 61 is similar to FIG. 60 with cutter roll rotated further counter-clockwise in direction of flow of pad and pad and cut tab advanced with positioning of leading tab being in stripped position shown in broken line;

FIG. 62 is a side elevational view of a conveyor for the pad with rear tab folding mechanism showing tab folder in successive broken line positions overtaking the pad;

FIG. 63 is a sectional view along line 63—63 of FIG. 62 on an enlarged scale showing a rear tab folding flight in relation to pad;

FIG. 64 is a diagrammatic view of the rear tab folder flight moving with respect to rear tab and pad to fold tab forward over rear pad;

FIG. 66 is a top plan view of the transfer mechanism;

FIG. 67 is a side elevation of the transfer mechanism viewed generally along line 67—67 of FIG. 66;

FIG. 68 is a view along line 68—68 in FIG. 66 of a drag link drive mechanism for the transfer mechanism; and FIG. 69 is time versus velocity graph of the drive of the transfer mechanism of pad after completion of pad.

Throughout the description like reference numbers refer to similar parts.

Figure 3:
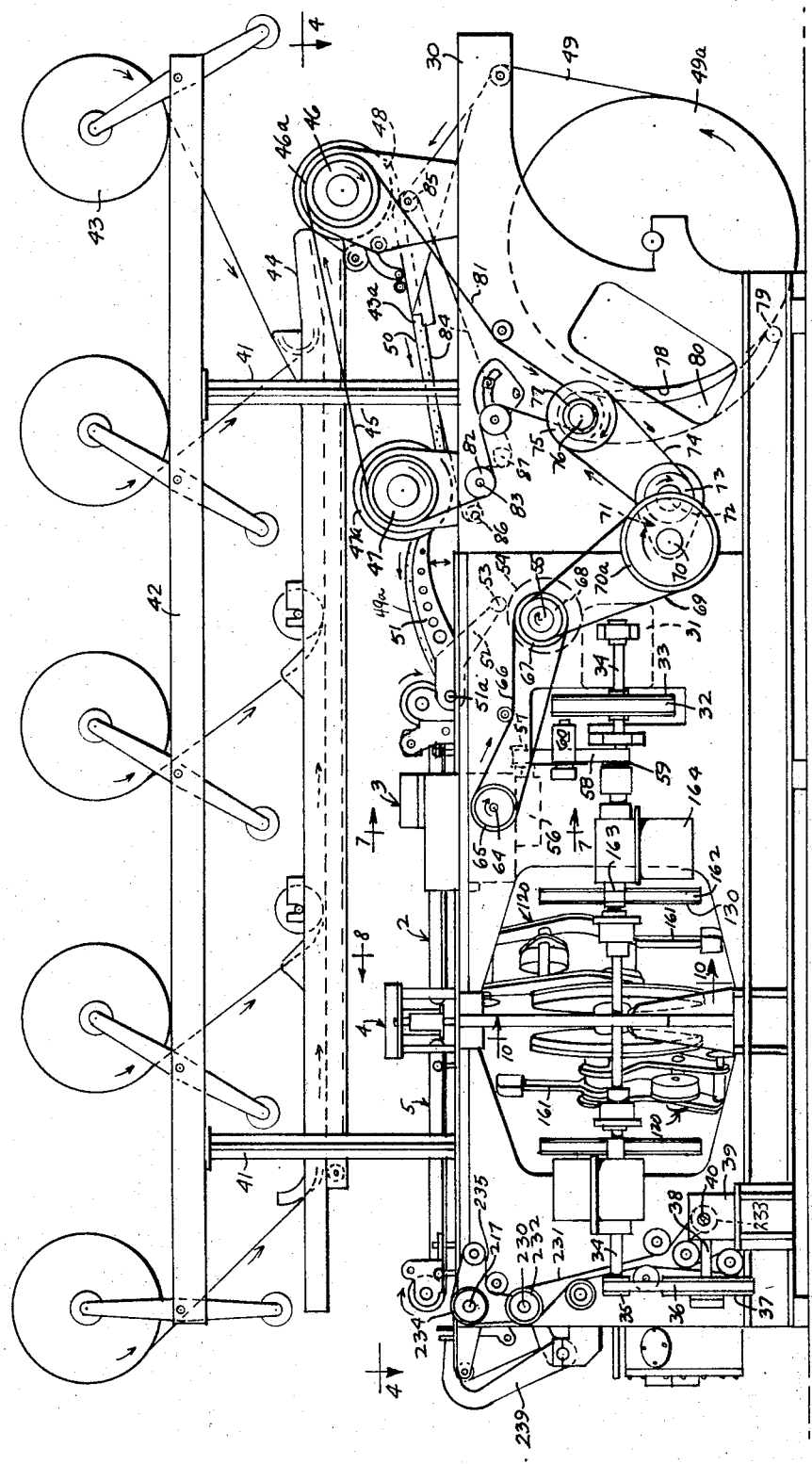
FIG. 3 is a side elevation of wadding assembly and taper cutter apparatus.

FIG. 1 is a diagrammatic plan view of the sanitary pad making machine and angle transfer mechanism of completed pads, such outline of accumulator which is the subject of a separate application. The wadding is made up as a lamination at station 1 and intermittently fed through an intermittent feed conveyor at station 2 which has associated therewith a corner cutter 3 for the pads to be formed. The intermittent feed 2 feeds the wadding which has had the proper corner cuts made therein to a pair of slitters at station 4 each of which cuts at an angle to make the tapered pads. A continuous running conveyor 5 takes the pads from the slitter in equal spaced relation in a general parallel attitude to each other to the end of the continuous conveyor 5. A transverse pad feed conveyor 6 pulls off each pad individually and transfers it in equal spaced end to end relation to a displacement mechanism 7. This displacement mechanism 7 is necessary to properly space the pads with their wider ends closer together and their narrower ends further apart. The sanitary pads are worn with the narrower end to the back which has the longer tab while the wider end is at the front with the shorter tab. The displacement mechanism 7 transfers the spaced pads to a wrap and mask applying and folding mechanism 8 and after folding the wrap and mask the pads pass with wrap and mask thereon to a tab former 9, thence to a calendering station 10, to a tab cutter and front tab folding and conveying mechanism 11, thence to a rear tab folding and conveying mechanism 12 and finally to an angle transfer mechanism 13 where the completed pads are transferred to accumulators to be covered in a separate application.

In FIG. 2 a perspective general outline showing of a completed pad 20 is shown with a narrower end 20a and a wider end 20b, the narrower end 20a has the longer tab 21 while the wider end 20b has the shorter tab 22. As indicated above the narrower end 20a is worn to the rear with the longer tab 21 while the wider end 20b is worn to the front with its shorter tab 22.

Reference to FIG. 4 shows in a little more detail than FIG. 1 the wadding feed 1, the intermittent feed mechanism 2, corner cutter 3 with the intermittent feed mechanism 2 feeding the assembled wadding which has been corner cut in proper positions to the slitter mechanism 4 where the wadding is clamped during a cut of the rotary slitters which orbit 180° apart to cut the pads. The tapered pads are taken off by the continuous running conveyor 5 and are stopped by a fence and alternate fingers 239 at the end thereof as will be explained later.

Reference to FIG. 3 shows a machine frame 30 having a main motor shown in broken lines at 31 which through a belt 32 drives a pulley 33 on main shaft 34 that is located on the left-hand side of the machine as viewed in FIG. 4 in the direction of flow. This main shaft 34 is supported by suitable bearings and provides power through belts at various stations and through reduction gearing, all to be described hereinafter. The left-hand end of the main drive shaft 34 drives through a pulley 35 a belt 36 passing over a pulley 37 on shaft 38 leading from a gear box 39 having a drive output shaft 40 which extends transversely to drive the rest of the machine shown in FIG. 1.

Extending up from the machine frame 30 are suitable vertical supports 41 which support a pair of spaced parallel longitudinal members 42 which in turn pivotally support various rolls 43 of material making up the wadding which feeds into a trough 44 all of which is conventional. From the trough 44 the laminated wadding passes over the top and then the bottom of endless conveyor belt 45 supported by pulleys 46 and 47 on appropriate shafts so that the wadding 48 is brought onto wadding wrapper 49 lead from wadding wrapper parent roll 49a. The wadding wrapper parent roll 49a is conventionally shown supported on a portion of frame 30.

An outer wrap folder at 50 folds the wrap as shown conventionally in FIG. 4 over the wadding and the assembled sandwich 49a passes over a festooner generally indicated at 51. This festooner 51 is pivotally mounted at 51a and has a rigid depending arm 52 attached with a cam follower 53 on the end which cooperates with cam 54 on a cross shaft 55 to move the festooner 51 up and down.

This festooner 51 tends to take up the slack as the wadding is continuously fed to the slitter 4 where it stops to be cut into tapered pads. The wadding which is now wrapped passes through the intermittent driven conveyor 2 and under the corner cutter 3.

*Drive for corner cutters and wadding feed*

Figure 7:
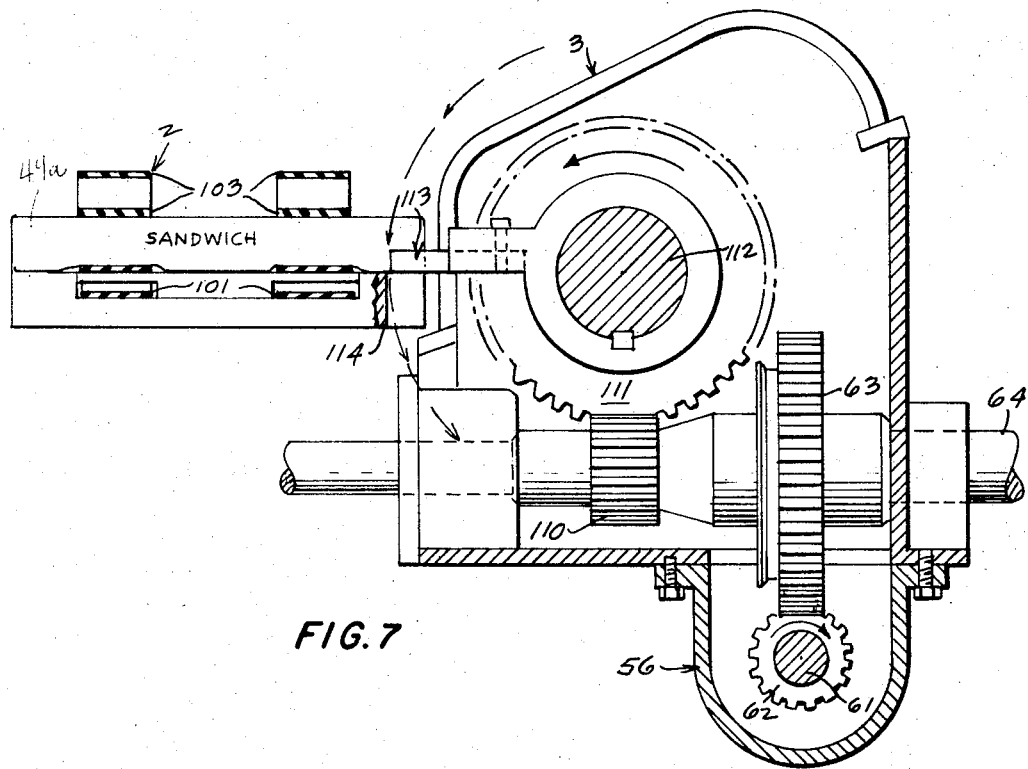
FIG. 7 is a fragmentary cross sectional view of one corner cutter along line 7—7 of FIG. 3.

The drive from the main drive shaft 34 will now be explained for the corner cutter and the wadding feed. A counter drive unit 56 has a drive pulley 57 connected by belt 58 to pulley 59 on main shaft 34. A suitable idler 60 maintains the belt 58 taught. The counter drive unit 56 drives the corner cutter, wadding and sandwich feed. Reference to FIG. 7 shows the lower portion of the counter drive unit 56 having a shaft 61 therein and a gear 62 thereon driving a gear 63 on a counter shaft 64. The shaft 64 has a pulley 65 thereon, see FIG. 3, which through a belt 66 drives a pulley 67 on counter shaft 55. This counter shaft 55 has a cam 54 mounted thereon which moves the festooner 50 up and down as its cam follower 53 follows the cam 54.

A variable pitch sheave 68 on shaft 55 drives a belt 69 connected to pulley 70a on shaft 70 of a gear box 71. An output shaft 72 of the gear box 71 drives a pulley 73 over which a belt 74 passes to a pulley 75 on a cross shaft 76. A pulley 77 on cross shaft 76 drives an endless belt 78, which passes over an idler pulley 79 on the end of a pivot arm 80, pivoted about shaft 76. This endless belt 78 drives the wadding wrap roll 48.

A drive belt 81 driven by a pulley on shaft 76 passes over pulley 46 and the pulley 47 to drive the endless conveyor belt 45 and thence down over a drive pulley 82 mounted on a cross shaft 83 which has a suitable roll behind the pulley 82 to drive an endless conveyor belt 84 passing over idler rollers 85, 86 and 87 suitably mounted. This endless conveyor belt 84 carries the wadding web 49. The wadding web 49 carried by the endless conveyor belt 84 receives the laminates on the top thereof from the various supply rolls, previously described, and carries the assembly under the wrap folder 50 to pass under the roll 47a driven by belt 81.

*Intermittent feed conveyor*

FIG. 5 shows the intermittent feed conveyor 2 which is viewed from the opposite side of the machine from FIG. 3. This intermittent feed conveyor 2 is driven indirectly from the shaft 55 as will be explained. The conveyor 2 feeds the assembled sandwich 49a from the festooner 51 through the corner cutters 3 and onto the cutting station 4. With respect to the drive of the intermittent feed conveyor 2 the shaft 55 drives a pair of cams 84 and 84' which provide, as will be explained, intermittent movement to the intermittent conveyor belts making up the conveyor 2. The drive is through a pair of cam followers 85–85' carried on projecting portions of an arm 87 pivoted on shaft 86. A further portion of arm 87 is connected through a link 88 to the end of an adjustable arm indicated at 90 pivoted about a shaft 89 to provide pivotal movement for an integral arm portion 90a of arm 90. Arm 90 is adjustable in length. An adjustable link 91 is pivoted to the upper end of arm 90a and connects at its other end in a pivotal manner with an arm 93 of an over running clutch 92. This drive movement for the over running clutch 92 is provided as indicated by the direction of the movement of the link 91, see drive arrow 92a and the direction of the dwell (wadding cutting) arrow 92b. The over running clutch 92 is mounted on a shaft 94 on which is fixed a gear 95 driven thereby which drives intermittently gears 96 and 97 with 97 meshing with a drive gear 98 mounted on a shaft 99. On shaft 94 is mounted a suitable drive pulley 100 which drives the lower endless belt 101 and on the upper driven shaft 99 is mounted a drive pulley 102 which drives the upper endless conveyor belt 103, the belts 101 and 103 being driven as indicated by the arrows for the intermittent conveyor 2. Suitable guide pulleys are provided for the upper and lower belts 103 and 101.

*Corner cutter*

Figure 6:
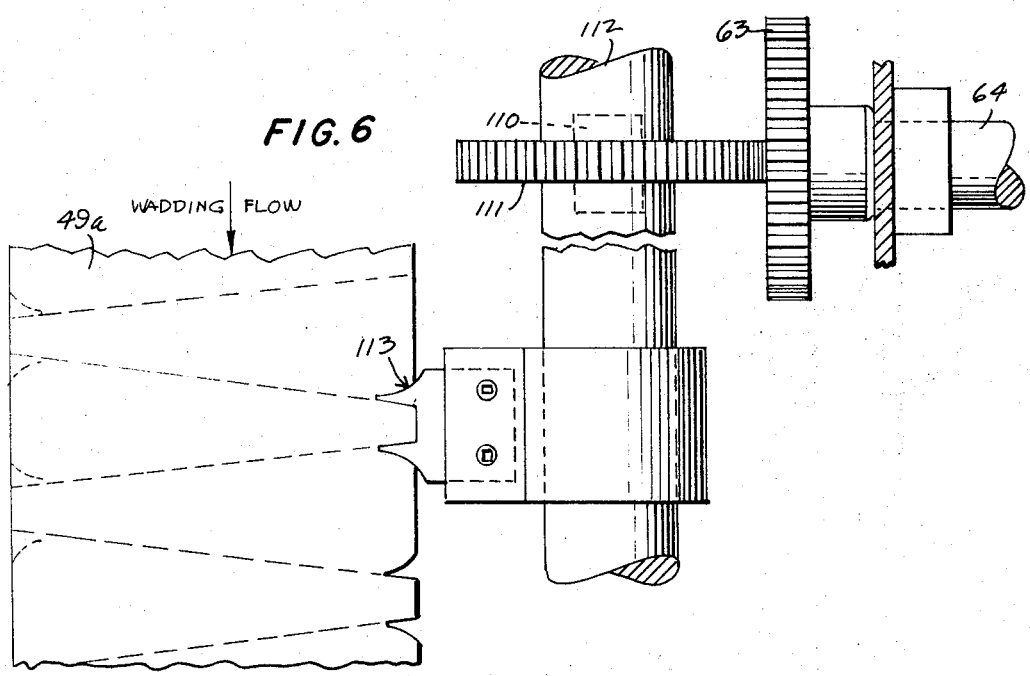
FIG. 6 is a fragmentary plan view of corner cutter.

Reference to FIGS. 6 and 7 shows one of the corner cutters 3 of which there are two oppositely disposed. The drive shaft 64 driven by gear 63 carries a gear 110 which drives a gear 111 on shaft 112. This shaft 112 has mounted thereon a corner cutter 113 which is rotated by shaft 112 and cooperates with a fixed die 114 mounted in the bed of the machine. The cutters 113 and 114 are positioned to one side of the upper pairs and lower pairs of conveyor belts 103 and 101 as shown in FIG. 7. In FIG. 6 the flow of the wadding sandwich 49a is shown and in broken line the outlines of the tapered pads that will be cut at station 4. It is to be noted that the corner cutter provides for a very small or negligible corner cut at the narrower end of the pad while a more pronounced curved corner is provided at the wider end of the pad.

*Wadding slitter and wadding clamp*

Reference to FIGS. 4 and 9 shows the two slitters each generally indicated at 120 as they are duplicates. In FIG. 4 the path of the respective slitters which are of a rotary type is shown as they pass through the on coming wadding 180° apart in the orbit path shown in FIG. 9, looking in the direction of flow of the wadding 49a which has now been cut as a pad p. When one of the slitters passes through the wadding sandwich, the wadding sandwich is stopped by the intermittent feed conveyor 2, as explained above, and is clamped in place, thereafter the clamp releases, the wadding advances and the other rotating slitter or blade passes through the wadding at another angle thereby cutting off a tapered pad. As the second pass or cut is made the clamp releases and the wadding advances and pushes the cut tapered pad onto the continuous running conveyor 5. In the upper portion of FIG. 9 it will be observed that the slitter is made to travel on a generally horizontal path in its orbit as will be explained.

Figure 11:
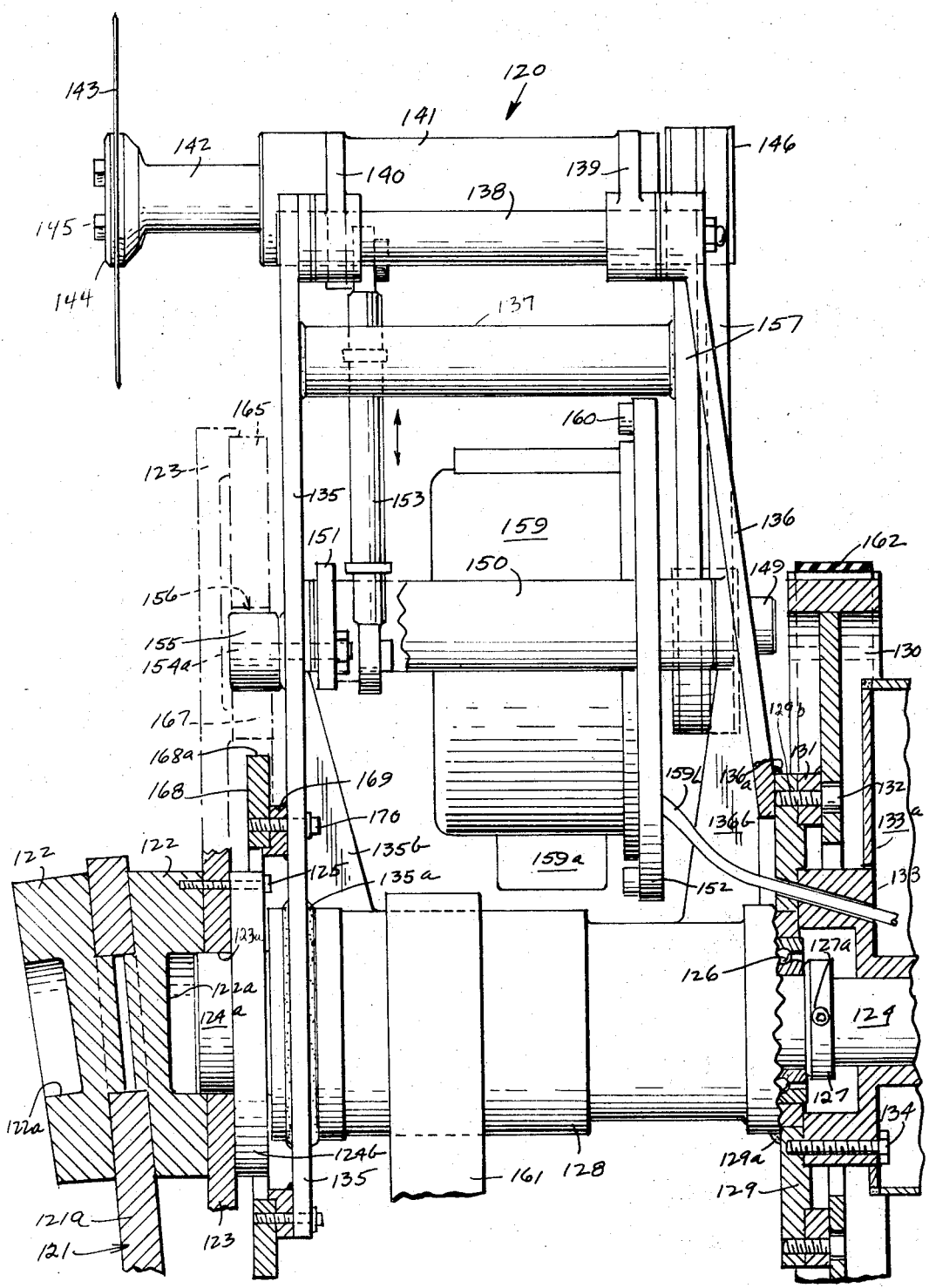
FIG. 11 is a plan view of the rear slitter in a horizontal attitude of its orbit and a fragmentary across sectional view of angular relationship of the main shafts about which each slitter orbits.

Reference is made now to FIGS. 8, 11 and 14 in particular where is shown a main frame support 121 in the form of an arm having a horizontal portion 121a and a vertical portion 121b. A pair of wedge-like shaped mounting members 122 are attached to the inner end portion of the main arm 121a and serve to each mount a back plate 123, the rear back plate 123 is described. A shaft assembly having an end boss 124a and an adjacent flange 124b is mounted with the boss 124a extending through an aperture 123a in back mounting plate with the boss 124a extending into a receiving pocket 122a of the wedge member. The flange portion 124b is held on by suitable cap screws 125. A bearing assembly 126 indicated in the lower right-hand portion of FIG. 11 is held on by a slip collar 127 secured by a set screw 127a. A similar bearing (not shown) is mounted at the other end of the shaft 124 adjacent the flange 124b and within the tubular housing 128. The tubular housing 128 is received over the bearing assembly 126 at each end. Received about the right-hand end of the housing 128 is an annular plate 129 secured by welding 129a to the tubular member 128. A drive pulley 130 has attached to its web as by welding an annular spacer ring 131 and the web is apertured as is the ring 131 to receive securing screws 132 which are threadedly received in suitable threaded apertures 129b in annular plate 129. A collector ring assembly 133 for feeding electrical power to the motor, to be described, surrounds the right-hand end of shaft 124 in FIG. 11 and is bolted by cap screws 134 to annular plate 129 which rotates with the tubular housing 128. Still referring to FIG. 11 and FIG. 10, a right-hand arm 136 having an annular inner portion surrounds the hub 128 and is welded as at 136a to the annular plate 129. The left-hand arm 135 while of the general shape of arm 136 as shown in FIG. 10 lies all in one plane, see FIG. 11, as contrasted to arm 136 which is bent in at its upper portion. Arm 135 has an aperture so that it fits over the left-hand end of tubular member 128 and is welded thereto as at 135a. Strengthening web portions 135b and 136b are provided for these arms as shown in FIG. 11. Adjacent the outer ends of the arms 135 and 136 there is welded thereacross a cross member 137 for strengthening purposes. At the outer end of the arms 135 and 136 is a connecting cross shaft 138 which serves as a pivotal mounting for a pair of arms 139 and 140. Adjacent the outer ends of the arms 139 and 140 is a cross connecting tubular housing 141 in which is rotatably mounted a shaft 142 having on its one end the circular cutter disc 143 which is secured by a plate 144 and suitable screws 145. At the other end of shaft 142 mounted in bearings, not shown, in tubular housing 141 is a double grooved pulley 146. The opposite from pivotally mounted end of the arm 140 has an integral extension 140a, see FIG. 10, for the connection of control linkage which will be described. The purpose of the mounting arms 139 and 140 for the cutter disc 143 is as shown in FIG. 9 to obtain the generally flat portion of the orbital path where the cutter discs cut the wadding.

Intermediate the ends of the arm 136 is a pivotal mounting 136c, see FIG. 10, for a cross shaft 149 which pivotally receives a tubular housing 150. The same pivotal mounting is also on arm 135, but is not shown. Mounted on this tubular housing 150 adjacent the arm 135 is an integral arm 151 and opposite to the mounting of the arm 151 at the other end of the tubular housing 150 is a circular plate 152 mounted in an integral manner with the tubular housing 150. Pivotally interconnecting the outer ends of the arms 140a and 151 is a link 153 whereby these arms move together as well as the tubular members 138 and 150. Adjacent the outer end of arm 151 is pivotally attached at 154 by a suitable pivot pin 154a a cam follower 155 which rides in a cam slot generally indicated at 156, see FIG. 12.

Rotation for the cutter disc 143 is provided by a pair of belts 157 leading to a pulley 158 on a motor 159 mounted by cap screws 160 on the arm-like extending plate 152. A counter weight arm generally indicated at 161 is fixedly attached to the tubular housing 128 and is oppositely disposed for balance purposes to the center of gravity of the rotating cutter assembly 120. These counter weights in the slitters show up better in FIG. 3. Rotation for the pulley 130 for the cutter assembly or slitter assembly shown in FIG. 11 is furnished through a belt 162 leading to an output drive pulley 163 from a gear box 164 driven by the drive shaft 34. A similar drive is provided for the other cutter assembly.

Reference to FIGS. 12 and 13 shows the cam track 156 as formed by an outer plate 165 having the outer surface of cam track 156 indicated at 165a formed therein and an inner cam plate 167 having the inner cam surface of the cam track 156 formed thereon as indicated at 167a. These plates are secured to the back plate 123 which is mounted as previously described in FIGS. 11 and 14. Again referring to FIG. 11 there is attached to the inner portion of the arm member of 135 a cam 168 for moving the wadding clamp to be described. This cam 168 has the track on the outer surface thereof as indicated at 168a. The cam 168 is an annular member attached to the arm 135 by an annular spacer 169 and cap screws 170. Access to this cam track 168 is through an aperture 123b extending through the back plate 123. A cam follower 171, see FIG. 14, cooperates with the track 168a and is mounted on a pin 172 extending through aperture 123b in plate 123 and connects with an arm 173 fastened to a hub 174 pivotally mounted on a pin 175. The pin 175 is supported at one end in an aperture in plate 123 and at the other end by an apertured plate 176 supported by spacers 177 from plate 123 and secured by cap screws 178. This is also shown in FIG. 8. The plate 176 extends in a suitable aperture in main support arm portion 121a. The hub 174 has rigidly attached thereto a pair of bifurcated arms 179 and 180, see FIG. 8, with a cam follower 181 on the outer end of arm 180 which rides on the cam surface 168a of cam 168 while the other arm 179 has pivoted thereto as at 179a a control rod 181 for raising the wadding clamp as will be described.

Power for the motor 159 is provided through a connection box 159a and power leads 159b, see FIGS. 10 and 11, which lead to slip rings mounted (not shown) on slip ring housing 133, previously described. A suitable cover 133a for slip ring housing is provided as shown for its end portion in FIG. 11.

*Wadding clamp*

A wadding clamp is generally indicated at 190 and it is under the control of the cam 168 on the slitter shaft 124 as previously described. An arm portion 121b is mounted on the arm 121 on a pivot post 182 on which is pivotally mounted a bell-crank lever generally indicated at 183 having three arm portions 183a, 183b and 183c. A rod 181 has an adjustable ball mounting generally indicated at 184 fitting in a socket 183a' on arm 183a so that the bell crank may be rotated counterclockwise by movement of rod 181. The clamp 190 is comprised of a bottom plate 185 as shown in the bottom view, FIG. 15, and in FIG. 8 and is supported by the machine frame 30 and on a vertical frame portion 186 of the machine frame 30. The clamp 190 has a built up framework 187 with an elongated void central portion 187a having various lighting holes 187b. The frame 187 has at each end narrow end portions 188 and 189 with portion 188 terminating in a vertical tubular sleeve portion 188a and the end 189 in a vertical tubular sleeve 189a. These sleeves 188a and 189a are received on vertical pins 191 which are attached by cap screws 192 to the bottom plate and by cap screws 193 to a top plate 194. There are four corner posts 191a similar to the vertical pins 191 and similarly attached to the bottom plate 185 and the top plate 194. On the bottom of the frame 187 is mounted spaced apart pressure plates 195 and 196, see FIG. 15, as by flush screws 197. Each of these plates 195 and 196 has an inclined edge half 195a and 195b on plate 195 and 196a and 196b on plate 196. These edges are spaced apart so that at the top of the orbital paths taken by the slitters 143, they fully clear the discs of the cutters but yet provide clearance and pressure on the wadding during the cut. The clamp or frame portion 187 is held down by two springs 198 extending at their tops where they are connected to frame 187 and anchored at their bottoms to the bottom plate 185. The frame 187 is held away from the wadding and pad cut therefrom in a correct clearance position by action of the bell crank 183 controlled by the rod 181 and the cam 168. The bell crank arm portion 183b presses up against a roller 199 pivotally mounted by a pin 200 extending up through a depending portion 187c of frame 187. Connected to the end of the bell crank portion 183c in a pivoted manner is the reach rod 201 which connects at its other end in a pivotal manner to an arm 202 attached to a tubular member 205 pivotally mounted on a transversed shaft 203 which is mounted on a pair of spaced apart arms 204 depending from the top plate 194. Another arm 206 is integrally attached to tubular member 205 and the upper portion of its outer end presses against a horizontally disposed transverse lug portion 207 on frame 187. Thereby the two arms 183b and 183c of the bell crank 183 act together to push up the frame 187 against the tension springs 198 pulling the frame down.

*Pad conveyor from slitter*

Figure 17:
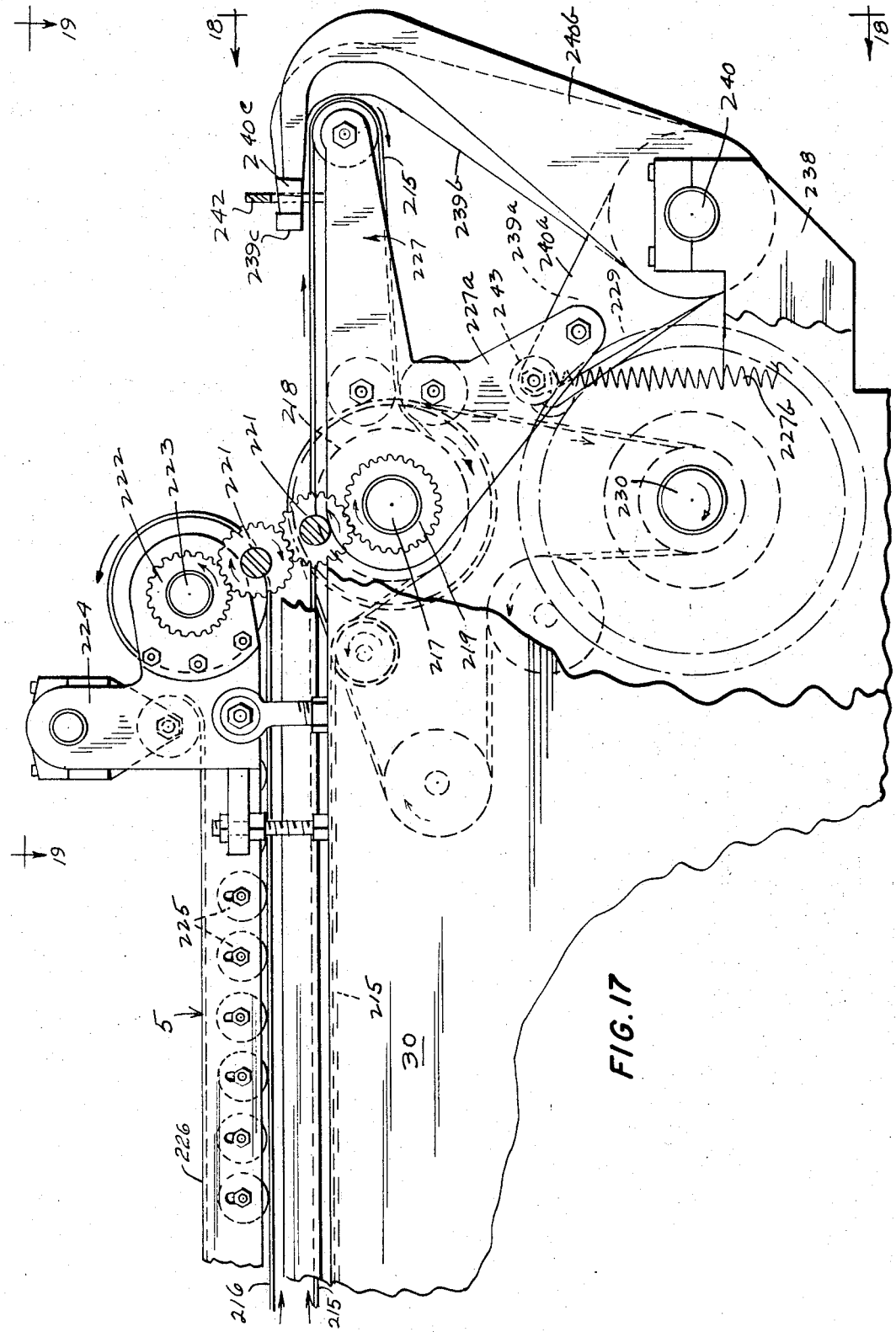
FIG. 17 is a fragmentary side elevational view along line 17—17 of FIG. 4 of the continuous running pad conveyor and station for transverse transfer of pad on an enlarged scale.
Figure 18:
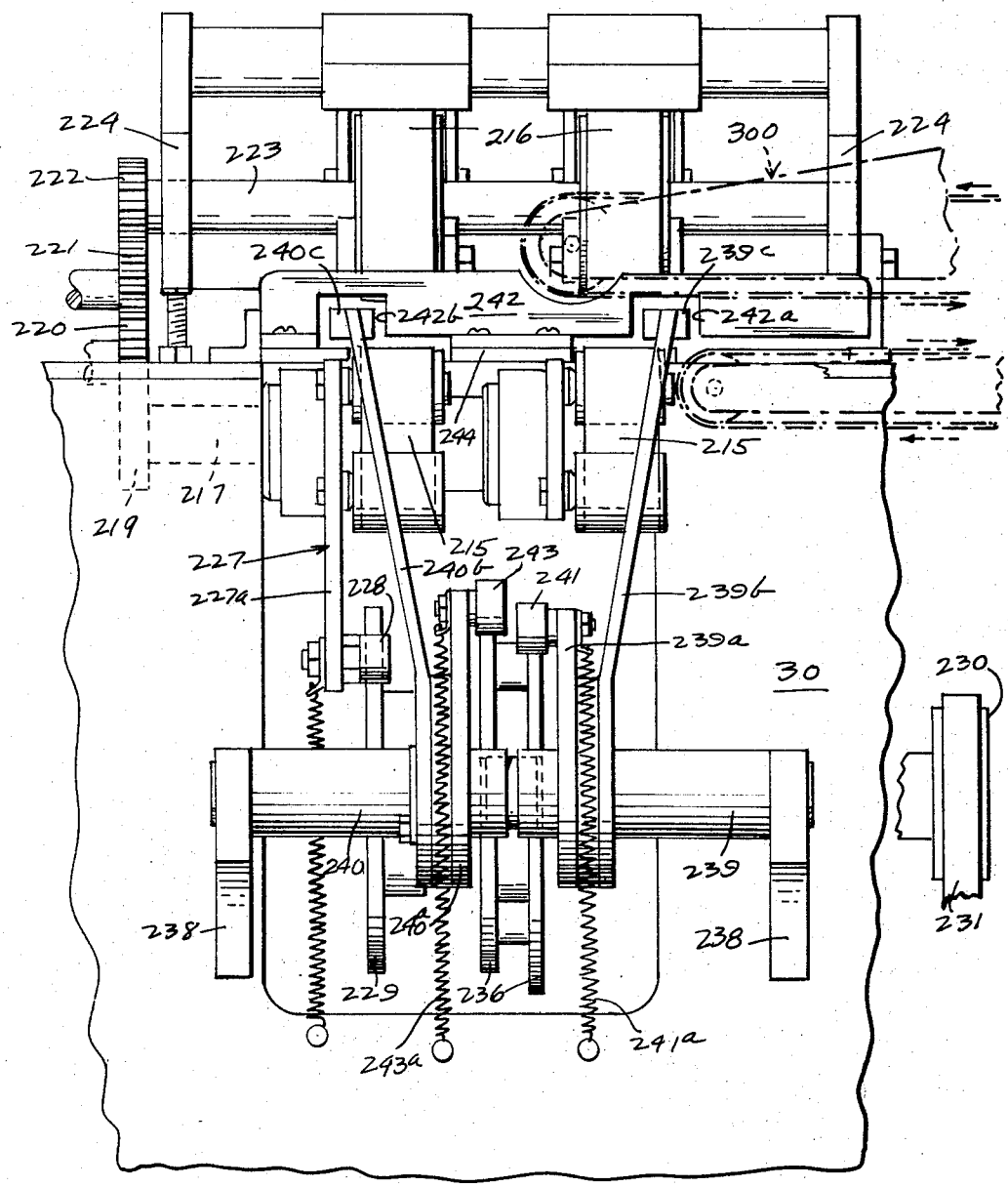
FIG. 18 is an end view of the apparatus along line 18—18 of FIG. 17.
Figure 19:
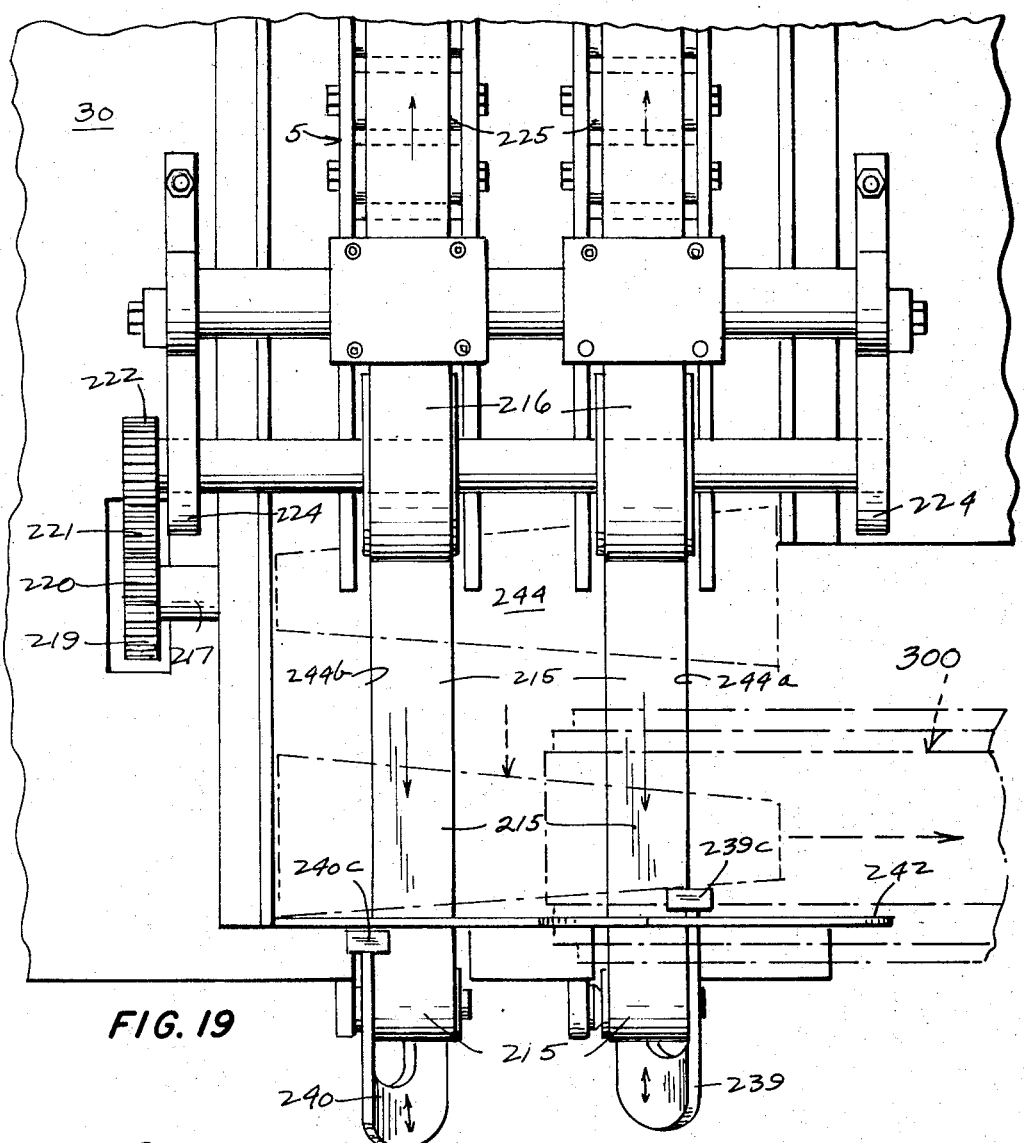
FIG. 19 is a fragmentary top view of the apparatus in FIG. 17 along line 19—19.
Figure 20:
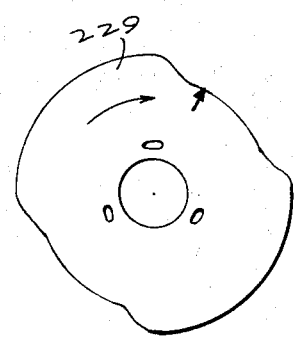
FIG. 20 is a view of the left-hand cam in FIG. 18 for moving the other end of the lower conveyor belts of FIG. 17 up and down.

The continuous running conveyor 5 that takes the pads from the slitter 4 is shown in FIGS. 1, 3, 17, 18 and 19. The pads are spaced about 4½" apart as illustrated in FIG. 1. This conveyor is similar to the intermittent conveyor 2 feeding the wadding to the slitter 4 but runs continuously. The conveyor 5 has a pair of lower spaced apart endless belts 215 and an upper pair of endless belts 216. The lower belts 215 are driven by a pulley 218 on a driven shaft 217 which extends across the machine frame 30. Shaft 223 is mounted in a pair of brackets 224 which are adjustably mounted. A plurality of pressure rollers for the lower pass of upper belt 216 are indicated generally at 225 suitably mounted in a frame 226, There is pivotally mounted about shaft 217 a pair of interconnected arms generally indicated at 227 which carry suitable idler rollers and over which the lower belts 215 are led to carry the pads. The near one of these arms as shown in FIG. 17 and as the left arm in FIG. 18 has a depending portion 227a with a cam follower 228 for cooperation with a cam 229 mounted on a driven cross shaft 230. The shape of cam 229 is shown in FIG. 20. A spring 227b attached to arm 227a holds cam follower 228 against its cam 229.

The cross shaft 230 is driven from the opposite side of the machine from FIG. 17, as shown in FIG. 3, by a belt 231 passing over a pulley on shaft 230 and leading to a drive pulley 233 on shaft 40 of gear box 39. The belt 231 passes over various other pulleys. The shaft 217 has a pulley 234 thereon and over this pulley passes a drive belt 235 leading to a pulley (not shown) on shaft 230 behind pulley 232. Belt 235 also passes over certain other pulleys.

Figure 21:
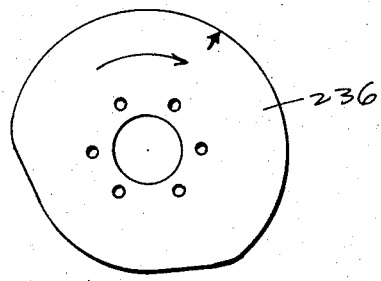
FIG. 21 is a view of the other two cams in FIG. 18 for alternately operating the stop fingers.

On shaft 230 is mounted two additional cams 236, the shape of which is shown in FIG. 21. These cams 236 are mounted on shaft 230 in a 180° orientation with respect to each other. A pair of bearings and supports 238 are mounted on the end of machine frame 30. These bearings support two axially aligned but separately rotatable shafts 239 and 240, sleeved together at their adjacent ends but separately rotatable. Shaft 239 carries fixed thereto a cam arm 239a having a cam follower 241 thereon which rides on cam 236. Shaft 239 also carries fixed thereto an upwardly extending hooked shaped finger 239b which extends up over the adjacent top run of the lower conveyor belts 215 and terminates in a transverse pad stop 239c. This pad stop projects through an opening 242a in a fence 242. A like cam arm 240a is attached to shaft 240 and it has a cam follower 243 thereon riding on cam 236. A further finger 240b like 239b is attached to shaft 240 and it has a pad stop 240c on its upper end where it passes through another opening 242b in fence 242 adjacent and above the upper rim of the other lower conveyor belt 215. The respective cam followers 241 and 243 are held in contact with their respective cam plates by springs 241a and 243a.

The purpose of the fence and the pad stops 239c and 240c is to provide a stop for the tapered pads which are delivered by the lower belts 215. It is essential that the longitudinal axis of each pad remain in an altitude transverse of the axis of the delivery belts 215 and 216 at a fixed reference stop position so that each successive pad may be moved transversely to the axis of belt 215 in an in line, one behind the other, altitude as shown in FIG. 19.

The belts 215 move in slots 244a and 244b in a bed plate 244. The pads are delivered to the fence 242 and alternately positioned stops 239c and 240c by the belts 215 and rest on same and on the bed plate 244. The outer ends of the belts 215 supporting the pad at the stopped position of the pad are pivoted downward by the action of the arms 227 in a timed manner by the cam 229 so that the pad is left resting on portions of the bed plate 244 and is then moved transversely by a pad take-off conveyor 300 to be described, see FIGS. 18 and 19.

*Transverse feed of pad conveyor*

In FIG. 22 a transverse feed pad conveyor is indicated generally at 300. A framework 301 pivotally mounts at 302a, see FIG. 23, a pair of upper arms 302 and pivotally spaced below there is also mounted on the lower part of frame 301 a pair of lower arms 303 at pivot 303a.

This framework 301 is suitably mounted on the whole transverse machine frame generally indicated at 299 as is the displacement, wrap folder, tab forming and folding mechanisms to be described. The rear ends of these arms about their pivoted mountings 302a and 303a are each formed with a tooth portion 302b and 303b, see FIG. 23, and between the teeth is a cam element 304 so that downward pivoted movement of the lower arm 303 imparts pivotal upward movement to the upper arm 302 and vice versa. These arms are connected by a tension spring 305. The upper arms 302 have a forward pulley 302c and a rearward pulley 302d mounted therebetween. The lower arms 303 have a forward pulley 303c and a rearward pulley 303d. A driven pulley 306 is mounted on a drive shaft 306' in the upper part of frame 301. A take up idler pulley 307 is also mounted in the upper part of frame 301. Passing over the upper arm pulleys 302c and 302d and the pulleys 306 and 307 is an endless conveyor belt 302e.

The lower portion of frame 301 has mounted thereon over which a lower endless conveyor belt 303e is led, a lower driven pulley 308 on a drive shaft 308', idler pulleys 309 and 310 and a take up idler pulley 311 mounted on arm 312 pivoted at 312a. The lower arm 303 has a cam follower 303f thereon which rides on a cam 313 mounted on a shaft 314. A tension spring 315 attached to lower arm 303 holds the cam follower 303f against its rotating cam 313.

The action of the cam 313 is to impart opening and closing of the conveyor belts 302e and 303e on a pad to transfer it in equal spacing to a displacement mechanism for proper spacing to eventually, after applying the wrap, to provide a long tab at the narrower ends and shorter tab at the wider end.

FIG. 24 shows a graph that is illustrative of the relative movement of the pad transferred by pad feed conveyor 301. The graph has velocity of pad transfer plotted against time of movement of one pad. The purpose is to grasp a pad while the belts 302e and 303e are stopped, move it at high speed by first fast acceleration followed by deacceleration and then delivering it to the displacement mechanism, to be described, at the same speed as that of the displacement mechanism and then to stop to grasp another pad.

Intermittent drive for pad feed conveyor

An intermittent drive mechanism 320, see FIG. 22, provides the drive for the drive pulleys 306 and 308 of the upper belt 302e and the lower belt 303e respectively of the pad feed conveyor 300. In FIG. 27 there is shown in diagrammatic form how the intermittent drive of pad feed conveyor 300 is carried out. A driven gear 321 having internal teeth drives a pair of planetary gears 322 and 323 pivotally mounted on an arm 324. These gears 322 and 323 drive a sun gear 325 mounted therebetween on arm 324. In order to speed up or slow down the drive of driven gear 325 which is used to drive the pulleys 306 and 308, as will be explained, the arm 324 may be rotated about its center pivot, the center of gear 325, by a lever arm 326 fixed to gear support arm 324. This lever arm 326 has a pair of cam follower 327 on the outer end thereof, see FIG. 25, which follow conjugate cams 328 that make one revolution per pad transferred by pad conveyor 300. Rotation of the arm 324 in the direction of rotation of gear 321 speeds up the drive of sun gear 325 and rotation of the arm 324 in the opposite direction and slows down the drive of sun gear 325. The action imparts velocity to the belts 302e and 303e as shown in FIG. 24. During grasping of the pad the belts are stopped.

The drive for gear 321 is through a constant speed shaft 329, see FIGS. 22, 25 and 26, mounted in bearings 330 and 331 in a casing 332. The shaft has mounted thereon the conjugate cams 328 which are thereby driven at constant speed. Shaft 329 has a gear 333 thereon which drives an annular gear 321 fixed to gear 334 by a mounting plate 335 to which gear 321 is attached by cap screws 336. Mounting plate 335 is mounted on a tubular sleeve 337 supported by bearings 338 on output shaft 339. Output shaft 339 is supported in casing 332 by bearings 340 and 341. Suitable spacing sleeves 342 and 343 are provided on shaft 339. Sun gear 325 is fixed on output shaft 339 and is driven, as described above, by the planetary gears 322 and 323 which are mounted on arm 324 by their pivot shafts 322' and 323'. Arm 324 freely pivots about the center of output shaft 339 and is fixed to arm 326 by a connecting sleeve 324'. By design of conjugate cams 328 movement of planetary gears 323 and 322 on arm 324 can be adjusted so that they are moving on arm 324 with respect to annular gear 321 so that they will not impart a turning of sun gear 325 with which they mesh and thus the rotation of shaft 339 is stopped. Shaft 339 through proper drive described below drives belts 302e and 303e. The drive of input shaft 329 of the intermittent drive mechanism 320 will be explained later.

The output shaft 339 of intermittent drive mechanism 320 has a pulley 344 which drives a belt 345 passing over a pulley 346 fixed on shaft 306' that drives pulley 306 driving upper conveyor belt 302e and a pulley 347 on shaft 308' that drives pulley 308 driving lower conveyor belt 303e of the pad feed conveyor 300. A take-up idler pulley 348 for belt 345 is suitably mounted in the lower portion of frame 301.

Pad displacement

A pad displacement mechanism 350 receives the pads with equal spacing therebetween from pad feed conveyor 300 over a suitable bridge table portion 351. The displacement mechanism 300 provides proper spacing and transfers the pads to a wrap web on which is carried in proper spaced relation a mask for each pad. The wrap and mask are subsequently properly folded over the pad and tabs are formed as will be described later. The purpose of this displacement mechanism 350 is to provide certain variable spacing for the pads. With tapered pads the narrow ends in the finished wrapped pad are to have the longer tab while the wider ends have the shorter tab. Such spacing of the pads is shown in FIG. 28a.

The displacement mechanism 350 has an endless belt 352 having a horizontal run 352a constituting a first run on which the oncoming pad is carried. A framework 353 supports idler pulleys 354 and 355 for the horizontal run 352a of the belt. A constant speed shaft 356 has fixedly mounted thereon pulley 357 over which the belt 352 is led and driven at constant speed. A large pulley 358 and a smaller pulley 359 are also fixedly mounted on shaft 356. A pivot shaft spaced below shaft 356 and suitably supported on frame 299 has fixedly mounted thereon a generally horizontally extending displacement arm 361 on the opposite ends of which, constituting a first arm and a second arm thereof, are pivotally mounted by pivot pins 362' and 363' idler pulleys 362 and 363 over which the belt 352 is further trained. The conveyor endless belt 352 has a second run between pulleys 362 and 354 and a third run between pulleys 355 and 363. A triangular shaped arm 364 pivoted at 365 on the machine frame 299 has take-up rollers 366 and 367 mounted thereon for belt 352. Another arm 368 pivoted at 365 has mounted on its upper end a take-up and idler roller 369 also for the belt 352. These arms 364 and 368 are suitably biased by means (not shown) so that the rollers supported thereby are in contact with belt 352.

Also fixedly mounted on shaft 360 are arcuate arms 370 and 371 which extend downwardly and outwardly in opposite directions. The arms are considered as secondary arms to the first arm portion of arm 361 which lies between pivot 360 and pulley end 362 and second arm portion which lies between pivot 360 and idler pulley 363. Arm 371 is positioned behind arm 370 on shaft 360. Arm 370 has a cam follower 370a rotatably mounted on its lower end and arm 371 has a like cam follower 371a rotatably mounted on its lower end. Arms 370 and 371 are considered as secondary arms to the arm portions of arm 361 as they are so fixed to move therewith.

A shaft 372 is mounted in the machine frame 299 below shaft 360 and fixedly mounted thereon is a first cam 373 to drive cam follower 370a and behind it on shaft 372 is fixedly mounted a second cam 374 to drive cam follower 371a. These cams 373 and 374 are conjugate cams for their respective cam followers. Also fixedly mounted on shaft 372 are pulleys 375 which drive this shaft 372 and a pulley 381 to drive mechanism 420 to be described.

The operation of the displacement arm 361 when rotated by shaft 360 in turn rocked by cam followers 370a by cam 373 and cam follower 371a by cam 374 is to decrease the speed of displacement conveyor belt 352 when the pulley 362 and its arm 361 moves downward to effectively lengthen the belt on that side. The reverse of this occurs, that is, to increase the speed of the displacement conveyor belt 352, cam follower 371a and arm 371 are moved downward or clockwise, which in effect adds to the speed of the displacement belt 352, which is being driven at constant speed by pulley 357. This action of displacement conveyor belt 352 positions thereon the pads in the spacing as shown illustratively in FIG. 28a with the narrow ends far apart and the wider ends relatively closer together. The pads leave the displacement mechanism 350 at the same speed of the conveyor in folder mechanism 400.

Drive for pad feed conveyor 300 and pad displacement mechanism 350

An extension of an end of the main drive shaft 34 is shown spaced below shaft 372 in FIG. 22. A pulley 377 is fixed on main drive shaft 34 and a belt 376 led thereover passes over and drives large pulley 358 mounted on and driving shaft 356 and comes back to pulley 377. A serpentine belt 378 driven by pulley 359 on shaft 356 extends to the left in FIG. 22, over guide pulleys 379 and 380 mounted on machine frame 299, over pulley 314a on shaft 314 to drive it, downward over pulley 329a to drive the shaft 329, then it passes to the right over pulley 375 which drives shaft 372 and thence back to pulley 359 by which it is driven. Another pulley 381 on shaft 372 is used to drive further mechanism 420 as will later be described.

Wrap and mask applying to pad and folding

A wrap and mask of pad applying and folding mechanism generally referred to as folder is indicated at 400. It has a suitable framework 401, table 402 and subframing 403 with supports for the various mechanism.

The pads leaving the displacement mechanism 350, pass over a bridge plate 404 onto an endless conveyor 405, diagrammatically shown, in folder table 402. The pads leaving displacement mechanism 350 enter upon a piece of mask properly positioned on the wrap web 407 carried by the conveyor 405 which travels at the same speed as the pad leaves the displacement mechanism 350.

Reference is made to FIGS. 29, 30 and 31. FIG. 29 is in more detail than FIG. 30 showing the same apparatus. A roll of non-woven gauze wrap 406 is supported on frame 401 and the web of wrap 407 is pulled therefrom over a guide roll 408 rotatably mounted in the table 402, over a nip roll 409, under a web drawn roll 411, past a vacuum device 414 to hold a piece of mask on the web, as will be described, and onto conveyor belt 405 in the folding table. The nip roll 409 is supported by an arm 410. A driven variable pitch sheave 413 is mounted on shaft 412. This variable pitch sheave 413 is necessary in order to drive the web draw roll 411 with respect to the speed of the folding table conveyor 405 so as to apply proper tension to the wrap 407 that proper folding may take place.

A mask piece is provided for each pad so that the edges of the pad are properly masked. These pieces 416a have to be broken from the mask web and properly spaced along the wrap 407 so as to receive the pad as fed from the displacement mechanism 350 to the folder 400. A roll of mask 415 has a web of mask 416 led therefrom over an endless belt 417 to a feed roll 418 which has a nip roll 418a cooperating therewith. The mask web on leaving the feed roll 418, converges toward the wrap 407 on wrap draw roll 411 and passes over a variably driven breaker roll 419 which periodically is pivoted on its mounting, as will be explained, to squeeze the mask against the wrap on roll 411 to cause the mask to break at the nip of the rolls 411 and 419 and thus the pieces of mask 416a which are equal to the length of a pad, which is about 9 inches, are formed and spaced on the wrap 407. The piece of mask 416a spaced on wrap 407 is held onto the wrap by the suction applied by the vacuum device 414 over which the wrap passes on its way to the folder 400. The fibers of the textile material of which the mask is made cling to the non-woven gauze wrap after it passes the vacuum device 414 where the mask it married to the fibers of the non-woven gauze wrap.

Drive of wrap draw roll, variable feeding of mask web and drive of mask breaker roll A drive for the wrap draw roll 411 and variable speed drive for feeding the mask is generally indicated as drive mechanism 420 shown in FIGS. 22 and 32. Drive mechanism 420 has a fixed pivot shaft 421 mounted on the side of the machine frame portion 299a and on this shaft 421 is rotatably mounted a driven pulley 422 having a hub 422a received on shaft 421. The hub 422a carries affixed thereto a gear 423. A mounting plate 424, see FIG. 32, is suitably mounted for rotation about shaft 421 and it carries a fixed shaft 425 spaced from shaft 421 and on which is rotatably mounted a gear 426 having a hub 427 on which is affixed a drive pulley 428. An adjustable screw link rod generally indicated at 429 in FIG. 22 is pivotally connected at its lower end 429a to the machine frame portion 299a and at its upper end 429b it is threadedly received in screw fittings generally indicated at 430 on mounting plate 424, see FIG. 32. The pulley 428 is connected by a belt 431 to the variable pitch sheave 413 driving shaft 412 and wrap draw roll 411. Thus, the link rod 430 rotatably adjusts the position of mounting plate 424, as shown in FIG. 22, where two extreme positions are drawn, to rotate drive pulley 428 and adjust the pitch of sheave 413 to apply the desired tension on the wrap so that proper folding takes place.

The rest of the drive mechanism 420 which is its variable drive portion will now be described. This variable drive portion is used to drive the mask feed as will be described. Pulley 422 rotating about shaft 421 is driven by a drive belt 432 leading to pulley 381 on shaft 372 as shown in FIG. 22. The face 422b, see FIG. 32, of pulley 422 opposite from the gear 423 has a cam follower pivot pin 433 mounted thereon radially out a distance from the center of pulley 422. On the pin 433 is rotatably mounted a cam follower 434. This cam follower 434 rides in a radially extending slot 436 in a timing belt pulley 435 rotatably mounted on a shaft 437 mounting in casing 438. A mask feed timing belt is driven by timing belt pulley 435. Shaft 437 is parallel to shaft 421 and offset therefrom as shown in FIGS. 22, 28 and 32. Thus, the pulley 422 which is driven at constant speed drives timing belt pulley 435 at a variable speed for feeding the mask as will be pointed out by reference to FIGS. 28 and 28a.

The center of shaft 437 is shown in FIG. 28 and the effective slot 436 of timing belt pulley 435, whose center is the center of shaft 437, is represented as a slot in the arm 435a illustrated. The cam follower 434 is illustratively shown riding in the slot 436 and as cam follower 434 rotates about the center of shaft 421 at constant speed, it moves from full line position, at the left, through an angle A', to its second position, at the right, shown in broken line. This angle A' corresponds to the spacing A between the centers of pads X and Y whose narrow ends are towards each other with wide spacing for the long tabs to be formed from the wrap of the pads. The cam follower 434 in transiting through the angle B', smaller than A', moves from broken line position back to full line starting or first positition. This angle B' corresponds to the spacing B between pads designated Y and X' in FIG. 23. The pads Y and X' have their wider ends spaced adjacent each other to provide for the shorter tabs to be formed from the wrap. Thus, the mask web 416 is fed by the action of timing pulley 435 so as to have the same spacing of the mask pieces 416a as the pads are received from the displacement mechanism 350. The sum of the angles A' and B' is 360° which is a complete cycle. The first and second positions of the cam follower 434 illustrated diagrammatically in FIG. 28 are "critical points" or "point of breaking" for the mask 416.

Figure 34:
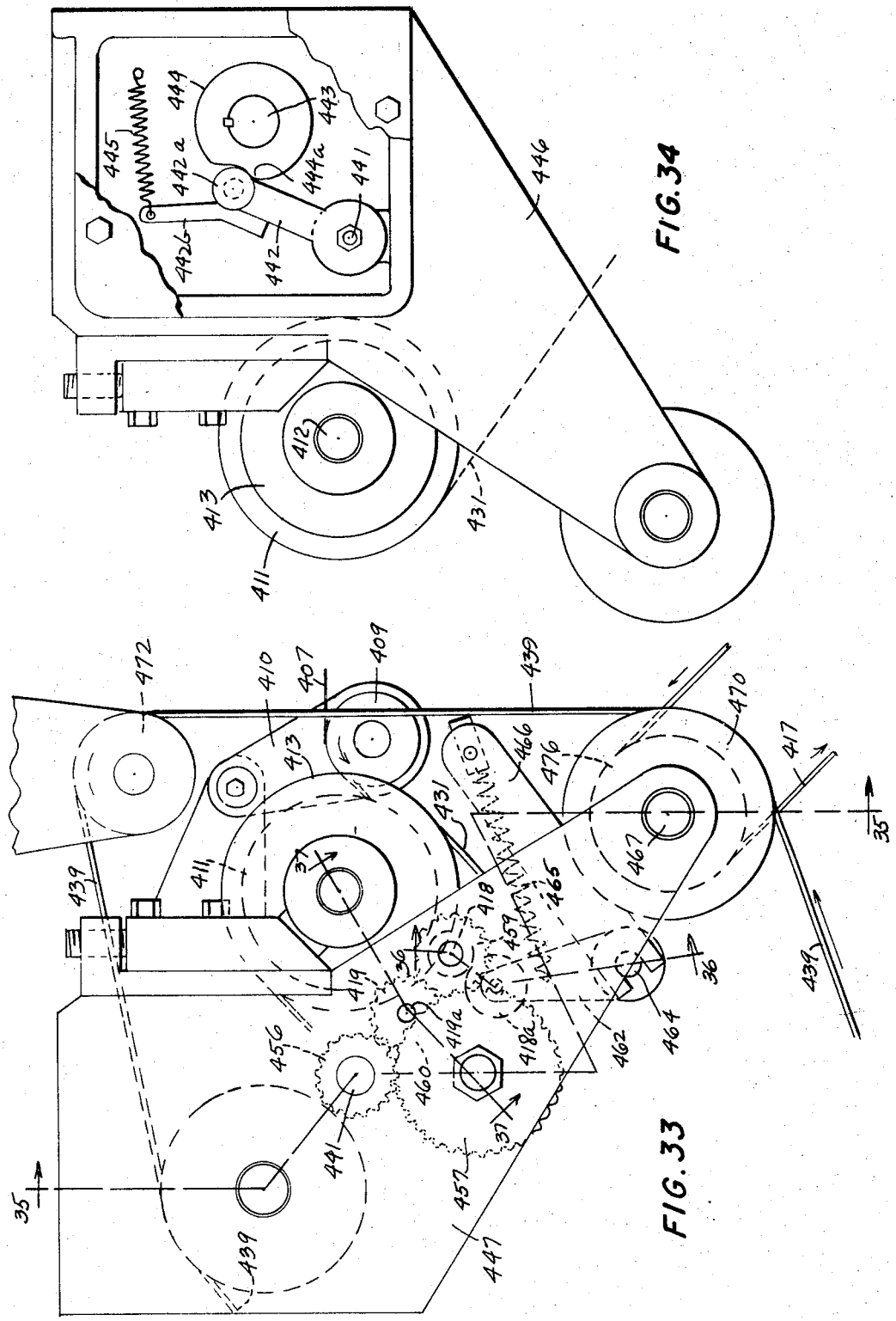
FIG. 34 is a further elevational view of the mask severing mechanism as viewed from the rear of FIG. 33 but with certain parts omitted from FIG. 33.

The breaker roll 419 is pivotally mounted on the outer ends of a pair of arms 440, illustratively shown in FIG. 29, fixed to a shaft 441. Another arm 442 is fixed at one end to shaft 441 and has a cam follower 442a at its other end. This arm 442 rocks shaft 441, see FIG. 34. Cam follower 442a on arm 442 rides on a cam 444 keyed to rotating shaft 443. The rocked arm 442 has a bracket 442b fixed thereto and this bracket has a tension spring 445 attached to its end and anchored in subframing 403 so that the cam follower 442a rides on a cam 444.

Reference is made to FIGS. 33, 35, 36 and 37. The subframing 403 includes end plates 446 and 447. Shaft 441 is mounted in bearings 448 and 449 in the respective end plates 446 and 447. Shaft 443 is mounted in bearings 450 and 451 also mounted in the end plates. On the other end of shaft 443 from the end mounting cam 444 is a drive pulley 452 and a gear 453. Rotatably mounted on the other end of shaft 441 from arm 442 is an idler cluster of gears 454, 455 and 456 which rotate together as a unit. Gear 453 meshes with gear 454 located intermediate gears 455 and 456. Gear 456 drives an intermediate gear 457 mounted on a shaft 458 supported on end plate 447. This intermediate gear 457 meshes with a gear 459, see FIG. 36, fixed to a shaft end 418b of mask feed roll 418.

Cluster gear 455 meshes with a gear 460 on the end of a mounting shaft 419a to which breaker roll 419 is fixed. It will be noted that the drive gear 460 for the breaker roll 419 meshes with its drive gear 455 of the cluster of gears on shaft 441 about which the arms 440 rotate that supoprt breaker roll 419. Thus, the breaker roll continues to be rotated while it is rocked into and out of contact with the warp feed roll 411 to break the mask 416 to form pieces of mask 416a.

Figure 33:
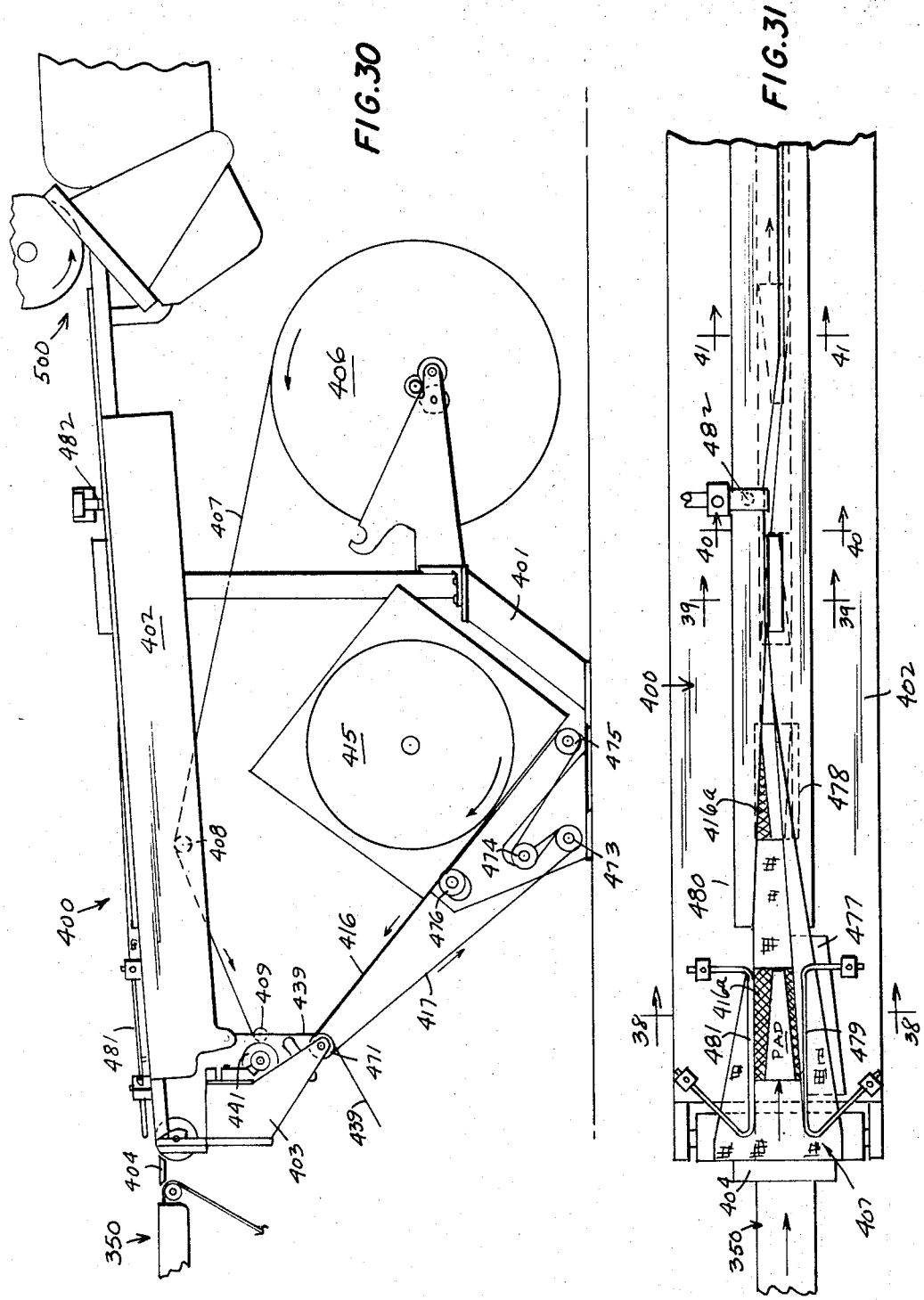
FIG. 33 is a side elevation of the mask web feeding and severing mechanism.
Figure 36:
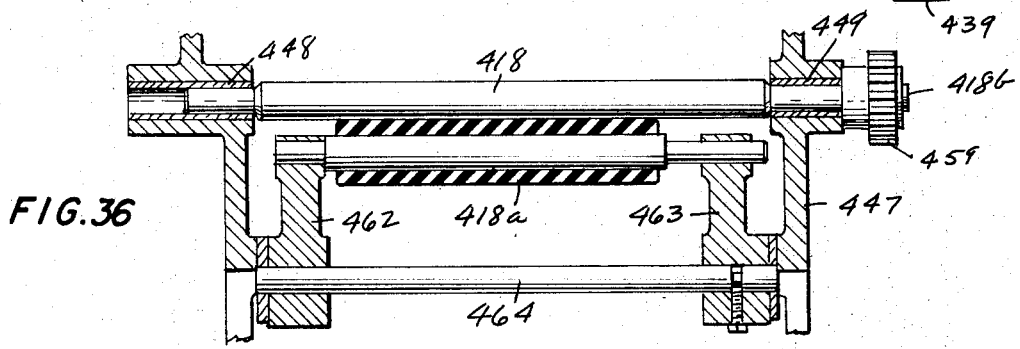
FIG. 36 is a sectional view along line 36—36 of FIG. 33.
Figure 37:
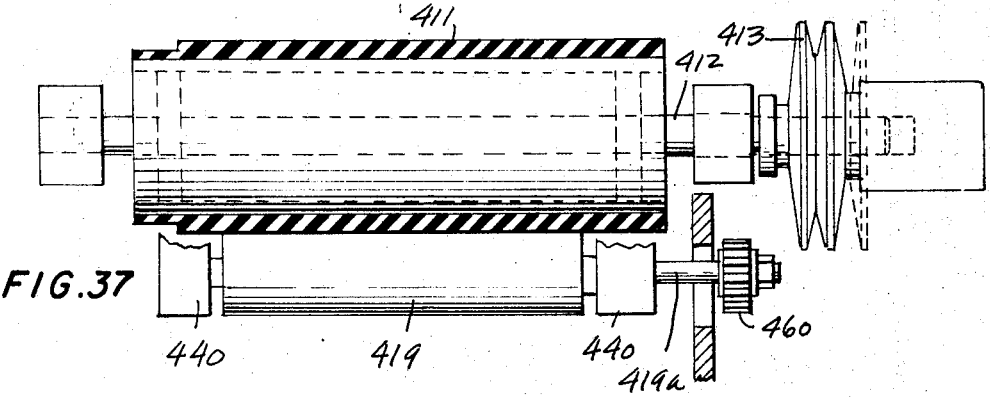
FIG. 37 is a sectional view along line 37—37 of FIG. 33.

In FIGS. 33 and 36 there is shown the mounting of the breaker nip roll 418a on a pair of arms 462 and 463 rotatably mounted on a shaft 464. A tension spring 465, see FIG. 33, is attached to breaker nip roll supporting arm 462 and leads to the outer end of an arm 466 whose lower end is bifurcated and pivotally mounted on shaft 464.

Figure 35:
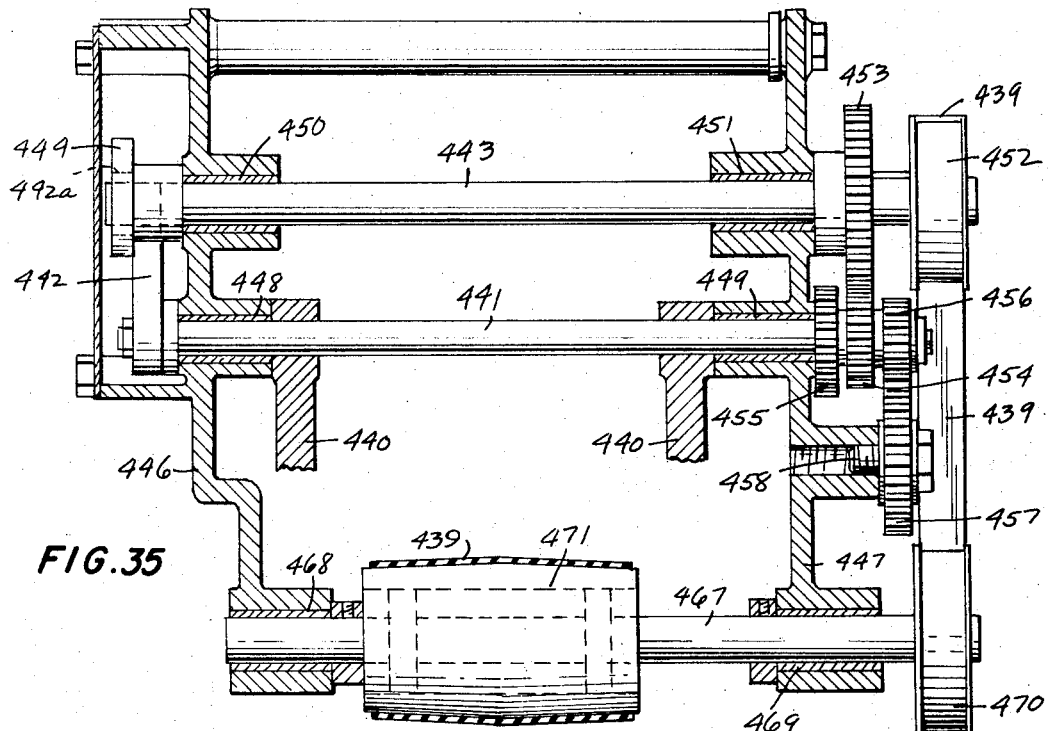
FIG. 35 is a sectional view along line 35—35 of FIG. 33.

In FIGS. 33 and 35 there is shown a shaft 467 mounted in bearings 468 and 469 in the respective end plates 446 and 447. Shaft 467 has a first pulley 470 thereon that drives the shaft and a second pulley 471 which is driven by shaft 467 to drive a mask feed conveyor 518 to be described.

The mask feed timing belt 439 leaves the variably driven mask feed timing belt pulley 435 of the drive mechanism 420, and passes over and drives pulley 470, an idler pulley 472 mounted on frame 402, pulley 452 and back to variable speed mask drive pulley 435.

The mask web 416 is fed by roll 418 onto the wrap 407 as the mask web passes over the breaker roll 419. It progresses to a distance beyond the breaker roll equal to the length of a pad and is held against the wrap by the suction from vacuum device 414. The breaker roll 419 moves into tight engagement with the wrapper at draw roll 411 when the control cam follower 442a, see FIG. 34, moves into the recess 444a of rotating cam 444 and this breaks the mask at the nip of rolls 411 and 419. At the time of break of the mask, the breaker roll 419 has been brought up to the speed of the wrap draw roll 411. Thus, successive pieces of mask 416a, see FIG. 29, are carried along in proper spaced positions by the wrap 407.

In FIG. 29 there is shown diagrammatically the endless drive belt 417 for mask parent roll 415. This endless conveyor belt 417 and its guide and take-up pulley is shown in more detail in FIG. 30. The belt 417 leads from drive pulley 471 to a first bottom guide pulley 473 mounted in frame 401, over take-up pulley 474, next over a second bottom guide pulley 475 where it passes in at mask roll 415 engaging run to pulley 476 and on back carrying the mask web to its drive pulley 471.

*Folding of wrap and mask over pad*

Referring to FIGS. 30 and 31 there is shown the tapered pads being received on the mask pieces 416a spaced on the wrap 407 fed by the top run of conveyor belt 405 passing along table 402. The folding action in folder 400 is conventional and is thus typically illustrated. The table 402 includes gradually upward in the direction of flow to a tab shaper.

The right-hand side of the wrap is folded over first by two successive folder members 477 and 478. A rod member 479 holds the wrap against the folder 477 over which the wrap 407 is draped.

The left-hand side of the wrap 407 is folded over slower than the right-hand side over which it overlaps. A left-hand folder assembly is indicated generally at 480 and as the wrap passes over at its entrance end it is guided thereagainst by the rod member 481.

The pads have the wrap and mask pieces folded thereover as shown more in detail in sections in FIGS. 38, 39, 40 and 41, taken along FIG. 31.

Figure 38:
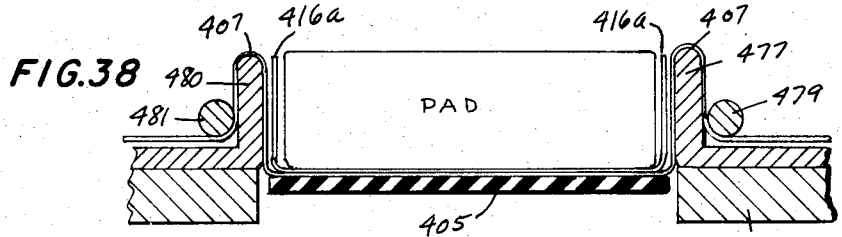
FIG. 38 is a cross sectional view of the pad with mask and wrap being folded as viewed along line 38—38 of FIG. 31.

In FIG. 38 the tapered pad is shown supported on the wrap 407 and mask piece 416a carried by belt 405 and the action of the folders 477 and 480 is illustrated.

Figure 39:
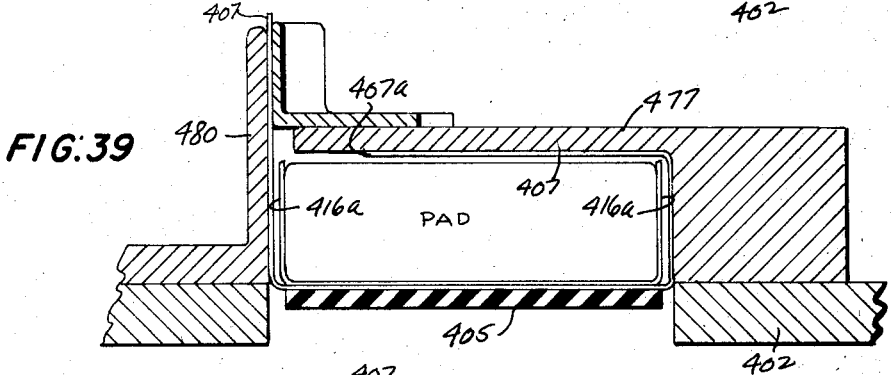
FIG. 39 is a cross sectional view of the wrapping of the pad taken along line 39—39 of FIG. 31.

FIG. 39 is a section further down the fold line showing the right-hand fold completed and extending beyond the center line with the right-hand end of the mask indicated at 407a.

Figure 40:
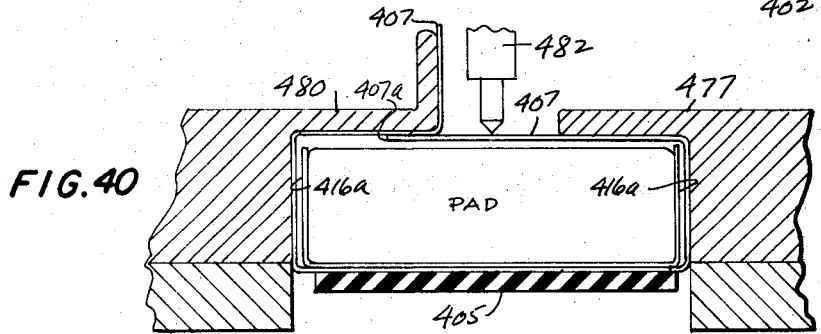
FIG. 40 is a cross sectional view of the wrapping of the pad along line 40—40 of FIG. 31.
Figure 41:
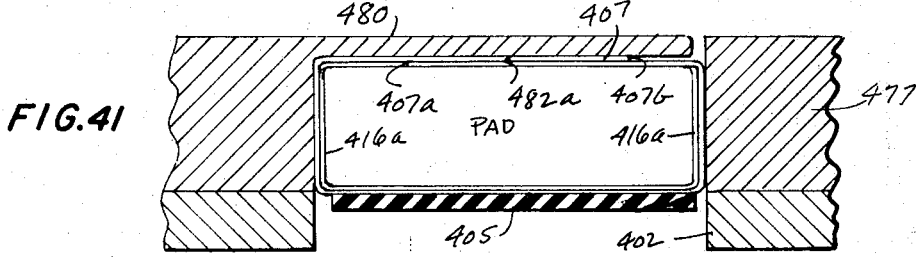
FIG. 41 is a further cross sectional view of the wrapping of the pad along line 41—41 of FIG. 31.

In FIG. 40, as in FIG. 31, a dispensing nozzle 482 is shown applying a suitable thermoplastic adhesive, preferably colored, to the top of the right-hand fold of the wrap. In FIG. 41 the left-hand folder 480 is shown having completely folded the left-hand portion of the wrap 407 and its edge 407b over the right-hand portion of the wrap and the adhesive deposited is indicated at 482a.

Figure 42:
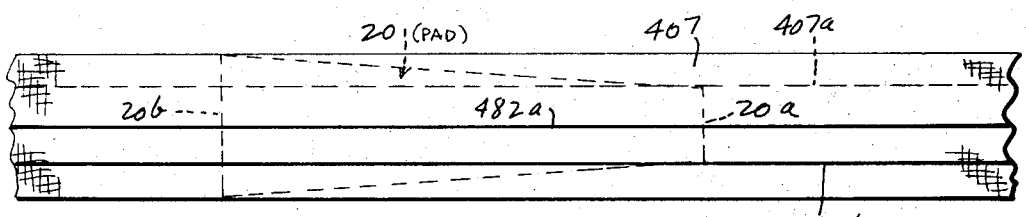
FIG. 42 is a plan view of the pad with wrap folded about a pad.

In FIG. 42 the wrap is shown folded over the pad shown in broken lines as it appears in FIG. 41.

It will be noted that the tapered pad will not have the wrap tight to its ends except at the wider end. The folding of this wrap up along the sides of the narrowing portion of the pad is accomplished in the next to be described tab shaper mechanism.

*Tab-shaping mechanism*

Figure 43:
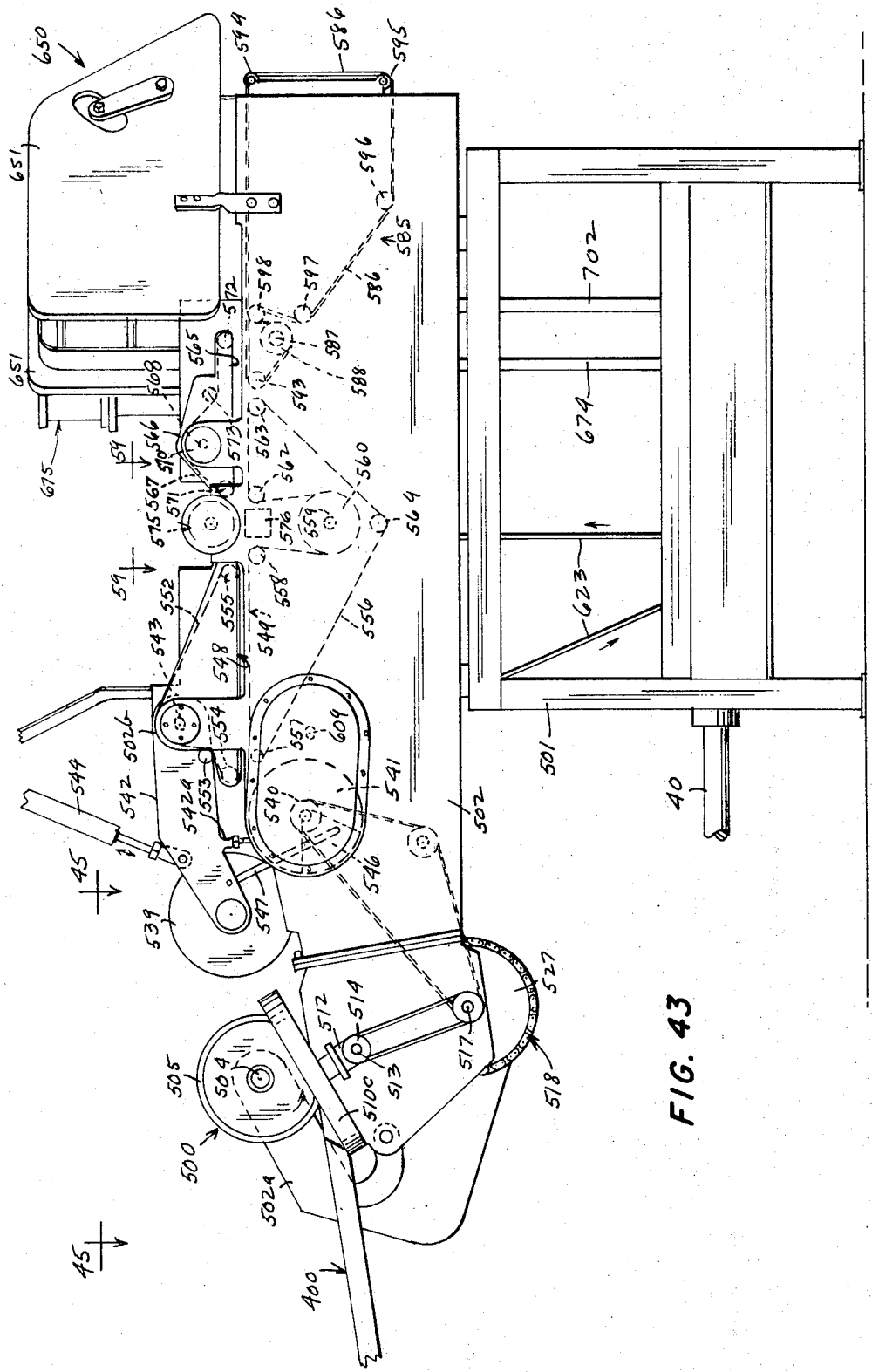
FIG. 43 is a side elevation of the tab forming, calendering, cutting of tab and front and rear tab folding for a pad and angular transfer mechanism for completely formed pad.
Figure 44:
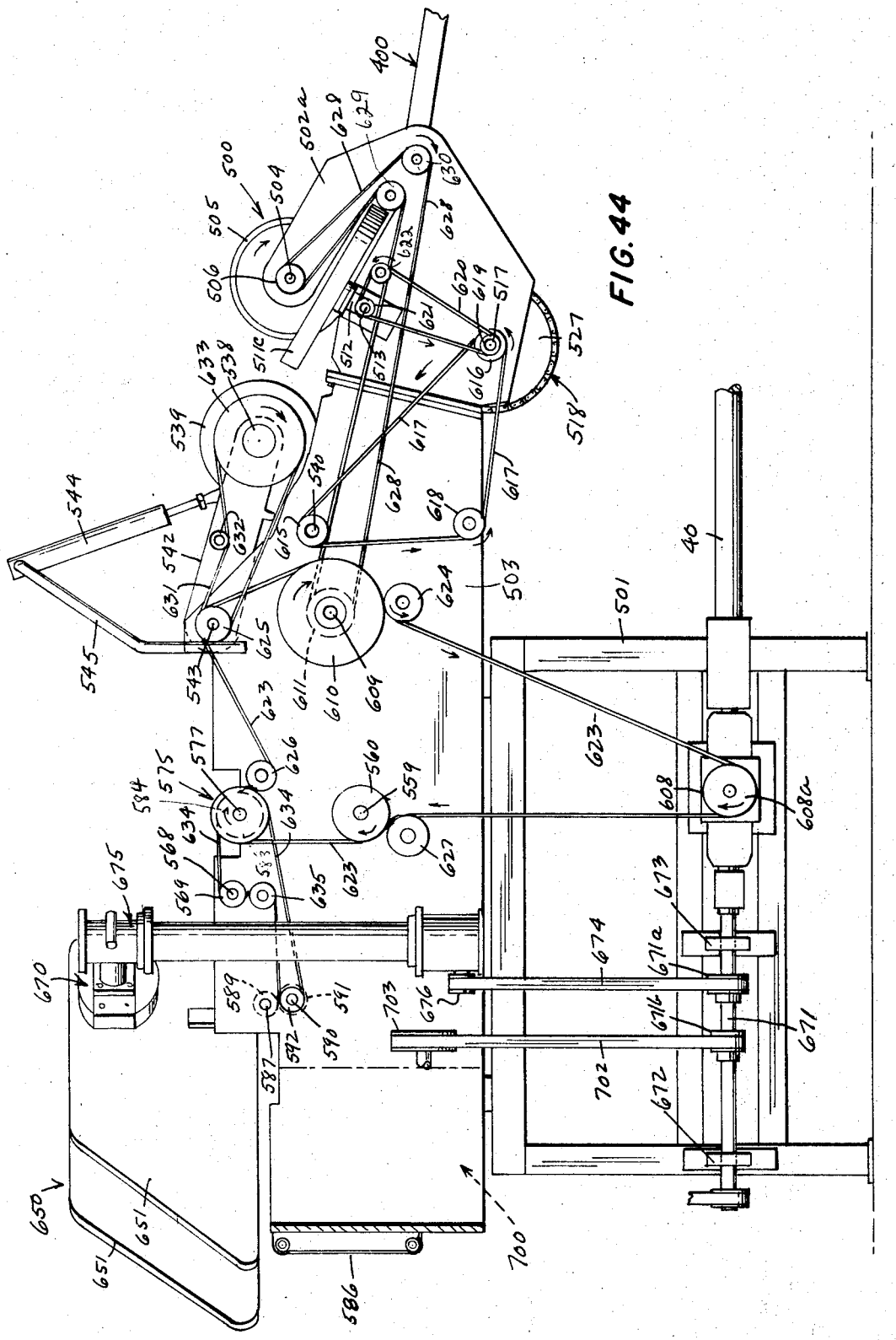
FIG. 44 is an elevational view on the opposite side of the machine shown in FIG. 43.

A tab shaping mechanism is generally indicated at 500 in FIGS. 43 and 44. A stand 501 supports interconnected elongated spaced apart side plates 502 and 503 oppositely disposed which support the tab shaper mechanism 500 and other succeeding mechanism to be described. The web 407 has been folded around the pads, as explained, by folder 400. Web 407 with the wrapped pads properly spaced and positioned enter the tab shaper 500 under a form roll 505 mounted on a horizontal shaft 504. A tongue 509, see FIG. 53, pivoted at 509a in advance of form roll 505, extends under the roll 505 and on beyond the roll. The top of the pads are tangent to the form roll 505 and the tongue 509 is in line with the top of the pads. The tongue 509 is of thin spring steel and provides a support to fold the wrap around at the position of end fold between the small ends of the pads. Shaft 504 is supported in bearings (not shown) mounted in arm portion 502a of the side plate 503. As shown in FIG. 44, shaft 504 has a drive pulley 506 thereon.

The form roll shape is shown in FIGS. 46 and 47. The laid out shape of the periphery of the form roll is shown in FIG. 48 and it will accommodate two tapered pads p1 and p2 with proper spacing of the narrow ends equal to twice the length of the longer tab to be formed as indicated at 507 and the wider ends with spacing of twice the length of the shorter tab to be formed. Thus, in FIG. 48 the length of half the spacing of the wider ends is indicated at each end as 508. The sides 505a and 505b of the form roll adjacent the periphery extend perpendicular to the periphery of the roll as shown in FIG. 47. The form roll 505 makes one revolution for every two pads.

Cooperating with the side edges 505a and 505b of the form roll are brush rolls 510 and 511. These are called brush rolls, however, any periphery on the rods 510 and 511 can be used that will create friction contact with the wrap to move it up along the respective sides 505a and 505b of the form roll. The rolls 510 and 511 are mounted on output shafts 510a and 511a of right angle drives generally indicated at 512 suitably supported from the mounting plates 502 and 503. The inputs of the right angle drives are connected by a common drive shaft 513 having a pulley 514 thereon. The length of the bristles 510b and 511b on each of the brush rolls extending radially from the periphery varies in length around the roll. The brush rolls 510 and 511 are offset from the centers as shown for roll 510 in FIG. 45 so that the variation in length of the bristles will not have to be so great to properly brush along the sides of 505a and 505b of the form roll, the distance between which sides 505a and 505b varies and is compensated for by the length of the bristles and the off center mounting. Thus, the construction of offset center of brushes and bristle length is utilized. The axes of the brush rolls 510 and 511 extend at about 30° to the vertical plane containing the axis of the form roll or in other words the plane of the brushes inclines up about 30° in the direction of flow of the pads past the brush rolls. Suitable protection covers 510c and 511c as shown in FIG. 45 are provided for the brush rolls.

In FIG. 50 the sides of two pads p1 and p2 with their narrow ends towards each other have the area of wrap that is not tight about the narrowing portions of the pads shown in broken line above the top surface line of the pads. To move this slack portion up along the sides of the form roll 505 is the purpose of the brush rolls. This moved up portion of wrap will be folded after it leaves the form rolls; one side over the other in line with the tops of the pads.

In FIG. 49 the pads p1 and p2 are shown in plan as respects the wrap 407 thereover. The wrap is shown slightly overlapping at the narrower ends.

In FIG. 51 which is a section along 51—51 of FIG. 49 there is shown the relationship of the wrap 407 extending up from the adjacent sides of the pad at a narrow portion and on up as loops abutting the respective sides 505a and 505b of the form roll. The tab folders which follow the form roll also are shown here in outline. In FIG. 52 the section 52—52 of FIG. 49 is illustrated with the arrows generally indicating the brush action to push up the loops of the wrap as the pads move along under the form roll. A series of flights, as will be described later, support the wrap in line with the top of the pads.

In FIG. 53 there is shown a small vector diagram at the position of action of the bristles of a roll on the sides of the cooperating side of the form rolls. The wrap of course is between the bristles and the side of the form roll and the resultant sector for the pushing up of the wrap on the side of the form roll. In the sector diagram, a represents the vector of the form roll force which is the same as the travel of the pad, b represents the vector of the brush roll force, and c represents the resultant force which moves the wrap up along the side of the form roll forming the loops of wrap as shown in FIGS. 52 and 56. In FIG. 55 the loop of the wrap is shown in broken line and the direction arrow represents the brush 511. The section at 56—56 shown in FIG. 56 indicates the loops of the wrap up against each of the sides 505a and 505b of the form roll and the position of the tongue 509 is shown as well as the subsequent tab folders.

After the pads in the wrap leave the form roll they are conveyed under tab folders, pass between calender rolls, pass between a fixed knife and a rotating cooperating knife to cut the wrap for the tabs, each pad's forward leading tab is folded over the pad and then the rearward leading tab is folded over the pad to finish the complete formation of the tapered sanitary pad, all as will be described.

A drive shaft 517 is shown in FIGS. 43, 44 and 53 which extends across the machine and is supported in suitable bearings (not shown) in the side plates 502 and 503. The drive of this shaft 517 will be explained later. A pad conveyor is generally indicated at 518. A pair of mounting plates 519 support spaced apart cross shafts 520 and 521, shaft 520 having a pair of sprockets 522 and shaft 521 having a pair of sprockets 523. An idler and take-up sprocket shaft 525 is mounted in an adjustable mounting 524 pivoted at 524a and adjusted by a screw 524b. A pair of idler and take-up sprockets 526 are mounted on shaft 525. A pair of drive sprockets 527 are mounted on drive shaft 517. A left chain 528 and a right chain 529 pass over the sprockets 527, 526, 522 and 523 and carry therebetween cross connector rods 530, each of which carries special flights as shown in FIGS. 55, 57 and 58. Pairs of flights or pad guides 531 extending transversely on the rods 530 are spaced to carry the tapered pad therebetween. Flights or tab supports 532 attached to certain other of the rods extend transverse from the rods and are all of uniform width to carry the wrap connecting the pads, which wrap is the tabs. These flights 532 extend a height equal to the pad thickness as shown in greater detail at the right-hand end in FIG. 58. On these flights 532 there is shown a tab leading from a pad shown positioned between the pad guides 531.

In FIGS. 53, 54 and 55 there is shown pads in conveyor 518 leaving from under the form roll 505, carried by the flights and passing under the tongue 509 and under tab folder mechanism generally indicated at 533. The tab folder mechanism is shown in FIG. 54 which is removable by merely lifting up, comprises spaced apart cross members 534 and 535 which have attached an elongated right folder plate 536 and a left fold plate 537. These folder plates 536 and 537 fold over the loop portions of the wrap, see FIG. 56, as they leave the sides of the form roll 505. The pad shown in FIG. 55 immediately leaving the form roll 505 has its small or narrow end trailing. The tab portion leading from the large or wider end of the pad leaving roll 505 is a short tab supported on flights 532. The pad in advance of the flights 532 has its large or wider end trailing and its small or narrower end just coming under an upper calender roll 539 and about to enter a pocket 541a of a lower calender roll 541.

Upper calender roll 539 is mounted on a shaft 538, see FIG. 53, that is mounted on a pair of arms 542, one showing, pivotally mounted on a jack shaft 543 supported in bearings in upstanding portions 502b and 503b of the side plates. Each arm 542 has an adjustable stop portion 542a to limit its downward swing towards side plates 502 and 503, respectively. A power cylinder and piston generally indicated at 544 is pivotally moving from a support arm 545, in FIG. 44, and has its piston rod 544a pivotally attached to a cross rod 542b connecting the arms 542. When the machine is stopped the upper calender roll is automatically raised so as to avoid burning a pad.

The lower calender roll 541 is mounted on a shaft 540 which extends across the machine and is supported in bearings (not shown) in side plates 502 and 503. This lower calender roll 541 has an arcuate bent shield 546 pivotally mounted on shaft 540 and it is attached to one of the arms 542 of the upper calender roll by a connecting rod 547 so as to be swung into protective position under the tab or pad when the upper calender roll 539 is raised. Both calender rolls 539 and 541 are heated. The plastic line 482a previously applied to seal the folds is further pressed by the upper calender roll 539. The two pad pockets 541a in the lower calender roll 541 are so spaced that a short tab carrying peripheral portion is provided at 541s and a long tab carrying peripheral portion is provided therein at 541L. The calendering rolls are heated to iron the non-woven wrap which is of a character that will bond to itself with hot calendering.

The pads and wrap formed into tabs connecting the pads leave the calender rolls 539 and 541 and pass between upper conveyer 548 and lower conveyor generally indicated at 549. Upper conveyer 548 has a pair of spaced apart side plates 550 which extend between the main side plates 502 and 503. These side plates of conveyer 548 have the jack shaft 543 extending therethrough as shown in FIG. 53, and this shaft has a drive pulley 551 thereon to drive the upper conveyor belt 552. Also supported on the pair of side plates 550 are suitable cross shafts for guide pulleys 553, 554 and 555.

The lower conveyer 549 is mounted by and between the side plates 502 and 503 and has a belt 556 supported on guide pulleys 557 and 558, see FIGS. 43 and 53, for its horizontal run under conveyor 548. The belt 556 passes downward from pulley 558 and in a loop over a drive pulley 560 mounted on a drive shaft 559, spaced below a rotary cutter to be described, back upwardly over a guide pulley 562, forwardly in a horizontal run to and over a guide pulley 563, thence downwardly and rearwardly to a guide pulley 564, spaced below drive pulley 560, and upwardly and rearwardly back to pulley 557. A second upper conveyor generally indicated at 565 extends above the second horizontal run of the lower conveyor 549 and forwardly therebeyond as shown in FIG. 43 to overlap another lower conveyor to be described. The conveyor 565 has a pair of spaced apart side plates 566 forming a unitary frame which is suitably mounted on shafts the various pulleys for a belt 567. The side plates forming the frame are pivotally mounted about a drive shaft 568 which is supported in bearings in upstanding spaced apart position 502d of the frame. Shaft 568 has a drive pulley 569, see FIG. 44, thereon and a driven pulley 570 thereon, see FIG. 43, to drive belt 567. The belt 567 passes downwardly and rearwardly from its drive pulley 570 to guide pulley 571, forwardly in a horizontal run (not shown, hidden behind side plate 566) to pulley 572, rearwardly and upwardly under a guide pulley 573 and back to its drive pulley 570. In FIG. 62, the right-hand end of conveyor 568 is shown slightly inclined upwardly permitting passage of the rear tab folder 607.

Tab cutter

A rotary tab cutter is generally indicated at 575. It cooperates with a bed knife 576 therebeneath in the path of travel between conveyor belt 552 of upper conveyor 548 and belt 567 of second upper conveyor 565.

The rotary cutter 575 has a cross shaft 577 mounted in bearings 578 and 579 in respective upstanding portions 502b and 503c, see FIGS. 43 and 59. A rotary hub 580 is mounted on the shaft 577 and it carries a tangentially extending cutter knife 580a, see FIGS. 60 and 61, and trailing the cutter knife or blade 580a is a vacuum nozzle 580d formed in the hub and extending radially to the center for a suitable suction connection (not shown). The knife 580a and the nozzle 580d are on raised portions of the hub while the rest of the hub periphery is cut away to clear the top of the pads.

The bed knife 576 is mounted in an adjustable positioned support generally indicated at 576a. A bridge member 581 for the pad is positioned between the conveyor 548 and the bed knife 576 while another bridge member 582 is positioned between the bed knife 576 and the next conveyor 565.

As the center lengthwise tab portion 507 between pads p1 and p2 moves under the cutter the knife 580a as shown in FIG. 60 cooperates with the bed knife 576 over which the tab passes to sever the tab. The suction nozzle 580b trailing the knife 580a picks up the leading tab on pad p1 and holds it against the hub 580 as the pad p1 advances to the right as shown in FIG. 61. As the pad p1 moves between conveyor belt 567 and 556, the pad is pulled forward to the right and the leading tab is stripped from the suction nozzle by the upper conveyor belt 567 of conveyor 565 as shown in broken lines in FIG. 61.

In FIG. 59 the shaft 577 of the cutter 575 has mounted thereon pulley 583 by which it is driven and a pulley to drive conveyor belt 567 as will be described later.

Rear tab folder

In FIGS. 43 and 62 an endless belt conveyor is generally indicated at 585 for carrying the pad from the preceding conveyors 549 and 565. The conveyor 585 has a conveyor belt 586 which is driven by a pulley 588 on drive shaft 587 extending across the machine and supported in bearings (not shown) mounted in the side plates 502 and 503. The other end of shaft 587, see FIG. 44, has a gear 589 meshing with a drive gear 591 on a shaft 590. Shaft 590 has a pulley 592 thereon which is driven by a belt to be described. The reason for the gears 589 and 591 is to obtain the desired direction of rotation of shaft 587. Returning to FIGS. 43, 62 and 63 belt 586 is driven by a drive pulley 588 on shaft 587 and passes over pulleys 593 and 594 for its horizontal run to convey the pads and other guide pulleys 595–598 inclusive, suitably mounted in a framework 599. The pad as shown typically in FIG. 63 is in the right-hand side of the center line of the belt so that the pad will not have so far to be moved off the belt by the subsequent conveyor.

Also mounted on shaft 587 are a pair of spaced drive sprockets 601 for two rear tab folders generally indicated at 600. The tab folders 600 are properly spaced to accommodate the oncoming spaced pad. A pair of spaced apart idler sprockets 603 are mounted on shaft 602 suitably supported in bearings (not shown) in the frame 599. Endless chains 604 are led over each of the pairs of sprockets 601 and 603. It will be noted that the sprockets 601 on common drive shaft 587 are larger than the pulley 588 on the same shaft and thus the chains 604 are driven faster than the belt 586 carrying the pads.

The chains 604, see FIG. 63, support the two spaced rear tab folders 600. These chains have brackets 605 thereon that support thereacross an L-shaped member 606 that has fixed thereto a rod 607 to engage the rear tab of a pad and fold it over the rear end of a pad as is shown in FIGS. 62 and 64.

Various drives

In FIGS. 1 and 44 the drive shaft 40 extends from right angle gear box 39 to a right angle reducer drive mechanism 608. Suitable mountings at the face of frame 501 support the reducer 608 driven by shaft 40. A shaft 609 is mounted in bearings (not shown) in side plates 502 and 503. On shaft 609 is a pulley 610 and a pulley 611, see FIG. 44. On the other end of shaft 609, see FIG. 53, is a gear 612. Gear 612 meshes with and drives a gear 613 fixed on shaft 540 to drive the lower calender roll 541. This same shaft 540, see FIG. 44, has pulley 615 driven thereby which drives a pulley 616 on shaft 517 through a belt 617. Belt 617 passes over an idler pulley 618. Shaft 517 drives the pad carrying conveyor 518.

On shaft 517 there is also another pulley 619 which drives a belt 620 that passes over an idler pulley 622 and drives pulley 621 fast on the brush roll drive shaft 513.

Right angle reducer 608 has a driven pulley 608a that drives the respective drive belt 623 which passes over idler pulley 624, drive pulley 610 on shaft 609, pulley 625 fixed to jack shaft 543, idler pulley 626, pulley 583 on shaft 577, pulley 560 on shaft 559 and over idler pulley 627 back to drive pulley 608a on drive box 608.

A belt 628 leading from drive pulley 611 on shaft 609 leads over idler pulleys 629 and 630 to drive pulley 506 of the form roll 505.

A belt 631 driven by drive pulley 625 on jack shaft 543 leads under idler pulley 632 on a calender roll arm 542 and over pulley 633 on shaft 538 to drive the upper calender roll 539.

A belt 634 driven by pulley 584 on shaft 577 leads over drive pulley 569 on shaft 568, over idler pulley 635, over pulley 592 on shaft 590 to drive the same, and then back to pulley 584.

Transfer mechanism to first accumulator

The pad has been transferred to a transfer mechanism 650 and has been fully fabricated and has its tabs folded over. These tapered pads, as explained heretofore, arrive at the transfer mechanism in line and spaced. The small or narrow end of each pad is spaced next to the small end of the next pad the equivalent of two long tab lengths. The larger or wider end of end pad is spaced next to the large end of the next pad the equivalent of two short tab lengths.

In general this transfer mechanism transfers the pads at about a 37° angle to the approaching line of finished pads to a first accumulator 700 shown in FIG. 44.

The transfer mechanism 650 has a pair of spaced apart side plates 651 mounted on the end of frame 501. Between the plates 651 is an endless chain conveyor 652 which has a drive shaft 653 mounting spaced apart drive sprocket 654. Idler sprocket mounting shafts are indicated at 655 and 656 in a horizontal spaced apart line as shown in FIG. 67 in the lower part of the plate 651. Each of the shafts 655 and 656 has respective idler sprockets 655a and 656a thereon. A pair of take-up sprockets 657 are mounted on a shaft 658 that is supported on arm 659 pivoted on shaft 656. An adjusting screw mechanism for arm 659 is shown at 660.

Figure 65:
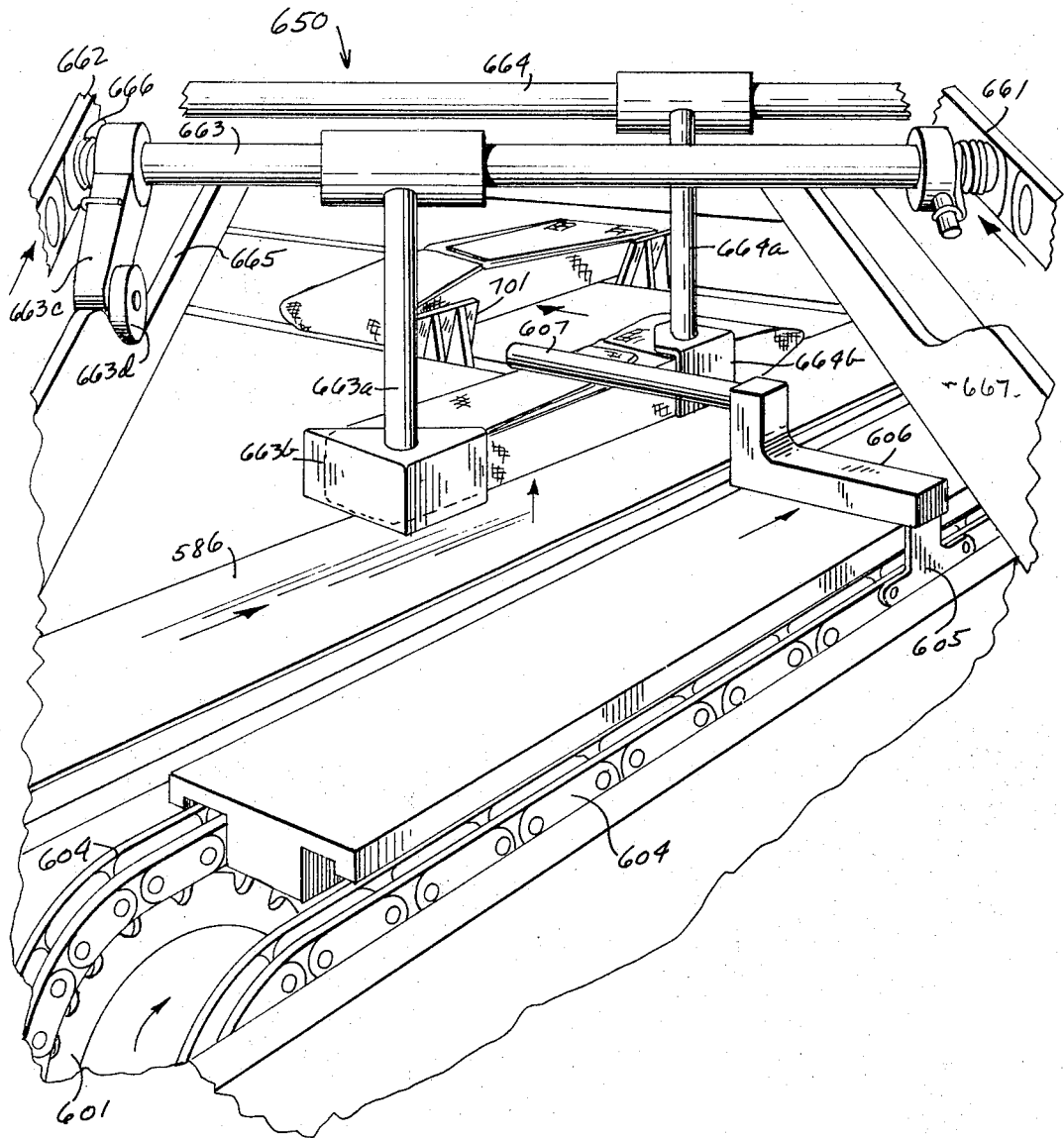
FIG. 65 is a perspective view of conveyor and rear tab folder flight of FIG. 62 with pad transfer mechanism transferring pad off conveyor at an angle to an accumulator.

About the sprockets are trained endless chains 661 and 662. Pivotally mounted between these chains 661 and 662, see FIG. 65, are four pair of spaced cross rods 663 and 664 with each pair spaced in proper position along the chain. Fast to each rod 663 is a depending arm 663a having a flight 663b that has a top and two sides to contact a rear corner of a pad. The cross rod 664 has a like depending attached arm 664a and a flight 664b at its end having a top and a side to engage a side of a pad.

The positions of these flights 663b and 664b will of necessity be altered to take care of the spacing of the incoming respective pads to be moved by the respective pairs of flights and the positioning of the tapered pads as respects narrow and wider beds.

At the far end of rod 663, see FIGS. 65 and 67, is attached cam arm 663c having a cam follower roller 663d on its end. This cam follower 663d rides on a cam track 665. A tension spring 666 on rod 663 presses on arm 663c to hold its cam follower 663d against its cam track 665.

In FIG. 67 a cam arm 664d depends from rod 664 and has a cam follower 664e on its end which rides on a right-hand cam track 667, see FIG. 65.

The cam tracks 665 and 667 raise and lower the respective flights 663b and 664b so as to contact an oncoming pad and transfer it, see FIG. 66, off of conveyor belt 586 at an angle of about 37° until its leading end rests against a fence 668. In FIG. 66 there is also shown a pair of elongated guard plates 669 for the cam arms attached to brackets 669a to the side plates 651. The successive portions of two pads are shown in FIG. 66. It will be noted that the pads rest on the fence 668 with their axis at 90° to the fence 668. A pair of flights 701 of a first accumulator 700 are slightly staggered so as to engage the pad one ahead of the other adjacent each end so as to tilt the pad in order that its leading edge is perpendicular to the plane of the fence 668. There flights 701 move the pad along and then the flights retract. The next set of flights (not shown in this application) are in alignment and push the next pad after aligning its trailing edge perpendicular to the plane of fence 668 on into contact with the previous pad and continue to move the two pads together.

The variable speed of the drive shaft 653 of the transfer mechanism is shown in FIG. 68, as a drag link mechanism 670. The drive of this mechanism 653 is from a secondary drive shaft 671 supported in bearings 672 and 673 on frame 501, see FIG. 44, and connected to the right angle reducer mechanism 608. Shaft 671 has a pulley 671a which drives a belt 674 leading over a pulley 676 on a right angle reducer generally indicated at 675 whose output shaft is indicated at 677 in FIG. 68. This driving shaft 677 has a crank arm 678 secured thereto. The end of arm 678 is pivotally connected to a drag link 679. This drag link 679 is pivotally connected to the outer end of an arm 680 which is clamped to shaft 653 to drive the same. The shaft 677 drives at constant speed and through the drag link arrangement the shaft 653 is driven at a variable speed as shown illustratively in the graph in FIG. 69. The normal rate of drive of shaft 653 is velocity at A in FIG. 69. The velocity increases to a maximum B and then decreases as indicated by the graph back to velocity A. The shaft 653 rotates more than 180° in its change of speed from maximum B to normal speed A and this timewise is greater than the time for the shaft to increase from normal velocity A to maximum velocity B. The speed increase of shaft 653 from A to B is to move the flights 663b and 664b and the pad contacted thereby at maximum velocity, which component is equal to the velocity of the oncoming pad travel on belt 586. In the vector diagram shown in FIG. 66, P equals the pad velocity in belt 586, F equals the velocity of the flights 663b and 664b on contacting a pad, and S equals the side movement velocity of the pad. The component of F in the direction of pad movement on the belt is equivalent to pad velocity P at the time the flights contact the pad.

In FIG. 44 there is also shown in outline the second accumulator 700 and its drive from a pulley 671b on shaft 671 that leads to a drive pulley 703 of the first accumulator 700. The accumulation of the pads is the subject of a separate application.

I claim as my invention:

1. Apparatus for making tapered sanitary pads of approximate isosceles trapezohedron shape applying pad wrapping, forming end tabs of the wrapping connecting the pads and folding the tabs over the pad, comprising, in combination: means for feeding wrapped wadding intermittently to a clamping mechanism for the wadding; slitting mechanism adjacent said clamping mechanism for alternately cutting said wadding at the clamping mechanism as the wadding is successively stopped in its feeding at equal acute but oppositely disposed angles to the line of feed of said wadding whereby to cut isosceles trapezohedron pads having a wide end and an opposite narrow end and nonparallel sides; a continuously running conveyor means in line with said intermittent feed means and beyond said clamping mechanism and said slitting mechanism in the line of flow of said wadding to transfer the cut pads at equal spaced apart side by side and oppositely disposed relation with their axes normal to the line of movement of said continuously running conveyor means; arresting means at the end of said continuously running conveyor means for arresting said pads with their axes disposed normal to the line of their feed; first transverse conveyor means adjacent the arresting means and said continuously running conveyor means for transferring the pads in equal spaced relation wide end to wide end and short end to short end; spacing mechanism for receiving the pads in line from said first transverse conveyor means and spacing them with their wide ends relatively close together and their narrow ends relatively far apart; wrapping web feeding mechanism feeding wrap to a pad receiving and wrap folding mechanism next adjacent in line of flow to said spacing mechanism whereby pads are received in said spaced relation on said wrap and the wrap is folded over into a tube of uniform cross section as large as the larger end of said pad whereby loose wrap extends adjacent the tapered sides of the pad from adjacent wider end to the narrower end; a form roll under which said pads and wrap are lead from said wrap folding mechanism, said form roll having a rim whose periphery matches the varying width of said spaced pads and joining wrap portion passing therebeneath, said roll having sides at the rim generally normal to a line generating the peripheral surface of the roll; rotating friction rolls on each side of said form roll with the peripheral friction surface having cooperating contact with said sides of the form roll at the locus of passage of the pads and wrap, the loose wrap being between the sides of the form roll and friction rolls on each side, said friction rolls lying in planes inclined upwardly in the direction of flow of the pads thereunder and generally normal to the plane of the form roll whereby a plane containing the axis of the form roll and the tangental locus of contact of the pads and wrap intersects the planes containing the axes of the form rolls in said locus of contact; means for rotating said friction rolls with peripheral speed equal to or greater than the wrap and pad speed in the direction of flow whereby the loose wrap is drawn up along each side of the form roll; conveyor means having flights for pads and connecting wrap conveying the same from the form roll; folding means following the form roll and cooperating with said just-mentioned conveyor means for folding the wrap formed on each side of the form roll onto the narrower end portion of the pad and as overlap on the wrap connecting the narrow ends of the pads; calender means between which said pads and pad connecting wrap is led for calendering the same; conveying means conveying the wrapped and calendered pads and connecting wrap to a cutter means having a cutter for severing the connecting wrap to form a rear tab for the leading pad and a front tab for the trailing pad as respects the just-mentioned positions to said cutter; said cutter means having rotary mounting means and cooperating with a bed knife over which the connecting wrap is led and severed by said cutter, said rotary cutter means having suction means trailing the cutter thereon for holding the leading tab to the rotary cutter means as the pad is conveyed on in the line of flow on said last-mentioned conveying means; said conveying means conveying the pads and their connecting wrap to the cutter means having a portion extending each side of and below the bed knife in the line of flow; an endless conveyor means following said cutter means in the direction of flow and having a bottom run overlying said conveying means portion following the bed knife, said bottom overlying run just-mentioned stripping said leading tab from the suction means and folding it back over the leading end and top of the pad passing thereunder; a further endless conveyor receiving said pads on a run thereof; and a rear tab folding means for folding the rear tabs over the rear end and top of the pads as they move in the line of flow on said just-mentioned run to complete the formation of said sanitary pads.

2. Apparatus for making tapered pads according to claim 1 including means for continuously feeding said wrapped wadding to said intermittent feeding means feeding to said clamping mechanism, said means for continuously feeding including movably mounted festooner means over which said wadding is fed for raising the wadding above its normal line of flow and increasing its path of flow to take up the excess feed during the stopping periods of said intermittent feeding means feeding wadding to said clamp.

3. Apparatus for making pads according to claim 1 including notching means positioned along said means for feeding the wrapped wadding intermittently whereby notches are cut in the sides of the wrapped wadding while stopped during its feed to provide corner cuts at the lines of slitting in said pads being successively cut from said wrapped wadding.

4. Apparatus for making pads according to claim 1 wherein said slitting mechanism includes a first slitting means having an arm rotatably mounted about an axis, said axis lying in a plane extending generally parallel to the line of flow of said wrapped wadding being clamped for slitting, said axis lying in its said plane at an angle to the line of flow of the wadding equal to the angle of taper for the sides of said tapered pad, means for rotating said arm about its axis, said arm having means mounting a rotatable blade thereon towards its outer end, a motor means mounted on said arm having drive means connecting it with said rotatable blade for rotating the same, and counter weight means for said rotating arm; and a second slitting means like said first slitting means mounted slightly further along the line of flow of the wadding with its axis oppositely inclined to the line of flow and its arm mounted about 180° on its axis from the mounting of said first slitting mechanism arm.

5. Apparatus for making pads according to claim 4 wherein said clamping mechanism for the wadding at the slitting location has a bed portion over which said wadding passes and is clamped, said bed portion having openings for accommodating passage of said cutter blades, a movable clamp member having spring biasing means urging it into clamping position on the top of said wadding and clamp operating linkage means for raising said movable clamp member away from said wadding; and a cam means hving its axis in alignment with one of said slitter rotating arm axes and means rotating it with said slitter rotating arm, said clamp operating linkage means having a cam follower following said last-mentioned cam means whereby the clamp is periodically operated to pad clamping and released positions.

6. Apparatus for making pads according to claim 1 wherein said slitting mechanism includes a first slitting means having an arm rotatably mounted about an axis, said axis lying in a plane extending generally parallel to the line of flow of said wrapped wadding being clamped for slitting, said axis lying in its said plane at an angle to the line of flow of the wadding equal to the angle of taper for the sides of said tapered pad, means for rotating said arm about its axis, an outer arm pivotally mounted on the outer portion of the rotating arm, an inner arm pivotally mounted on the rotating arm spaced in from the outer arm, a link rod pivotally connecting the outer portions of said outer and inner arms whereby said arms pivot together, said outer arm having means mounting a rotatable cutter blade thereon, motor means having means mounting it on said rotating arm, drive means connecting said motor means and said rotatable blade, a member having a cam track therein mounted normal to said axis of said rotating arm, a cam follower for said arms and link mounted for following said cam track on said rotary arm rotates about said axis, said cam track having a cam contour wherein the path of the cutting portion of the rotating cutter blade is generally linear and parallel to the top of the wadding and pad during cutting; counter weight means for said rotating arm; and a second slitting means like said first slitting means mounted slightly further along the line of flow with its axis oppositely inclined to the line of flow of the wadding and its arm mounted about 180° on its axis from the mounting of said first slitting mechanism arm.

7. Apparatus for making pads according to claim 1 wherein said arresting means at the end of said continuously running conveyor conveying pads from said slitting mechanism includes a fence barrier extending parallel to the axis of said approaching pads, said fence barrier having apertures therethrough, a pair of pivotally mounted spaced apart fingers extending through said apertures of the fence barrier and having cam follower means thereon, rotating cam for each finger cam follower means whereby the fingers alternately project through said apertures in the fence barrier and act with portions of said fence barrier as the arresting means for the oncoming tapered pads to arrest them with their axes maintained normal to their direction of oncoming line of flow.

8. Apparatus for making pads according to claim 1 wherein said continuously running conveyor means conveying pads from said slitting mechanism has as a lower endless conveyor and an upper endless conveyor between which the pads are conveyed, said lower endless conveyor extending at its discharge end beyond said upper endless conveyor to said arresting means, pad supporting means spaced adjacent the discharge end of said lower endless conveyor, said lower endless conveyor having pivotal mounting means for its discharge end adjacent the arresting means, means for periodically pivoting said pivotally mounted end portion of the lower endless conveyor below said pad support means whereby the pads rest on said spaced support means; and wherein said first transverse conveyor means adjacent the arresting means and the discharge end of said pivoted end of the lower endless conveyor there adjacent having a lower transverse endless conveyor and an upper transverse endless conveyor projecting beyond said lower conveyor and over the adjacent end portion of the pad resting area adjacent said arresting means, means mounting said transverse endless conveyors for pivotal movement about their lead out ends, means for pivoting said transverse endless conveyors constituting said first transverse conveyor means about their mounting means to open and then move towards each other to grasp a pad resting adjacent said fence, means driving said transverse endless conveyors from stopped position as said pad is grasped, accelerating to high speed and deaccelerating to transfer speed to said spacing mechanism and deaccelerating to stopped position for grasping the next pad whereby said pads are transferred to said pad spacing mechanism in line in equal spaced relation.

9. Apparatus for making pads according to claim 1 wherein said spacing mechanism includes an endless conveyor means having a pad conveying run between said first transverse conveyor means adjacent the arresting means and said pad receiving and wrap folding mechanism and variable speed driving means for said endless conveyor means thereby spacing the pads with their wide ends relatively close together and their narrow ends relatively far apart.

10. Apparatus for making pads according to claim 1 wherein said spacing mechanism for the pads having an endless conveyor with a run receiving said equally spaced pads at the transfer speed of said first transfer conveyor means, variable drive means for the endless conveyor for periodically increasing and decreasing the speed of the conveyor in pattern form to space the oncoming pads having their narrow ends opposite each other spaced relatively far apart and their wider ends opposite each other spaced relatively close together whereby said pads are properly spaced to be received on said wrap for forming of the long tab at the narrow end and the short at the wider end.

11. Apparatus for making pads according to claim 1 wherein said spacing mechanism includes an endless conveyor having a first run between a pair of spaced rollers to convey pads between said first transverse conveyor means and said pad receiving and folding mechanism, said just-mentioned endless conveyor having a second run and a third run, a constant speed drive pulley means over which the conveyor is led and driven, a first idler pulley over which the second run of the conveyor is led mounted on an arm pivotally mounted for oscillation, a second idler pulley over which the third run of the conveyor is led mounted on a second arm pivotally mounted for oscillation, means controlling the oscillation of said arms in one direction to lengthen the second run of the conveyor while shortening the third run of the conveyor to slow the speed of the conveyor along said run conveying the pad and means controlling the oscillation of said arms in another direction to shorten the second run of the conveyor while lengthening the third run to increase the speed of the conveyor along its first-mentioned run of the conveyor whereby the linear speed is controlled to space the pads with wide ends relatively close together and narrow ends relatively far apart.

12. Apparatus for making pads according to claim 11 wherein said arms have respective secondary arms fixed to move therewith that have cam followers on their extending ends, and said means controlling the oscillation are a pair of conjugate rotating cams driven at constant speed and having contours whereby the linear speed of the first-mentioned run of the conveyor is controlled to space the pads with wide ends relatively close together and narrow ends relatively far apart.

13. Apparatus for making pads according to claim 1 including pad mask piece feeding and spacing mechanism for furnishing mask pieces in spaced relation along said wrapping web at said wrapping web feeding mechanism whereby the pads are received in spaced relation on said mask and wrapping web for subsequent manipulation.

14. Apparatus for making pads according to claim 1 including pad mask web variable feeding means adjacent said wrapping web feeding mechanism, said pad mask web feeding means feeding mask web with the same spacing as the pad spacing by said spacing mechanism; said wrapping web feeding mechanism having a feed roll pulling said wrapping web thereover continuously; said pad mask web variable feeding means having a breaker roll with pivot mounting means and over which said mask web is fed, said breaker roll being periodically pivoted into contact with said wrapping web feed roll for breaking said mask web thereby providing spaced pieces of mask web.

15. Apparatus for making pads according to claim 14 wherein said variable feed means includes a drive means having a rotatably mounted constant speed driven member having a drive means extending radially; a shaft offset and parallel to said rotatably mounted constant speed driven member, said offset shaft having mounted thereon a cooperating drive means positioned radially thereon and slidably connected and drivingly connected with said cooperating drive means, whereby a variable speed is imparted in the rotation of said offset shaft drivingly connected with said pad mask web feeding means.

16. Apparatus for making pads according to claim 15 having means holding said mask piece on said wrapping web between the breaker roll and said folding mechanism.

17. Apparatus for making pads accordingly to claim 15 having adhesive applying means in said web wrap folding mechanism to apply adhesive on a first folded over portion of the pad wrapping for engagement by a next folded over portion of said web wrapping.

18. Apparatus according to claim 17 wherein the rotating friction rolls are brush rolls having bristles extending generally radially for contact and drawing up wrap fed over the rim of the form roll.

19. Apparatus according to claim 18 wherein the rotating friction rolls have their center of rotation offset slightly from their center and the bristles of the peripheral brush portion vary in length about the periphery.

20. Apparatus according to claim 1 having an elongated tongue secured and extending from behind the form roll as respects the direction of flow under the form roll and under the folding means following the form roll and of a width approximately the width of the narrow end of the pad, to form a forming means for folding the wrap connecting the narrow ends of the pads.

21. Apparatus according to claim 20 wherein the folding means following the form roll in the direction of flow are spaced apart elongated plates having their wrap engaging lead in edges spaced farthest apart and gradually decreasing in their spacing apart.

22. Apparatus according to claim 21 wherein said endless conveyor means having a bottom run overlying said conveying means and following said cutter means is pivotally mounted about its trailing end portion whereby its end portion in the direction of flow pivots up as said rear tab folding means moves thereunder.

23. Apparatus according to claim 22 wherein said rear tab folding means is an endless conveyor for a run in the line of flow and has rear tab engaging means thereon spaced therealong to engage and fold over the rear tab and means for driving said last mentioned endless conveyor at a greater speed than said further endless conveyor at its location.

24. Apparatus according to claim 1 having an angle transfer means for the completed pads at a position in the line of flow beyond the rear tab folding means for transferring the completed pads at an angle to one side of the line of flow of the oncoming pads.

25. The method of making tapered sanitary pads of approximately isosceles trapezohedron shape, applying pad wrapping, forming end tabs of the wrap connecting the pads and folding the tabs over the pad, comprising the steps of feeding wrapped wadding intermittently in a direction of flow; clamping the feed wadding between feeding; slitting the wadding thereacross adjacent the clamping thereof at an acute angle to the direction of flow; unclamping and feeding said wadding; slitting the wadding thereacross adjacent the clamping thereat at an acute angle to the direction of flow but oppositely disposed to said previous cut whereby to cut isosceles trapezohedron pads having a wide end and an opposite narrow end and non-parallel sides; continuously feeding said cut pads in equal spaced relation but oppositely disposed side by side relation in the direction of flow with their axes normal to the direction of flow; arresting the pads at the end of said continuous feeding with their axes still normal to their oncoming direction of flow; feeding the pads transversely from said arrested position in spaced apart axial alignment, wide ends to wide ends and narrow ends to narrow ends; receiving said equal spaced apart aligned pads and spacing them with their wide ends relatively close together and their narrow ends relatively far apart; feeding web wrapping and positioning said spaced pads thereon and folding the wrap over the pads into a tube of uniform cross section as large as the larger end of the pad with the wrap overlapped at the top of the pads; feeding the wrapped pads through a position where the pads and pad connecting wrap are guided along their top with a matching contour while any loose wrap at the sides of the tapered pads is pulled upwardly along the tapered sides and the pad connecting wrap joining the narrow ends of the pads is likewise guided through the position and the opposite side of said connecting wrap are formed into a U-shape cross section with upstanding side portions; conveying said pads and connecting wrap and folding over on the tapering portion of the pad any pulled up wrap and folding over the upstanding portions of the pad connecting wrap joining the narrow ends of the pads; continuously conveying said pads and connecting wrap and calendering said pads and pad connecting wrap; cutting said pad connecting wrap between the pads whereby to form a leading tab on the pad approaching the cutting position and a trailing tab next ahead in the direction of flow of the pads; holding the leading tab and folding it over the leading end of its pad and onto its top while conveying said pads; and while further conveying said pads folding over the rear tab over the rear end of its pad and onto its top whereby a complete sanitary tapered pad with long tab at narrow end and shorter tab at wider end is formed.

26. The method of making tapered sanitary pads according to claim 25 including feeding web for masks for the pads onto said web wrapping in the same spacing as said spaced pads to be received on the web and mask and breaking said fed web mask to form mask pieces for the pads positioned inside the wrap.

27. A method of making complete tapered sanitary pads according to claim 25 including applying an adhesive to the overlapping wrap before completing the folding of the wrap over the pads into said tube of uniform cross section.

28. The method of making complete tapered sanitary pads according to claim 25 including notching the fed wrapped wadding while stopped in its intermittent feeding to provide corner cuts at the lines of slitting in said pads being successively cut from said wrapped wadding.

29. The method of making tapered sanitary pads of approximately isosceles trapezohedron shape, applying pad wrapping, forming end tabs of the wrap connecting the pads and folding the tabs over the pad, comprising the steps of feeding wrapped wadding intermittently in a direction of flow; notching the fed wrapped wadding while stopped in its intermittent feeding to provide corner cuts at the lines of slitting in said pads to be hereafter slit from the wrapped wadding; clamping the feed wadding between feeding; slitting the wadding thereacross adjacent the clamping thereof at an acute angle to the direction of flow; unclamping and feeding said wadding; slitting the wadding thereacross adjacent the clamping thereat at an acute angle to the direction of flow but oppositely disposed to said previous cut whereby to cut isosceles trapezohedron pads having a wide end and an opposite narrow end and non-parallel sides; continuously feeding said cut pads in equal spaced relation but oppositely disposed side by side relation in the direction of flow with their axes normal to the direction of flow; arresting the pads at the end of said continuous feeding with their axes still normal to their oncoming direction of flow; feeding the pads transversely from said arrested position in spaced apart axial alignment, wide ends to wide ends and narrow ends to narrow ends; receiving said equal spaced apart aligned pads and spacing them with their wide ends relatively close together and their narrow ends relatively far apart; feeding web wrapping, forming mask pieces for the pad and applying them to the wrapping web in pad spaced position; and positioning said spaced pads thereon and folding the wrap over the pads into a tube of uniform cross section as large as the larger end of the pad with the wrap overlapped at the top of the pads; applying an adhesive to the overlapping wrap before completing the folding of the wrap over the pads into said tube of uniform cross section; feeding the wrapped pads through a position where the pads and pad connecting wrap are guided along their top with a matching contour while any loose wrap at the sides of the tapered pads is pulled upwardly along the tapered sides and the pad connecting wrap joining the narrow ends of the pads is likewise guided through the position and the opposite side of said connecting wrap are formed into a U-shape cross section with upstanding side portions; conveying said pads and connecting wrap and folding over on the tapering portion of the pad any pulled up wrap and folding over the upstanding portions of the pad connecting wrap joining the narrow ends of the pads; continuously conveying said pads and connecting wrap and calendering said pads and pad connecting wrap; cutting said pad connecting wrap between the pads whereby to form a leading tab on the pad approaching the cutting position and a trailing tab next ahead in the direction of flow of the pads; holding the leading tab and folding it over the leading end of its pad and onto its top while conveying said pads; and while further conveying said pads folding over the rear tab over the rear end of its pad and onto its top whereby a complete sanitary tapered pad with long tab at narrow end and shorter tab at wider end is formed.

30. Apparatus for forming the loose wrapping and connecting wrapping of tapered pads received spaced in a uniform tubular wrap having a cross section of the wider end of the tapered pads, the pads being spaced apart with wide ends relatively close together for short tabs and narrow ends further apart for long tabs comprising, in combination; a form roll under which said pads and wrap are lead, said form roll having a rim whose periphery matches the varying width of said spaced pads and connecting wrap portion passing therebeneath, said roll having sides at the rim generally normal in a line generating the peripheral surface of the roll; rotating friction rolls on each side of said form roll with the peripheral friction surface having cooperating contact with said sides of the form roll at the locus of passage of the pads and wrap, the loose wrap being between the side of the form roll and friction rolls on each side, said friction rolls lying in planes inclined upwardly in the direction of flow of the pads thereunder and generally normal to the plane of the form roll whereby a plane containing the axis of the form roll and the tangential locus of contact of the pads and wrap intersects the planes containing the axes of the form rolls in said locus of contact; means for rotating said friction rolls with peripheral speed equal to or greater than the wrap and pad speed in the direction of flow whereby the loose wrap is drawn up along each side of the form roll; conveying means having flights for pads and connecting wrap conveying the same from the form roll; and folding means following the conveyor means for folding the wrap formed on each side of the form roll onto the narrower end portion of the pad and as overlap on the wrap connecting the narrower ends of the pads.

31. Apparatus according to claim 30 wherein the rotating friction rolls are brush rolls having bristles extending generally radially for contact and drawing up wrap fed over the rim of the form roll.

32. Apparatus according to claim 31 wherein the rotating friction rolls have their center of rotation offset slightly from their center and the bristles of the peripheral brush portion vary in length about the periphery.

33. Apparatus according to claim 32 having an elongated tongue secured and extending from behind the form roll as respects the direction of flow, under the form roll and under the folding means following the form roll and of a width approximately the width of the narrow end of the pad, to form a forming means for folding the wrap connecting the narrow ends of the pads.

34. The method of snugly enclosing like articles of elongated shape having varying areas of transverse cross section with an elongated flexible wrap which comprises forming the wrap into a continuous tubular wrap about the articles with said continuous tubular formed wrap having a maximum transverse cross sectional area approximately equal to the maximum transverse cross sectional area of said articles whereby void spaces are left between the tubular wrap and the elongated side edges of the articles, moving the tubular wrap and enclosed articles through a linear path while supporting the bottom of the wrap and enclosed articles and while applying a force downward along the top of the wrapped pads at least throughout the marginal top edge of the tubular wrap and pads therein and applying a force against the wrap along the elongated sides thereof to move said wrap into engagement with the side edges of the pad and upwardly above the side edges of the pad in the void spaces, said force being applied along the wrap at the side edges of the pad and upwardly at an inclined angle to the direction of movement of the wrap and pad in said linear path, the rate of application of said force being at least equal to the rate of the force moving said wrap and articles along their linear path whereby the resultant component of the rates of said two forces moves said wrap upwardly conforming it to the configuration along the elongated side edges of the pads and thereafter folding said wrap extending up above the elongated side edges of the articles on over the top of said articles.

35. Apparatus for making tapered sanitary pads of approximate isosceles trapezohedron shape applying pad wrapping, forming end tabs of the wrapping connecting the pads and folding the tabs over the pad, comprising, in combination: means for feeding wrapped wadding intermittently to a clamping mechanism for the wadding; slitting mechanism adjacent said clamping mechanism for alternately cutting said wadding at the clamping mechanism as the wadding is successively stopped in its feeding at equal acute but oppositely disposed angles to the line of feed of said wadding whereby to cut isosceles trapezohedron pads having a wide end and an opposite narrow end and nonparallel sides; a continuously running conveyor means in line with said intermittent feed means and beyond said clamping mechanism and said slitting mechanism in the line of flow of said wadding to transfer the cut pads at equal spaced apart side by side and oppositely disposed relation with their axes normal to the line of movement of said continuously running conveyor means; arresting means at the end of said continuously running conveyor means for arresting said pads with their axes disposed normal to the line of their feed; first transverse conveyor means adjacent the arresting means and said continuously running conveyor means for transferring the pads in equal spaced relation wide end to wide end and short end to short end; spacing mechanism for receiving the pads in line from said first transverse conveyor means and spacing them with their wide ends relatively close together and their narrow ends relatively far apart; wrapping web feeding mechanism feeding wrap to a pad receiving and wrap folding mechanism next adjacent in line of flow to said spacing mechanism whereby pads are received in said spaced relation on said wrap and the wrap is folded over into a tube of uniform cross section as large as the larger end of said pad whereby loose wrap extends adjacent the tapered sides of the pad from adjacent the wider end to the narrower end; a form roll under which said pads and wrap are fed from said wrap folding mechanism, said form roll having a rim whose periphery matches the varying width of said spaced pads and joining wrap portion passing therebeneath, said roll having sides at the rim generally normal to a line generating the peripheral surface of the roll; rotating friction rolls on each side of said form roll with the peripheral friction surface having cooperating contact with said sides of the form roll at the locus of passage of the pads and wrap, the loose wrap being between the sides of the form roll and friction rolls on each side, said friction rolls lying in planes inclined upwardly in the direction of flow of the pads thereunder and generally normal to the plane of the form roll whereby a plane containing the axis of the form roll and the tangential locus of contact of the pads and wrap intersects the planes containing the axes of the form rolls in said locus of contact; means for rotating said friction rolls with peripheral speed equal to or greater than the wrap and pad speed in the direction of flow whereby the loose wrap is drawn up along each side of the form roll; conveyor means having flights for pads and connecting wrap conveying the same from the form roll; folding means following the form roll and cooperating with said just-mentioned conveyor means for folding the wrap formed on each side of the form roll onto the narrower end portion of the pad and as overlap on the wrap connecting the narrow ends of the pads; calender means between which said pads and pad connecting wrap is led for calendering the same; conveying means conveying the wrapped and calendered pads and connecting wrap to a cutter means having a cutter for severing the connecting wrap to form a rear tab for the leading pad and a front tab for the trailing pad as respects the just-mentioned positions to said cutter means; conveying means conveying cut pads from said cutter means in the direction of the line of flow; suction means cooperating with said cutter means for lifting up said leading tab and tending to fold it back over the leading end of its pad; and endless conveyor means following said cutter means in the direction of flow and having a bottom run overlying said conveying means conveying pads from said cutter means and following said cutter means in the direction of flow, said bottom overlying run just-mentioned pressing said leading tab onto the leading end and top of the pad passing thereunder; a further endless conveyor receiving pads on a run thereof; and a rear tab folding means for folding the rear tabs over the rear end and top of the pads as they move in the line of flow on said just-mentioned run to complete the formation of said sanitary pads.

References Cited
UNITED STATES PATENTS

| | | | |
|---|---|---|---|
| 1,869,177 | 7/1932 | Thompson | 19—145 |
| 1,935,518 | 11/1933 | O'Neill | 19—145 |
| 2,039,425 | 5/1936 | Jurgensen | 19—145 |

DORSEY NEWTON, *Primary Examiner.*